United States Patent
Noda et al.

(10) Patent No.: US 8,606,028 B2
(45) Date of Patent: Dec. 10, 2013

(54) PIXEL BIT DEPTH CONVERSION IN IMAGE ENCODING AND DECODING

(75) Inventors: Reiko Noda, Kawasaki (JP); Takeshi Chujoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1120 days.

(21) Appl. No.: 12/242,181

(22) Filed: Sep. 30, 2008

(65) Prior Publication Data

US 2009/0087111 A1  Apr. 2, 2009

Related U.S. Application Data

(63) Continuation of application No. PCT/JP2007/057197, filed on Mar. 30, 2007.

(30) Foreign Application Priority Data

Mar. 30, 2006  (JP) .................................. 2006-095597

(51) Int. Cl.
*G06K 9/36* (2006.01)
*G06K 9/46* (2006.01)

(52) U.S. Cl.
USPC ......................................... 382/238; 382/232

(58) Field of Classification Search
None
See application file for complete search history.

(56) References Cited

U.S. PATENT DOCUMENTS

| | | | |
|---|---|---|---|
| 5,543,848 A | | 8/1996 | Murakami et al. |
| 7,486,731 B2 * | | 2/2009 | Cotton et al. ............ 375/240.12 |
| 2002/0154693 A1 | | 10/2002 | Demos et al. |
| 2003/0112864 A1 | | 6/2003 | Karczewicz et al. |
| 2003/0194009 A1 | | 10/2003 | Srinivasan |
| 2003/0202607 A1 | | 10/2003 | Srinivasan |
| 2005/0111544 A1 | | 5/2005 | Cotton et al. |
| 2005/0147161 A1 | | 7/2005 | Cotton et al. |
| 2005/0196063 A1 | | 9/2005 | Guangxi et al. |
| 2005/0259729 A1 | | 11/2005 | Sun |
| 2006/0153301 A1 * | | 7/2006 | Guleryuz ................ 375/240.16 |
| 2008/0247467 A1 * | | 10/2008 | Rusanovskyy et al. .. 375/240.16 |
| 2010/0020866 A1 * | | 1/2010 | Marpe et al. ............ 375/240.02 |
| 2011/0103470 A1 | | 5/2011 | Demos et al. |
| 2011/0103471 A1 | | 5/2011 | Demos et al. |

FOREIGN PATENT DOCUMENTS

| | | |
|---|---|---|
| CN | 1516848 A | 7/2004 |
| EP | 1 353 514 A2 | 10/2003 |
| EP | 1 353 514 A3 | 10/2003 |
| JP | 4-326667 A | 11/1992 |
| JP | 6-311506 A | 11/1994 |
| JP | 8-237669 A | 9/1996 |

(Continued)

OTHER PUBLICATIONS

English translation of Japanese Patent Application JP 4-326667, 1991.*

(Continued)

*Primary Examiner* — Li Liu
(74) *Attorney, Agent, or Firm* — Oblon, Spivak, McClelland, Maier & Neustadt, L.L.P.

(57) ABSTRACT

An image encoding apparatus includes a pixel bit depth increase converter to convert bit depth of each pixel of an input image to output a converted input image and output bit conversion information indicating the number of bits changed by conversion, an image encoder to encode the input converted input image to output encoded image information, and a multiplexer to multiplexes the bit conversion information and encoded image information.

11 Claims, 42 Drawing Sheets

(56) References Cited

FOREIGN PATENT DOCUMENTS

| | | |
|---|---|---|
| JP | 09-098429 | 4/1997 |
| JP | 9-205647 A | 8/1997 |
| JP | 11-27673 A | 1/1999 |
| JP | 2000-23195 | 1/2000 |
| JP | 2002-502161 | 1/2002 |
| JP | 2003-283872 A | 10/2003 |
| JP | 2003-333603 A | 11/2003 |
| JP | 2005-503734 A | 2/2005 |
| JP | 2005-80151 | 3/2005 |
| JP | 2006-005478 | 1/2006 |
| KR | 10-2005-0107529 | 11/2005 |
| WO | WO 02/071735 A2 | 9/2002 |
| WO | WO 02/071735 A3 | 9/2002 |
| WO | WO 03/063491 A2 | 7/2003 |
| WO | WO 03/063491 A3 | 7/2003 |
| WO | WO 2006/017230 A1 | 2/2006 |

OTHER PUBLICATIONS

Office Action issued Feb. 16, 2011, in Korean Patent Application No. 10-2011-7001539 with English translation.

Tom McMahon, et al., "Study Text Toward PExt Annex Drafting", Dolby Laboratories and Thomson Corporate Research, May 23-28, 2003, pp. JVT-H019-1-4 and 9-11.

Japanese Office Action issued Oct. 23, 2012, in Japan Patent Application No. 2008-508675 (with English translation).

Office Action issued Mar. 13, 2012, in Japanese Patent Application No. 2008-508675 (with English-language Translation).

Canadian Office Action issued Jul. 9, 2012, in Patent Application No. 2,645,931.

Chinese Office Action issued May 24, 2012, in China Patent Application No. 201110243637.X (with English translation).

The Extended European Search Report issued Jul. 27, 2012, in Application No. / Patent No. 07740633.8-2223 / 2003897 PCT/JP2007057197.

* cited by examiner

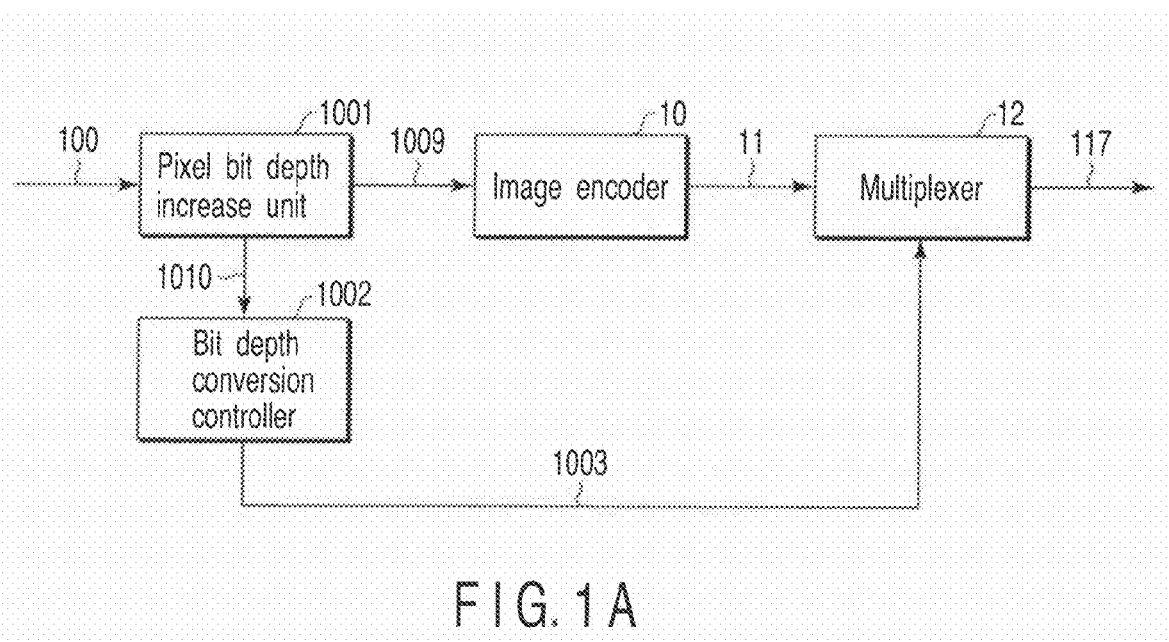
F I G. 1 A

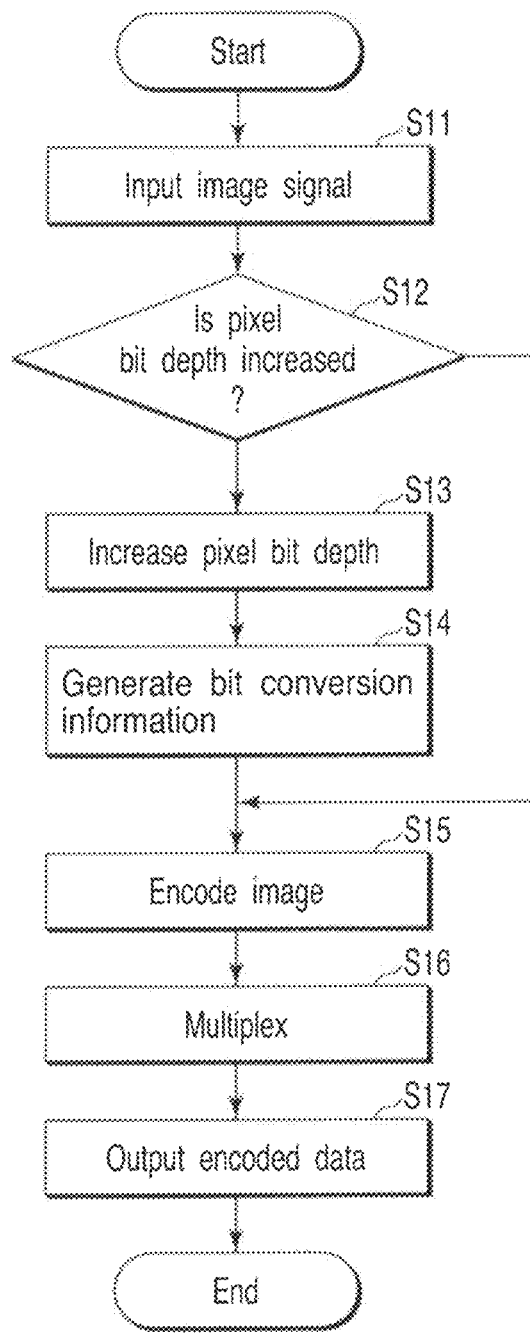
F I G. 1 B

```
sequence_parameter_set( ){
   ...
   ex_seq_bit_extension_flag
   if(ex_seq_bit_extension_flag){
      ex_seq_shift_bits
      ex_bit_transform_type
      if(ex_bit_transform_type==GAMMA_TRANS){
         gamma_value
      }
      else if(ex_bit_transform_type==DR_TRANS){
         gamma_value
         min_value
         max_value
      }
      ...
   }
   ...
}
```

FIG. 4

```
Supplemental_header( ){
   ...
   ex_sei_bit_extension_flag
   if(ex_sei_extension_flag){
      bit_depth_of_decoded_image
   }
   ...
}
```

FIG. 5

```
Supplemental_header( ){
   ...
   ex_sei_bit_extension_flag
   if(ex_sei_extension_flag){
      bit_depth_of_decoded_image
   }
   ex_sei_color_transform_flag
   if(ex_sei_color_transform_flag){
      color_space_of_decoded_image
   }
   ...
}
```

FIG. 6

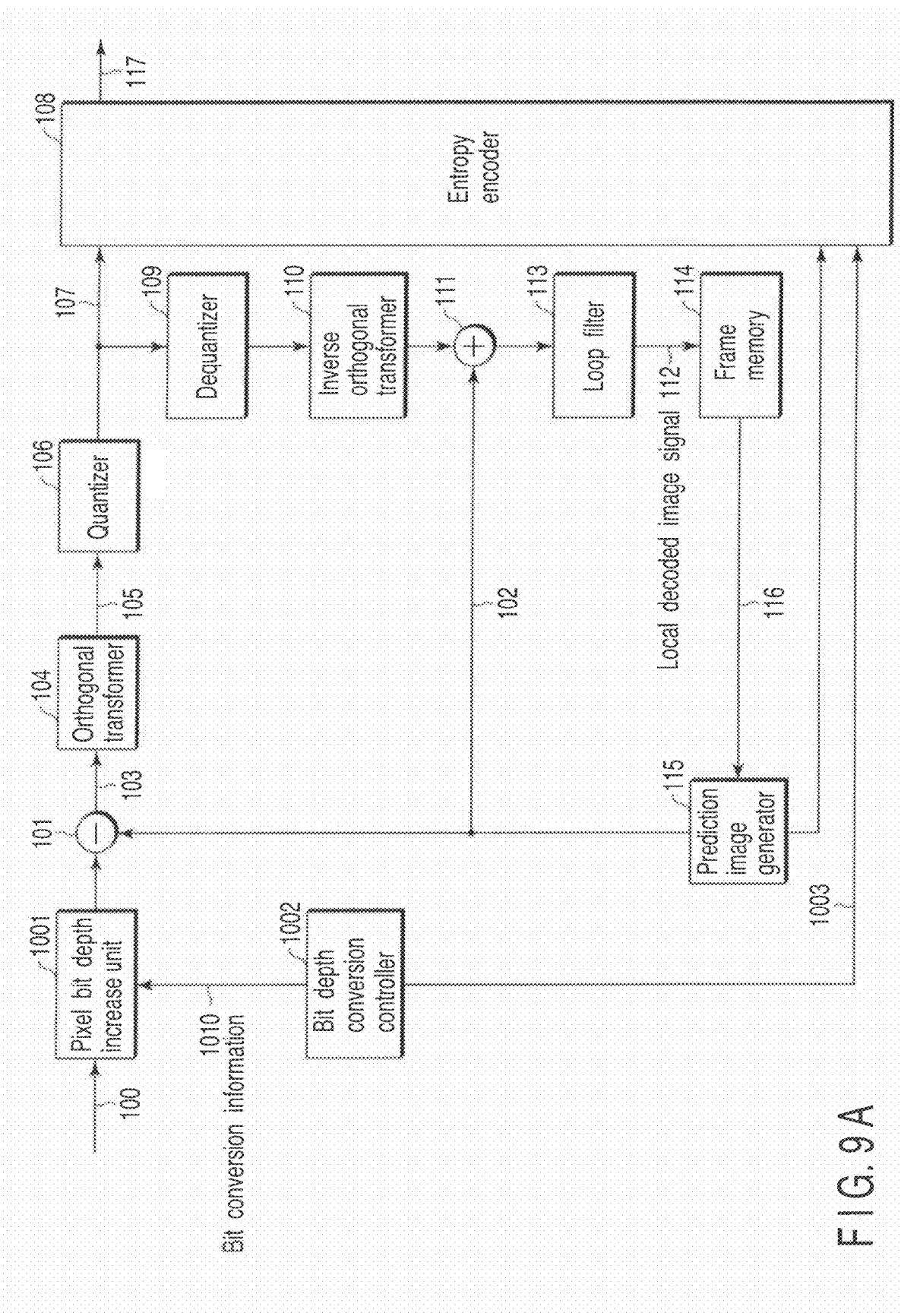
F I G. 9A

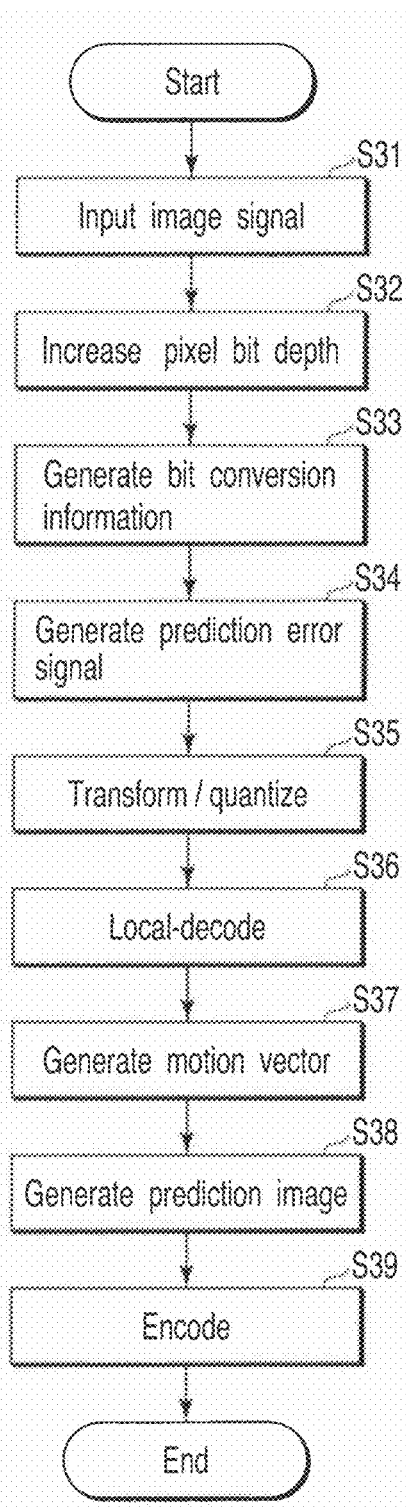
F I G. 9B

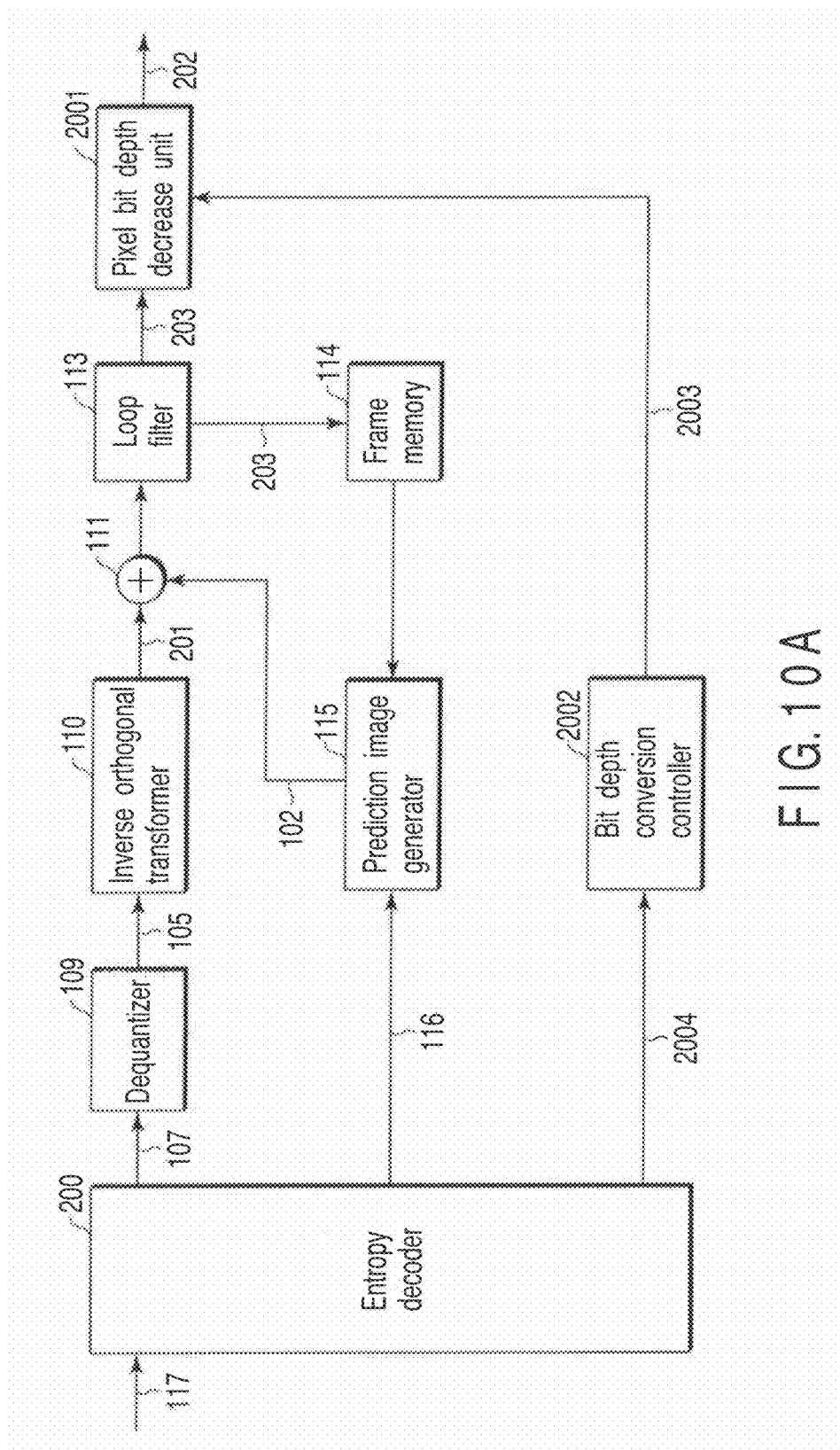
F I G. 10 A

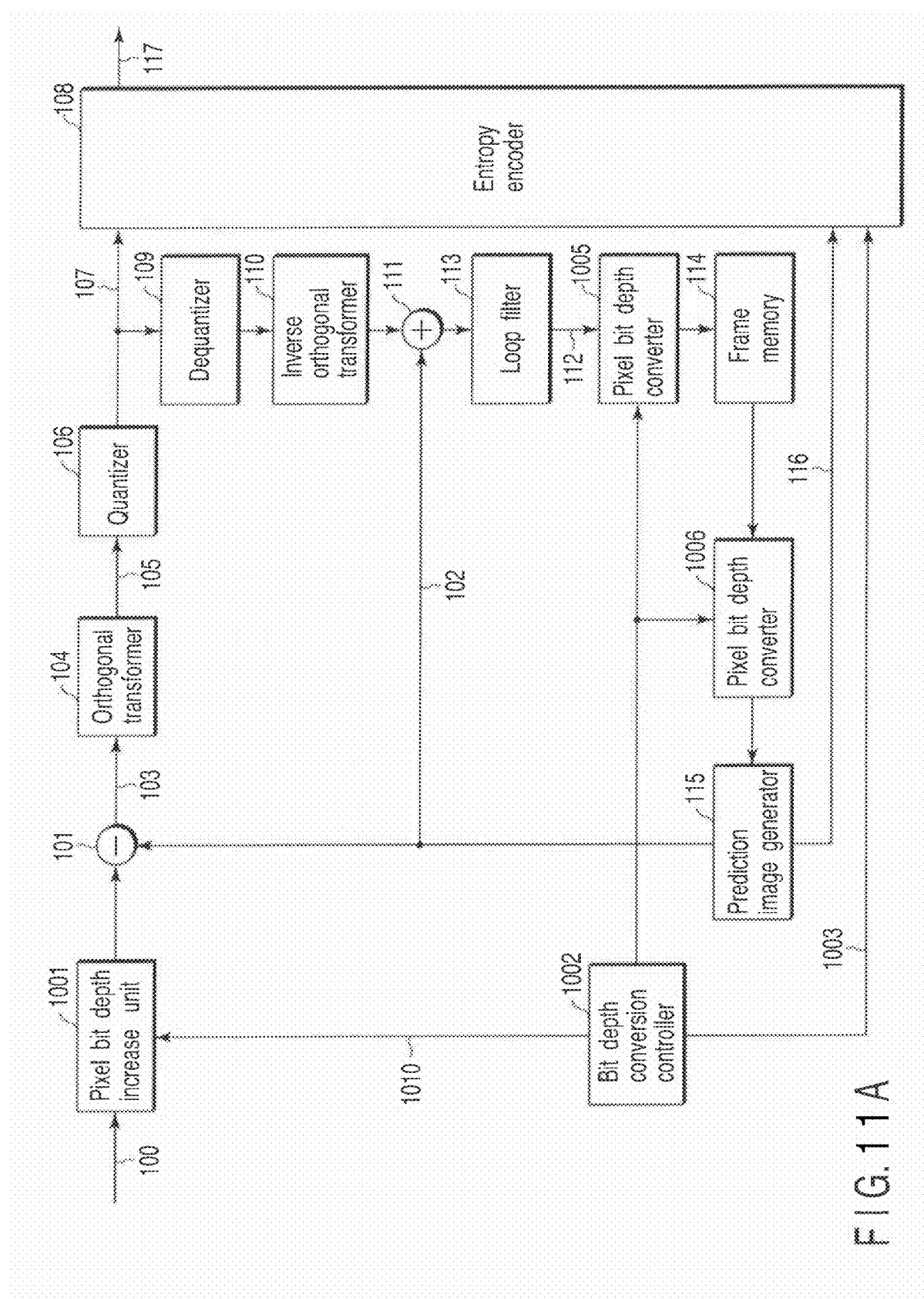
F I G. 11 A

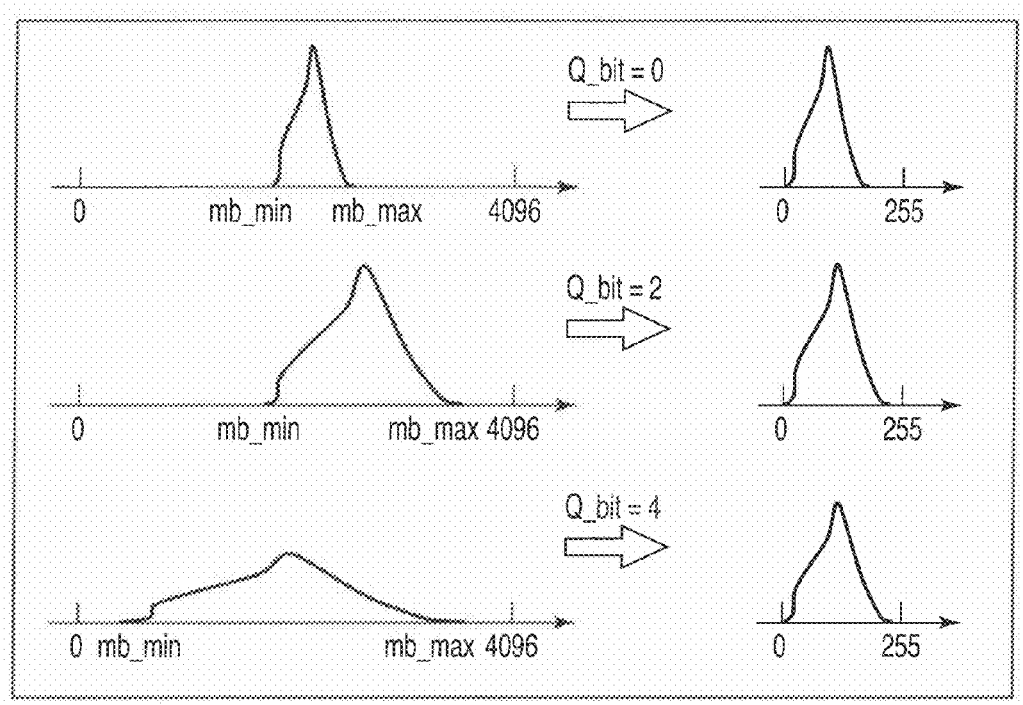
F I G. 1 1 C
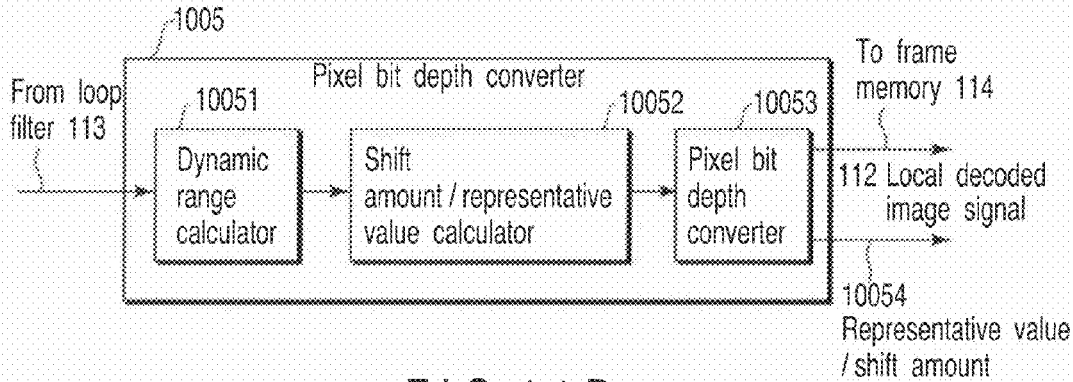
F I G. 1 1 D
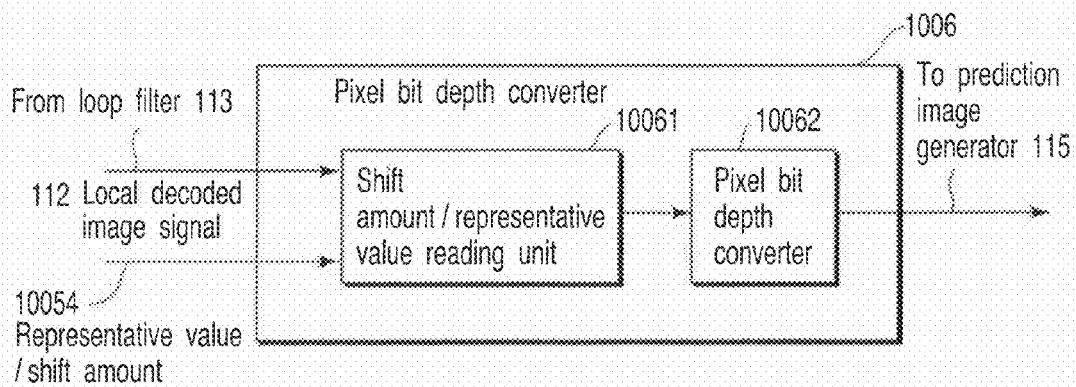
F I G. 1 1 E

```
picture_parameter_set( ){
    ...
    ex_pic_bit_extension_flag
    if(ex_pic_bit_extension_flag){
        ex_pic_shift_bits
        }
        ex_bit_extension_in_slice_flag
        ex_bit_extension_in_mb_flag
        ...
    }
```

F I G. 14

```
slice_header( ){
    ...
    if(ex_bit_extension_in_slice_flag){
        ex_slice_shift_bits
        }
        ...
    }
```

F I G. 15

```
macroblock_layer( ){
    ...
    if(ex_bit_extension_in_mb_flag){
        ex_shift_bits
        }
        ...
    }
```

F I G. 16

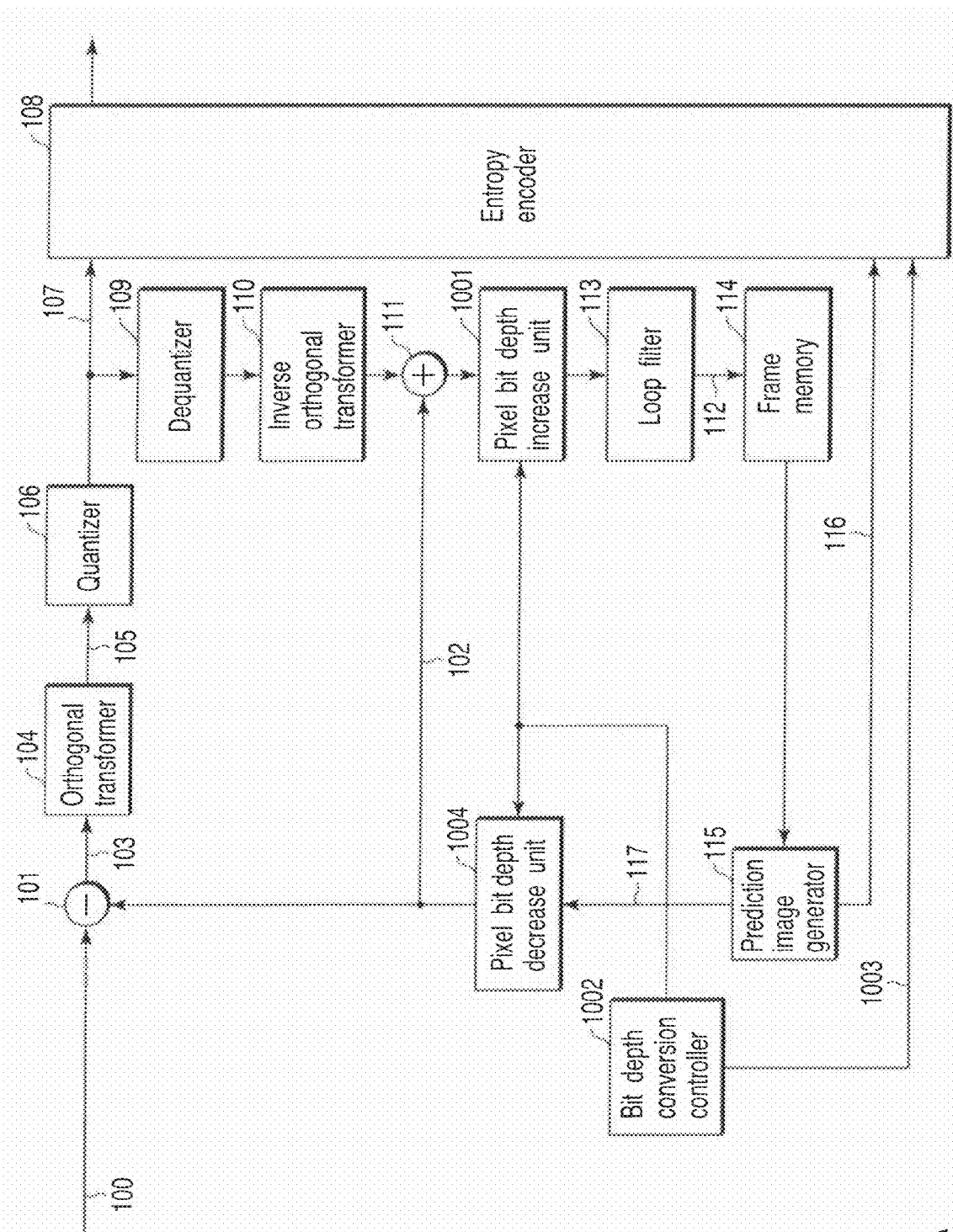
F I G. 18A

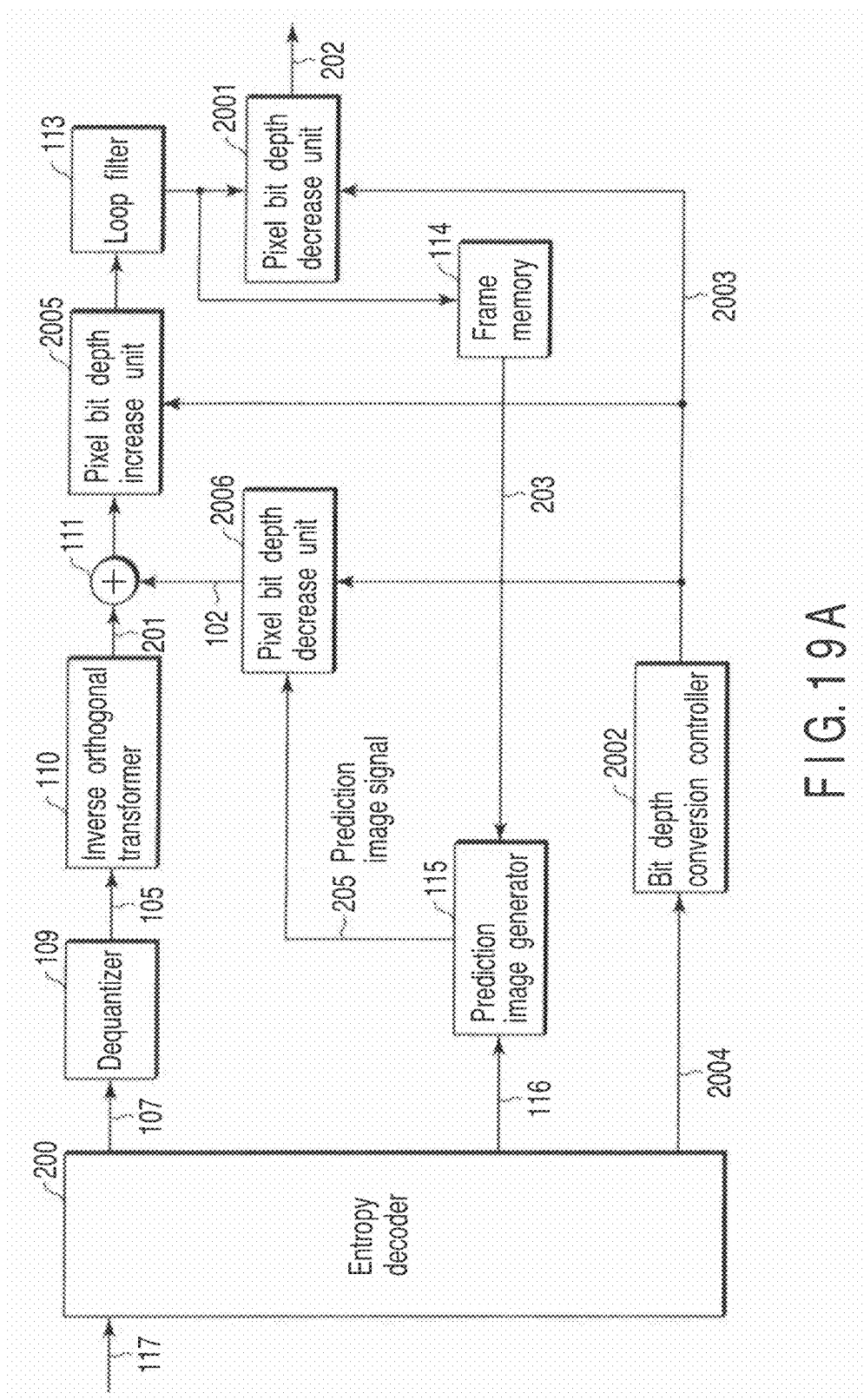
F I G. 19A

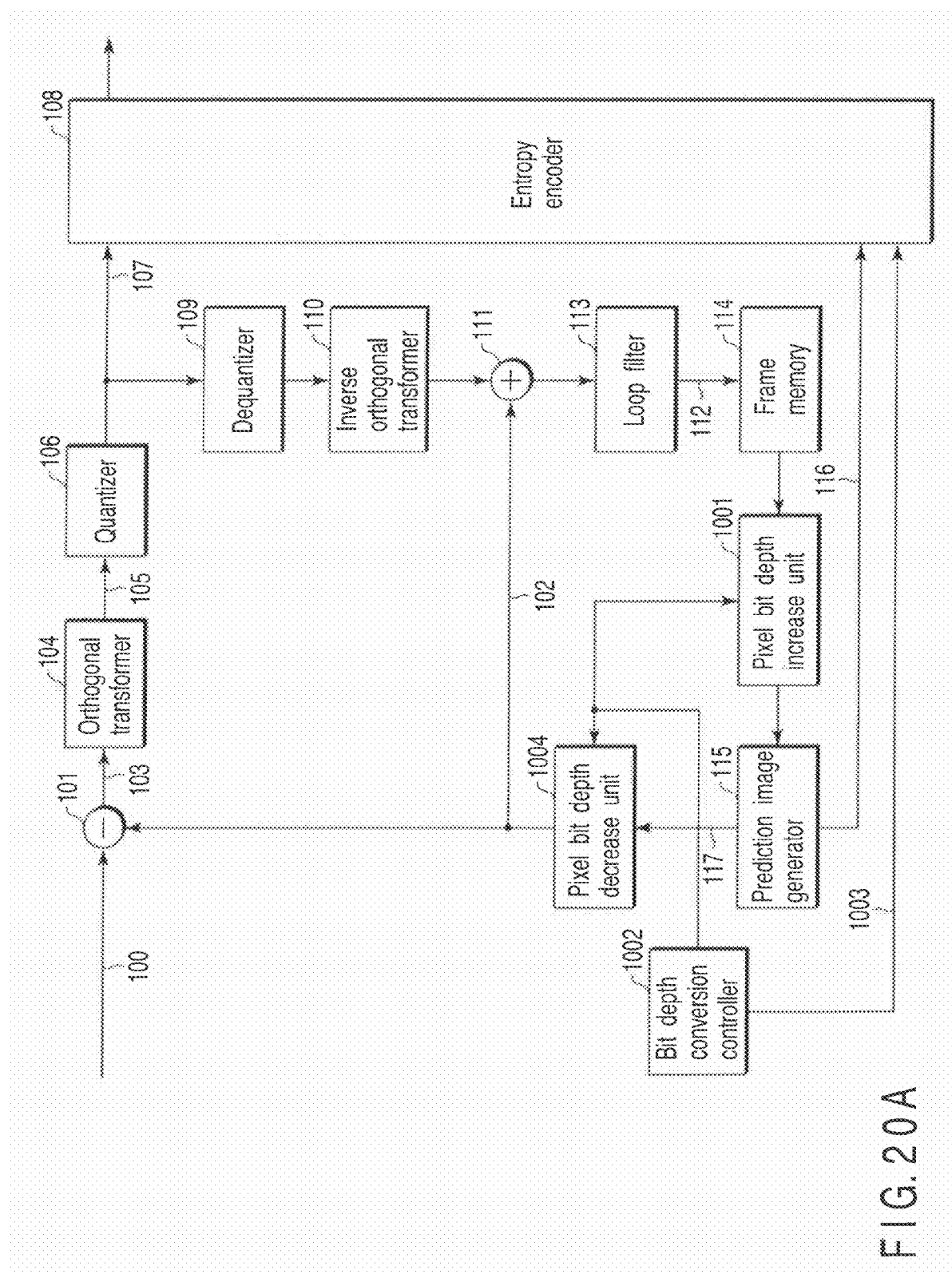
F I G. 20A

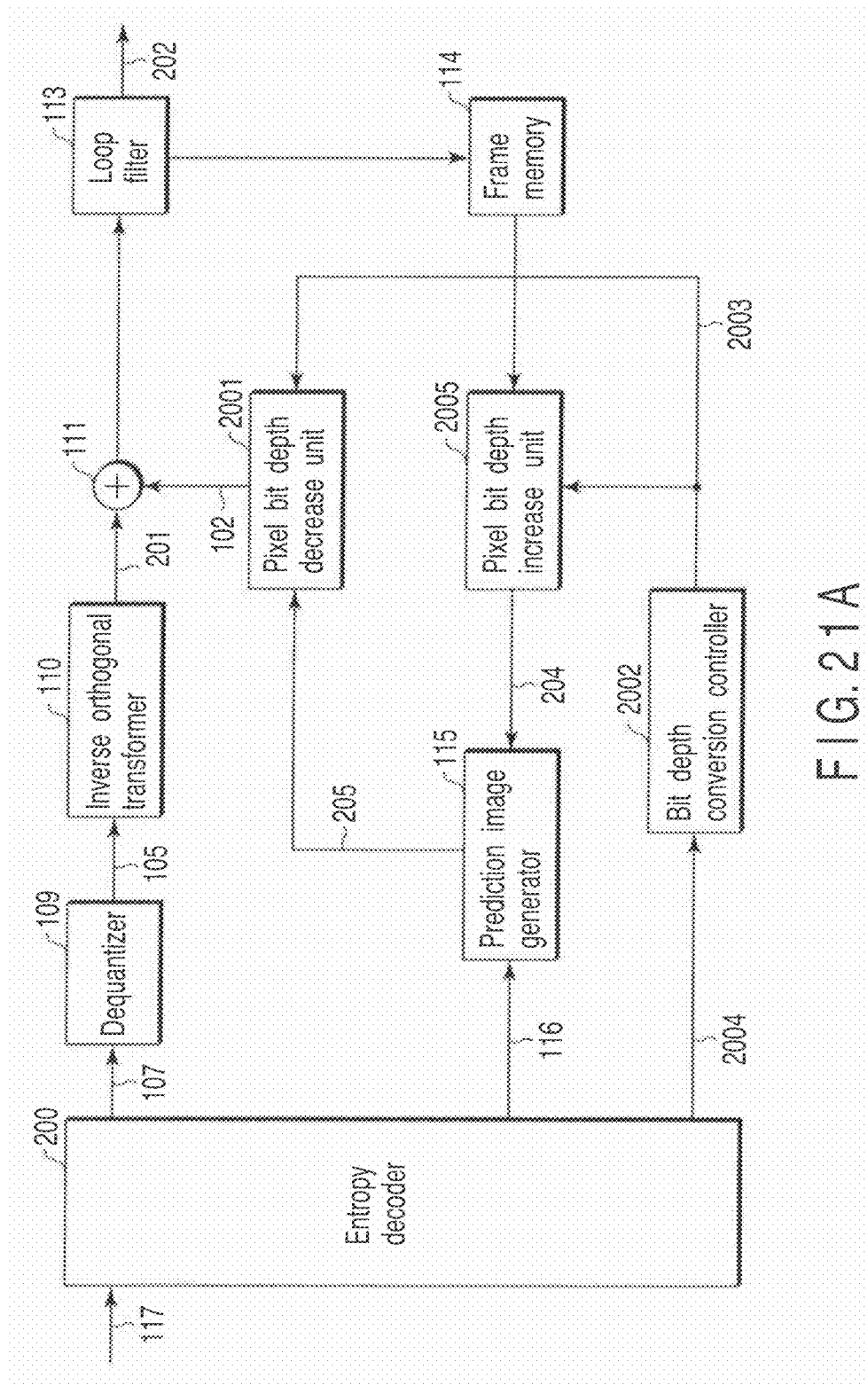
F I G. 21A

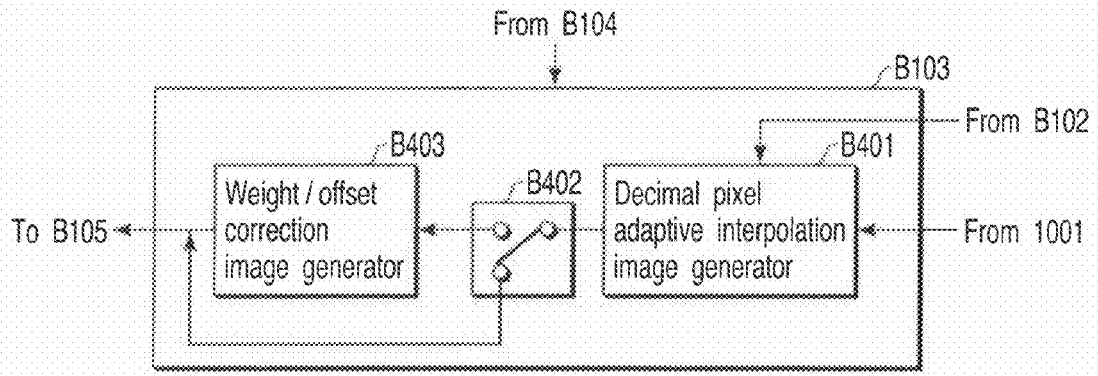
F I G. 25
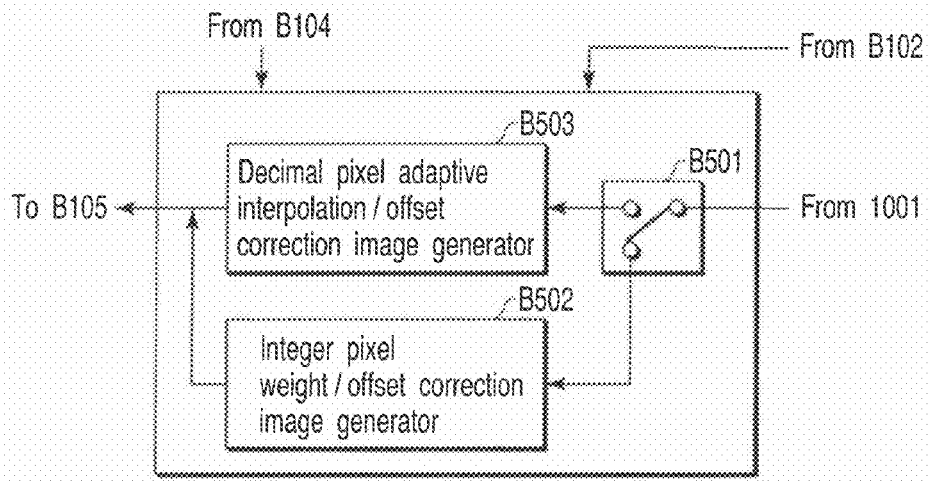
F I G. 26
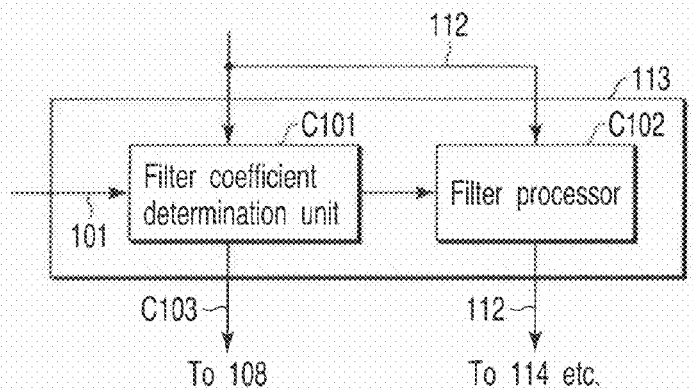
F I G. 27

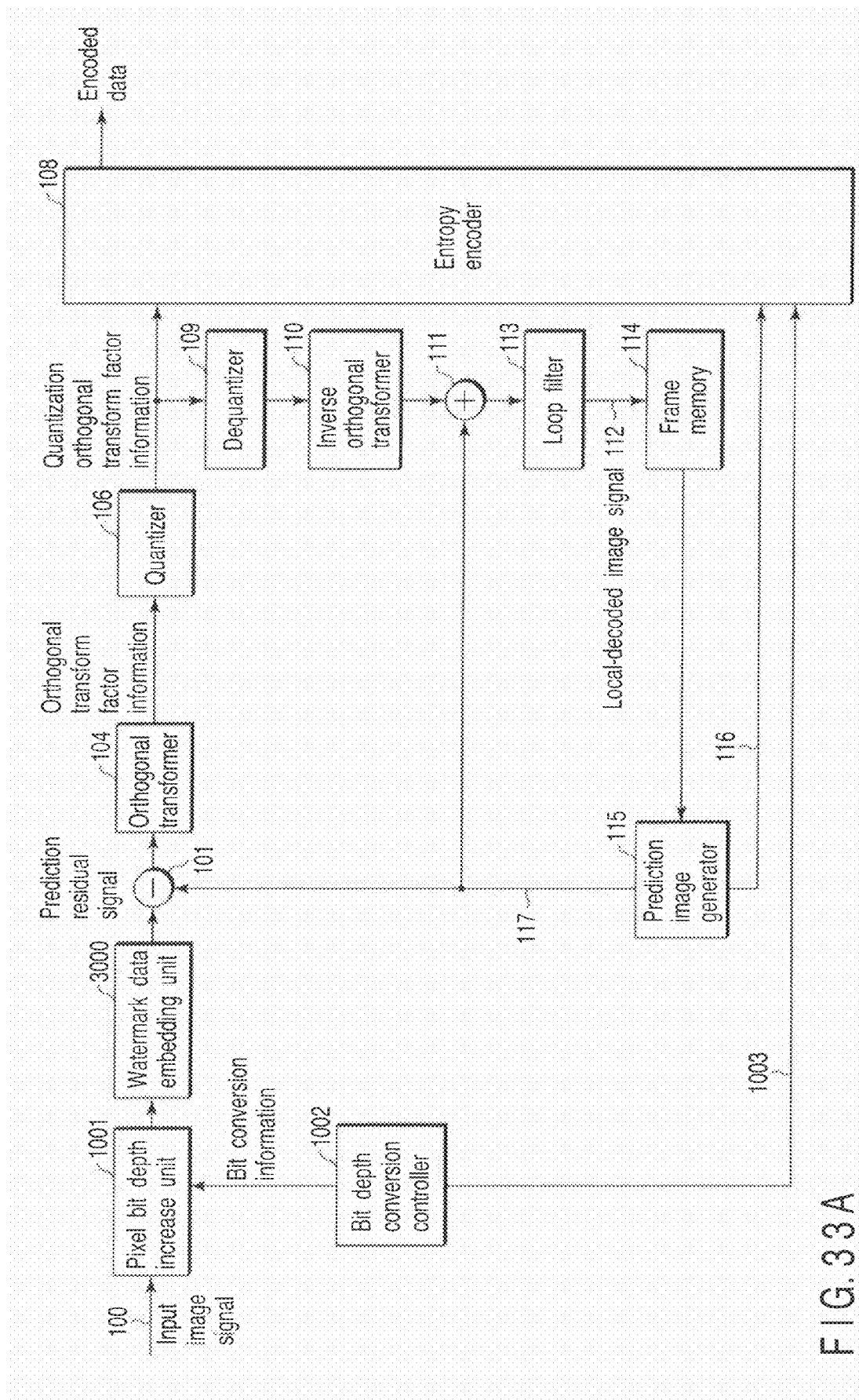
F I G. 33A

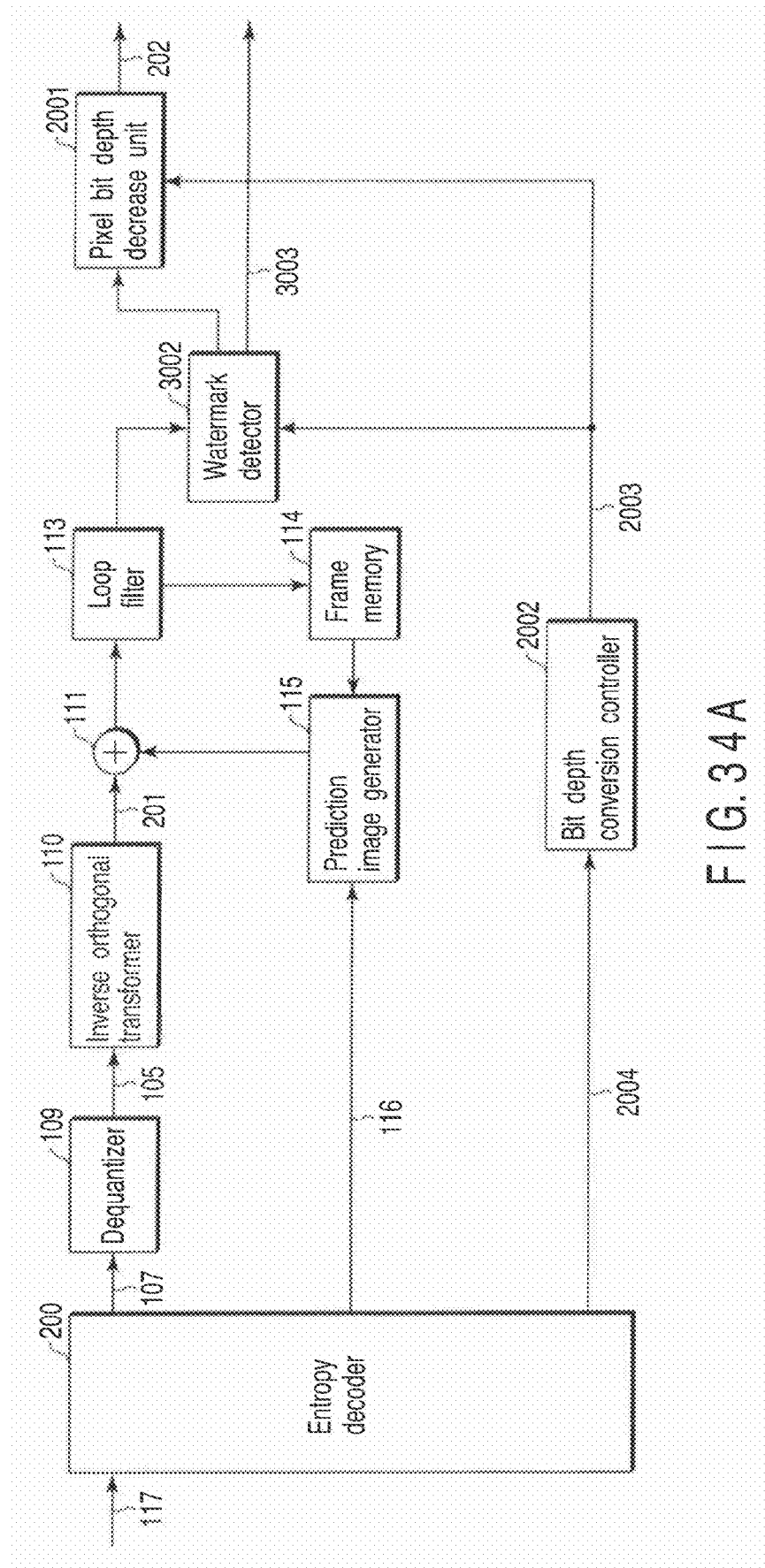
F I G. 34 A

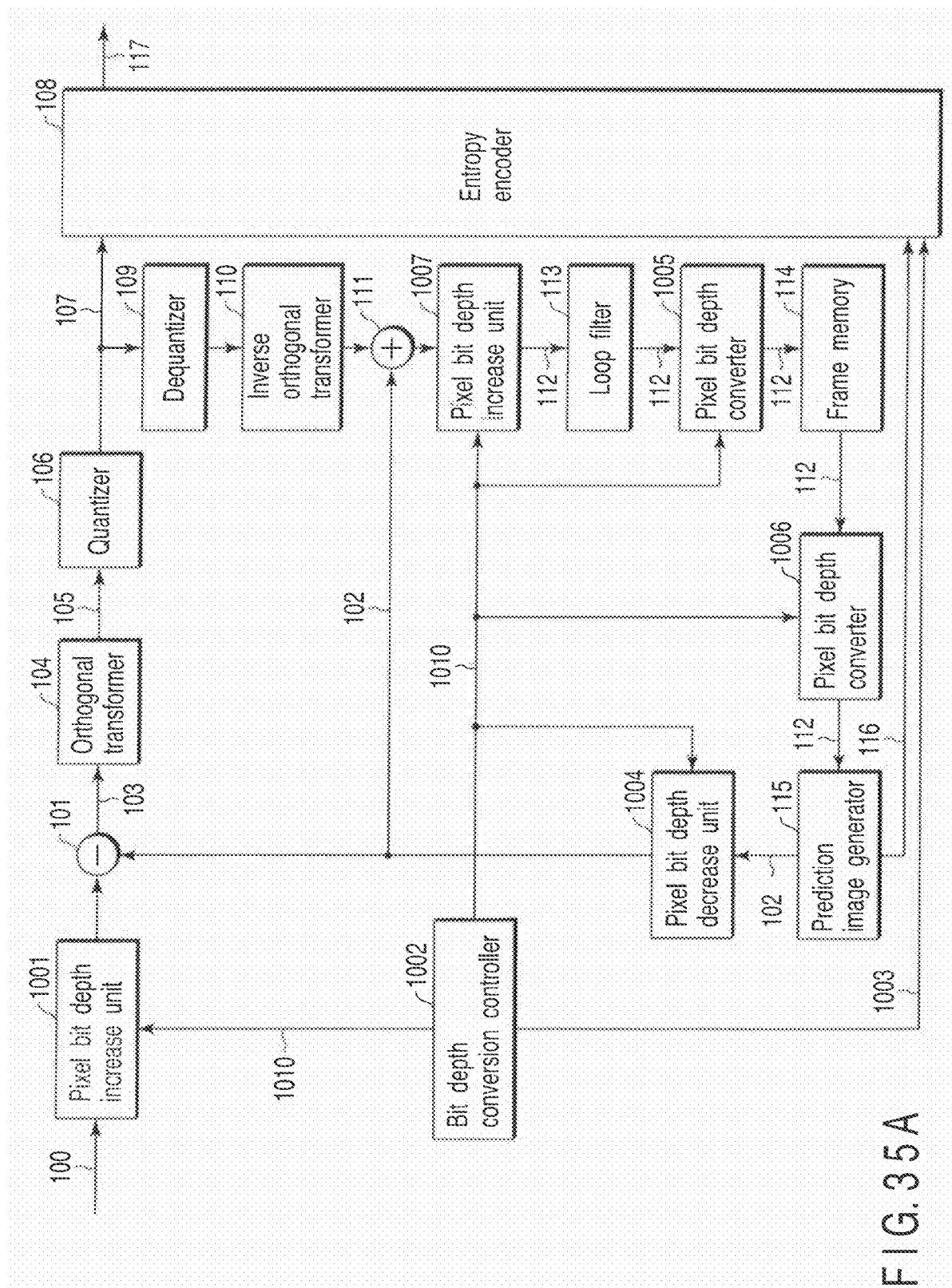
F I G. 35 A

```
sequence_parameter_set( ){
   ...
   ex_seq_all_bit_extension_flag
   if(ex_seq_all_bit_extension_flag){
       ex_shift_bits
   else {
       ex_seq_partial_bit_extension_flag
       if(ex_seq_partial_bit_extension_flag){
           ex_seq_partial_shift_bits
           ex_seq_framemem_bit_extension_flag
           if(ex_seq_all_bit_extension_flag)
               ex_framemem_shift_bits
           ex_seq_trans_and_quant_bit_extension_flag
           if(ex_seq_trans_and_quant_bit_extension_flag)
               ex_trans_and_quant_shift_bits

```
sequence_parameter_set( ){
   ...
   ex_seq_all_bit_extension_flag
   if(ex_seq_all_bit_extension_flag !=FALSE)
       ex_seq_partial_bit_extension_flag
       if(ex_seq_partial_bit_extension_flag) {
           ex_seq_framemem_bit_extension_flag
           ex_seq_trans_and_quant_bit_extension_flag
           ...
       }

| Syntax | | | | Control flag | | | | |
|---|---|---|---|---|---|---|---|---|
| all | part | fm | t/q | F1001 | F1007 | F1005 | F1006 | F1004 |
| 1 | - | - | - | 1 | 0 | 0 | 0 | 0 |
| 0 | 0 | - | - | 0 | 0 | 0 | 0 | 0 |
| 0 | 1 | 0 | 0 | 0 | 0 | 0 | 1 | 1 |
| 0 | 1 | 0 | 1 | 1 | 0 | 1 | 1 | 0 |
| 0 | 1 | 1 | 0 | 0 | 1 | 0 | 0 | 1 |

FIG. 38

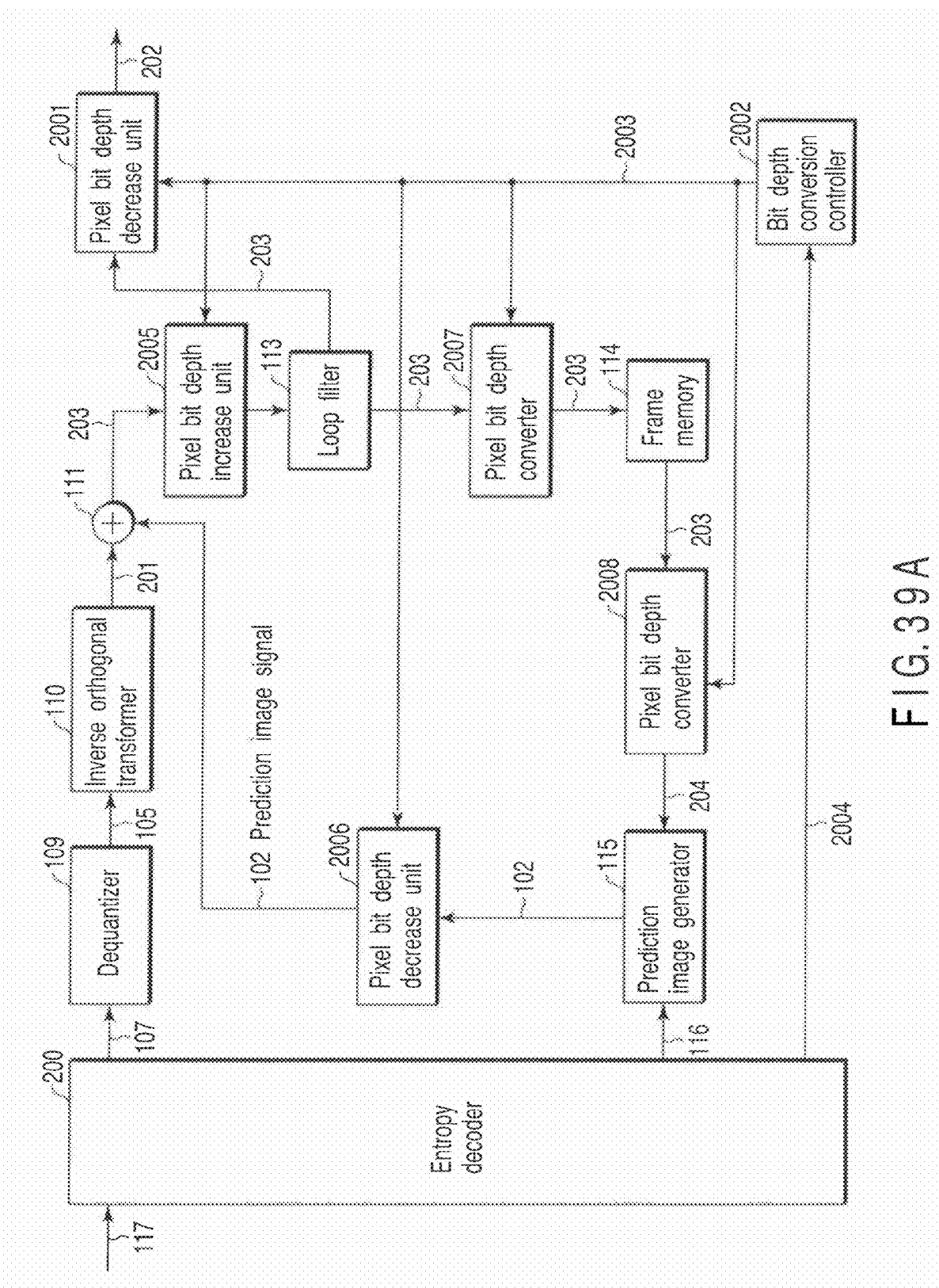
F I G. 39A

| Synta | | | | Control flag | | | | |
|---|---|---|---|---|---|---|---|---|
| all | part | fm | t/q | F2001 | F2005 | F2006 | F2007 | F2008 |
| 1 | - | - | - | 1 | 0 | 0 | 0 | 0 |
| 0 | 0 | - | - | 0 | 0 | 0 | 0 | 0 |
| 0 | 1 | 0 | 0 | 0 | 0 | 1 | 0 | 1 |
| 0 | 1 | 0 | 1 | 1 | 1 | 1 | 0 | 0 |
| 0 | 1 | 1 | 0 | 0 | 0 | 0 | 1 | 1 |

FIG. 40

| Pixel position | 0 | 0.5 | 1 | 1.5 | 2 | 2.5 | 3 | 3.5 | 4 | 4.5 | 5 | 5.5 | 6 | 6.5 | 7 | 7.5 | 8 | 8.5 | 9 |
|---|---|---|---|---|---|---|---|---|---|---|---|---|---|---|---|---|---|---|---|
| Input pixel value (8bit) | 20 | - | 23 | - | 27 | - | 30 | - | 33 | - | 36 | - | 37 | - | 38 | - | 39 | - | 39 |
| Prediction pixel value (8bit) | 20 | - | 23 | - | 27 | 29 | 30 | 31 | 33 | 35 | 36 | 37 | 37 | 37 | 38 | - | 39 | - | 39 |
| Input pixel value (12bit) | 320 | - | 432 | - | 432 | - | 480 | - | 528 | - | 576 | - | 592 | - | 608 | - | 624 | - | 624 |
| Prediction pixel value (12bit) | 320 | - | 432 | - | 432 | 458 | 480 | 503 | 528 | 555 | 576 | 587 | 592 | 599 | 608 | - | 624 | - | 624 |

F I G. 41

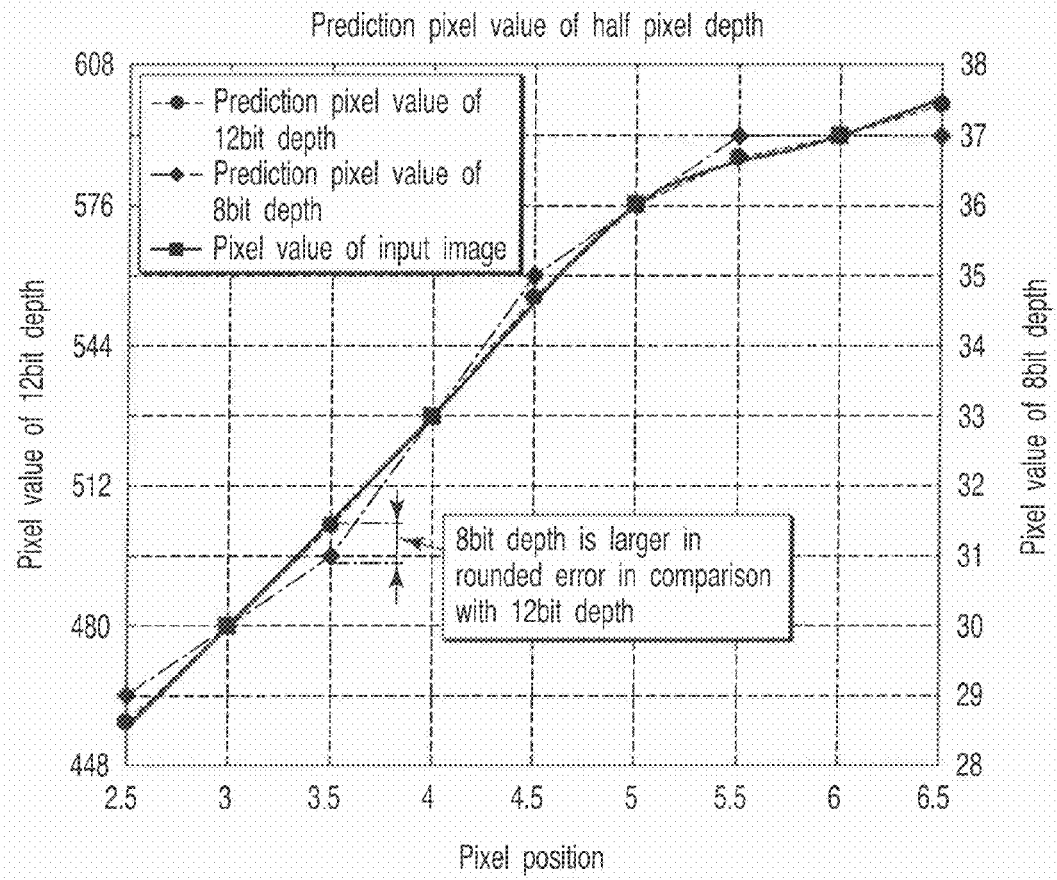
F I G. 4 2
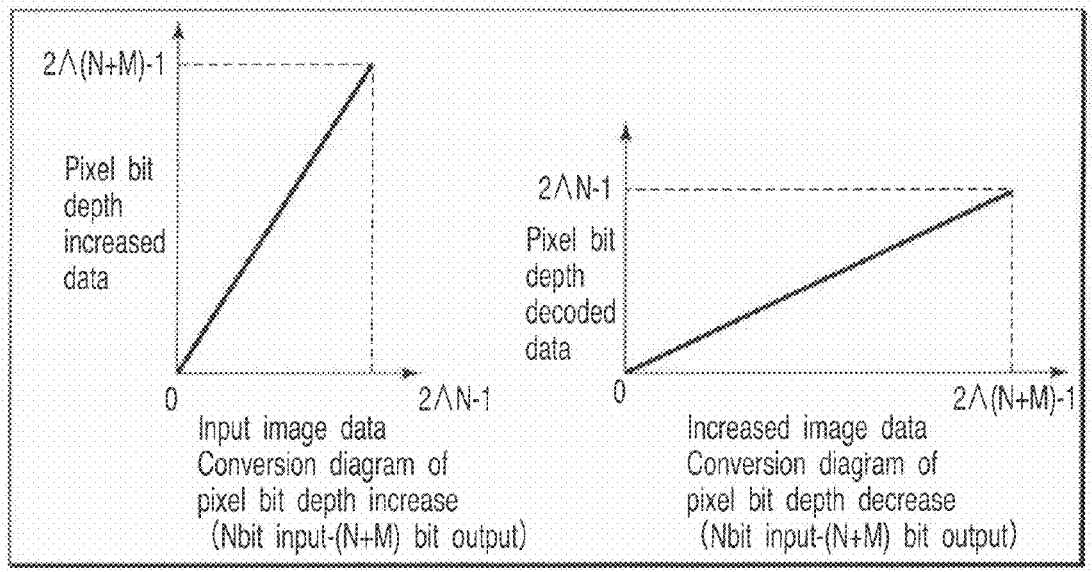
F I G. 4 3

PIXEL BIT DEPTH CONVERSION IN IMAGE ENCODING AND DECODING

CROSS REFERENCE TO RELATED APPLICATIONS

This is a Continuation Application of PCT Application No. PCT/JP2007/057197, filed Mar. 30, 2007, which was published under PCT. Article 21(2) in Japanese.

This application is based upon and claims the benefit of priority from prior Japanese Patent Application No. 2006-095597, filed Mar. 30, 2006, and International Application No. PCT/JP2006/320876, filed Oct. 19, 2006, the entire contents of both of which are incorporated herein by reference.

BACKGROUND OF THE INVENTION

1. Field of the Invention

The present invention relates to an image encoding apparatus for use in a moving image or a still image and a method and an image decoding apparatus and a method.

2. Description of the Related Art

H.264 which is a representative video encoding standard system is a lossy compression system which performs orthogonal transform such as discrete cosine transform (DCT) on a prediction error signal between an input signal and a prediction image signal generated by intraframe prediction or motion compensation, and subjects the transform coefficients to compression processing based on quantization and encoding after the prediction error signal is transformed on such a frequency axis to acquire an encoded image. When the prediction image signal is generated, an interpolation filter for intra-frame prediction or motion compensation performs rounding processing with the same precision as the pixel bit depth of the input image after multiplying a plurality of pixels by a filter coefficient and adding them.

JP-A 2003-283872 (KOKAI) discloses a technique to control emphasis of encoding distortion due to correction of a display device by encoding an image obtained by enlarging a dynamic range of each color signal for each frame of an input image, and restoring the dynamic range to the original dynamic range after decoding.

Because, in H.264, a rounding error occurs in a process of rounding processing when a prediction signal is generated, it cannot be processed with enough precision in an interpolation filter for intra-prediction or motion compensation, resulting in increasing a prediction error signal and decreasing the encoding efficiency. In contrast, in the case of JP-A 2003-283872 (KOKAI), it is possible to decrease some of the above-mentioned rounding error by enlarging a dynamic range of an input image. However, in JP-A 2003-283872 (KOKAI), enlargement of the dynamic range is done simply within the range of bit precision of the input image, and also calculation precision cannot be improved enough because a rounding error occurs in enlarging the dynamic range.

JP-A H4-32667 (KOKAI) discloses a technique applied to a digital camera wherein an encoder and a decoder are provided integrally, and bit-shifting a bit depth of an input image in conformity to operation precision of DCT shared by the encoder and decoder. In this technique, if the encoder and decoder are provided separately and operation precisions of respective DCTS are different, the bit depth is bit-shifted in conformity to each of the operation precisions. As a result, the bit depth is shifted by the different number of bits, resulting in occurring mismatch.

It is an object of the present invention to provide an image encoding apparatus and an image encoding method and an image decoding apparatus and an image decoding method to improve an encoding efficiency by enhancing a precision of intra-prediction or motion compensation enough.

BRIEF SUMMARY OF THE INVENTION

A first aspect of the present invention provides an image encoding apparatus comprising a pixel bit depth converter to convert a bit depth of each pixel of an input image to generate a converted input image of a different bit depth and output bit conversion information indicating the number of bits changed by conversion, an image encoder to encode the converted input image to output encoded image information, and a multiplexer to multiplex the bit conversion information and the encoded image information.

A second aspect of the present invention provides an image encoding apparatus comprising a pixel bit depth converter to convert bit depth of each pixel of an input image formed of a plurality of pixels each having an N bit depth to an (N+M) bit depth larger than the N bit depth by M bits, a prediction image generator to generate a prediction image of the (N+M) bit depth with respect to the input image of the (N+M) bit depth from a reference image of the (N+M) bit depth, a subtracter to obtain a differential signal between the input image of the (N+M) bit depth and the prediction image of the (N+M) bit depth, an encoder to encode the differential signal and output encoded image information, a decoder to output a decoded difference picture based on the image encoding information, an adder to add the prediction image of the (N+M) depth to the decoded difference picture of the (N+M) bit depth and output a decoded image of the (N+M) bit depth, and a reference image storing memory to store the decoded image as the reference image.

A third aspect of the present invention provides an image decoding apparatus comprising a demultiplexer to receive image information multiplexed with bit depth conversion information and image encoding information and demultiplex the bit conversion information and the image encoding information therefrom, an image decoder to decode the image encoding information to output a decoded image, and a pixel bit depth converter to convert a value of each pixel of the decoded image into a different bit depth based on the bit depth conversion information.

A fourth aspect of the present invention provides an image decoding apparatus comprising a decoder to decode input encoded image information into a decoded difference image of an (N+M) bit depth, a prediction image generator to create a prediction image of the (N+M) bit depth from a reference image of the (N+M) bit depth using the encoded image information, an adder to add the decoded difference image to the prediction image to acquire a decoded image of the (N+M) bit depth, a reference image storing memory to store the decoded image of the (N+M) bit depth as the reference image, and a pixel bit depth converter to convert each pixel of the decoded image of the (N+M) bit depth into the N bit depth to output a decoded image of the N bit depth.

BRIEF DESCRIPTION OF THE SEVERAL VIEWS OF THE DRAWING

FIG. 1A is a block diagram illustrating a configuration example of an image encoding apparatus according to a first embodiment of the present invention.

FIG. 1B is a flow chart illustrating an operation of the image encoding apparatus of FIG. 1A.

FIG. 4 is a diagram illustrating a structure of sequence parameter set syntax to use in the embodiment.

FIG. 5 is a diagram illustrating a structure of supplemental syntax to use in the embodiment.

FIG. 6 is a diagram illustrating a structure of supplemental syntax to use in the embodiment.

FIG. 9A is a block diagram illustrating a configuration example of an image encoding apparatus according to a second embodiment of the present invention.

FIG. 9B is a flow chart illustrating an operation of the image decoding apparatus of FIG. 9A.

FIG. 10A is a block diagram illustrating a configuration example of an image decoding apparatus according to the embodiment.

FIG. 11A is a block diagram illustrating a configuration example of an image coding apparatus according to a third embodiment.

FIG. 11C is a diagram illustrating an outline of an operation of a pixel bit depth converter of FIG. 11A.

FIG. 11D is a block diagram illustrating an example of a configuration of the pixel bit depth converter of FIG. 11A.

FIG. 11E is a block diagram illustrating an example of a configuration of the pixel bit depth converter of FIG. 11A.

FIG. 14 is a diagram illustrating a structure of picture parameter set syntax to use in the embodiment.

FIG. 15 is a diagram illustrating a structure of slice level syntax to use in the embodiment.

FIG. 16 is a diagram illustrating a structure of macroblock level syntax to use in the embodiment.

FIG. 18A is a block diagram illustrating a configuration example of an image encoding apparatus according to a fourth embodiment of the present invention.

FIG. 19A is a block diagram illustrating a configuration example of an image decoding apparatus according to the embodiment.

FIG. 20A is a block diagram illustrating a configuration example of an image encoding apparatus according to a fifth embodiment.

FIG. 21A is a block diagram illustrating a configuration example of the image decoding apparatus according to the embodiment.

FIG. 25 is a block diagram illustrating another configuration of the inter-frame predictor.

FIG. 26 is a block diagram illustrating another configuration of the inter-frame predictor.

FIG. 27 is a block diagram illustrating a configuration of a loop filter of the encoder side.

FIG. 33A is a block diagram of an image encoding apparatus according to a sixth embodiment.

FIG. 34A is a block diagram of an image decoding apparatus according to the sixth embodiment.

FIG. 35A is a block diagram of an image encoding apparatus according to a seventh embodiment.

FIG. 36 is a diagram illustrating sequence parameter set syntax.

FIG. 37 is a diagram illustrating sequence parameter set syntax.

FIG. 38 is a diagram illustrating a setting example of a control flag used in processing of the image encoding apparatus.

FIG. 39A is a block diagram illustrating a configuration of an image decoding apparatus according to the seventh embodiment.

FIG. 40 is a diagram illustrating setting of a control flag included in bit conversion information.

FIG. 41 is a diagram for explaining a difference between rounding errors occurring due to presence and absence of increase of bit depth.

FIG. 42 is a diagram illustrating a prediction pixel value of half pixel precision.

FIG. 43 is a diagram illustrating conversion characteristics in pixel bit depth increase and pixel bit depth decrease according to the embodiments of the present invention.

DETAILED DESCRIPTION OF THE INVENTION

Figure 2:
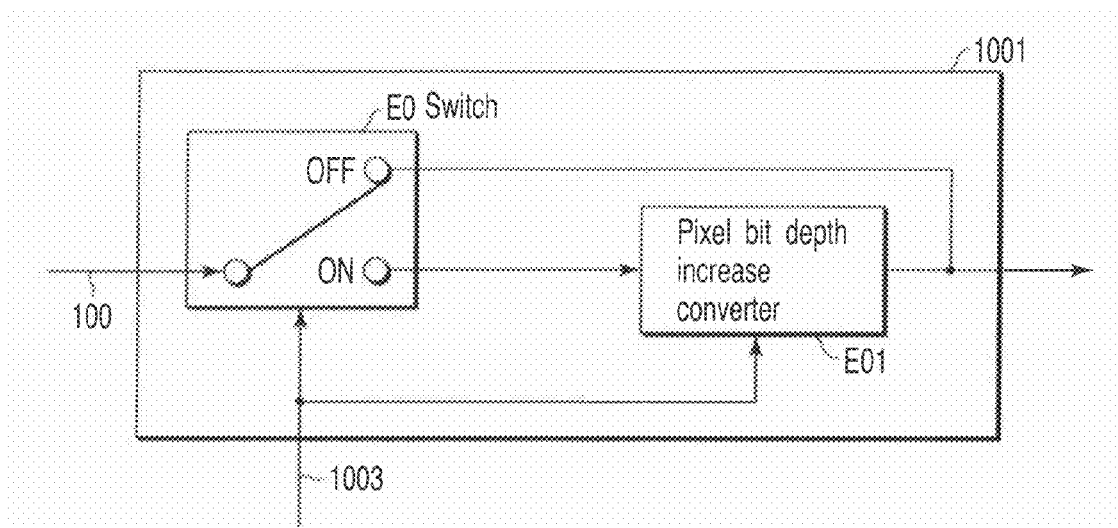
FIG. 2 is a block diagram illustrating a configuration of a pixel bit depth increase unit.

There will be described embodiments of the present invention referring to drawings hereinafter.

First Embodiment

There will be described a configuration of an image encoding apparatus for video encoding according to the first embodiment referring to FIG. 1A. This image encoding apparatus comprises a pixel bit depth increase unit 1001 to which an input image signal 100 is supplied to increase a pixel bit depth (i.e., a pixel bit depth converter for changing pixel bit depth), an image encoder 10 connected to the output of this pixel bit depth increase unit 1001, a multiplexer 12 connected to the output of this image encoder 10, and a bit depth conversion controller 1002 connected to the other output of the pixel bit depth increase unit 1001 to supply bit depth increase information to the multiplexer 12.

There will now be described an operation of the image encoding apparatus with reference to the flow chart of FIG. 1B. A video signal is input to this image encoding apparatus as an input image signal 100, for example, in units of one frame (S11). The pixel bit depth increase unit 1001 carries out a process for converting each pixel of the input image signal 100 of an N-bit depth into an (N+M) bit depth larger than the N bits by M bits. In the pixel bit depth increase unit 1001 shown in FIG. 2, a switch E0 selects whether the bit depth of each pixel of the input image signal 100 of N bit depth is increased based on bit depth increase information 1003 (S12). When increase is carried out, the switch E0 is connected to the ON side, and when the increase is not carried out, the switch E0 is connected to the OFF side. When the switch E0 is connected to ON, the image signal is input to the pixel bit depth increase converter (pixel bit depth converter) E01 to perform pixel bit depth conversion described hereinafter (S13). When the switch is connected to OFF, the image signal is output directly without pixel bit depth conversion. For example, when the bit depth of a certain pixel of the input image signal is K, the pixel value K' after M bits increase of the bit depth of the pixel value K is calculated by the following equation (1).

$$K' = K << M \quad (1)$$

Further, the pixel may be gamma-transformed in conformity to the characteristic of a display device, for example. If the number of bits to be increased is M and a gamma value is γ, the pixel value K' is calculated according to the following equation (1-1).

$$K' = \text{INT}[[\{K/((1<<N)-1)\}\gamma \times ((1<<M)-1)] + \text{offset}] \quad (1-1)$$

Further, it is possible to calculate the minimum value Min and maximum value Max of the pixel of the input image and increase the bit depth of the pixel by M bits according to the following equation (1-2) while enlarging a dynamic range.

$$K' = \text{INT}[[\{(K-\text{Min})/(\text{Max}-\text{Min})\}\gamma \times ((1<<M)-1)] + \text{offset}] \quad (1-2)$$

where INT indicates a process for rounding the pixel to an integer. The term of "offset" of the equations (1-1) and (1-2) indicate an offset when the rounding is done, and it is an arbitrary value of 0 to 1.

Furthermore, it is possible to perform histogram smoothing or spatiotemporal filtering may be performed on a sequence of input images after bit depth increase as described above.

When the input image is a color-image signal composed of a plurality of components of RGB, for example, each component may be converted into a component signal of another color space after M bits increase of the bit depth of each pixel of each component. For example, when the color-image signal is converted into YCoCg from RGB, it is converted according to the following equation (1-3).

In this example, the bit depth of each pixel R, G or B of each component of the input image of N bits is increased by M bits, and then each pixel R, G or B is converted into Y, Co or Cg.

$$R' = (R << M)$$

$$G' = (G << M)$$

$$B' = (B << M)$$

$$Y = \text{Round}(0.5*G' + 0.25*(R'+B'))$$

$$Co = \text{Round}(0.5*G' - 0.25*(R'+B')) + (1<<(N+M-1))$$

$$Cg = \text{Round}(0.5*(R'-B')) + (1<<(N+M-1)) \quad (1-3)$$

Where Round (A) is a process of rounding off "A" to an integer. In the conversion example of the equation (1-3), if the number of bits M to be increased is not less than 2, color conversion can be done without a rounding error. The color conversion described here is an example. Any processing for performing color conversion is available.

The above-mentioned example is an example of the conversion that the pixel bit depth increase unit 1001 carries out. The process of an M bits increase of bit depth of each pixel is not limited to the above example, and what process for increasing the bit depth is available.

The bit depth increased input image signal 1009 bit-increased as described above is led to the image encoder 10. The number of bits M to be increased, the bit depth N of the input image signal, and the bit depth conversion information 1010 such as gamma value, the pixel maximum value, the minimum value, histogram and the like which are necessary for conversion are generated (S14), and led to the multiplexer 12 as bit depth increase information 1003 with the bit depth conversion controller (bit depth conversion controller) 1002.

The image encoder 10 encodes the bit depth increased input image signal 1009 and outputs image encoded data 11 to the multiplexer 12 (S15). The multiplexer 12 multiplexes the image encoded data 11 and bit depth increase information 1003 (S16) and sends out it as encoded data 117 to a transmission system or storage system (now shown) (S17).

There will be explained a method of multiplexing the bit depth increase information 1003 which is necessary for conversion of the number of bits M to be increased and the like hereinafter.

Figure 3:
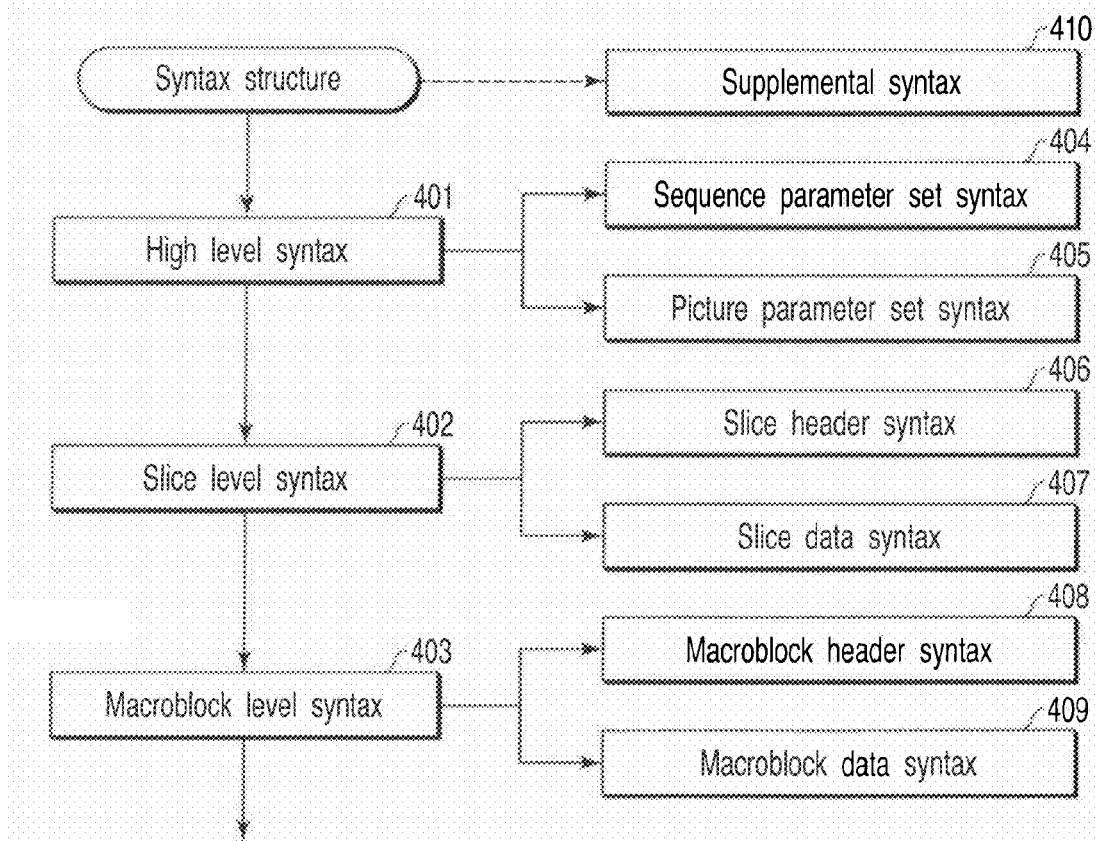
FIG. 3 is a diagram illustrating an example of a structure of syntax to use in the embodiment.

An example of a syntax structure used in the present embodiment is shown in FIG. 3.

In this syntax structure, syntax information of upper layers over the slice is described in the high-level syntax (401). The information necessary for each slice is described in slice level syntax (402). A change value of a quantization parameter or mode information necessary for each macroblock is described in macroblock level syntax (403).

Each syntax is composed of further detailed syntax. The high-level syntax (401) is composed of syntaxes of a sequence and a picture level such as sequence parameter set syntax (404) and picture parameter set syntax (405). The slice level syntax (402) is composed of slice header syntax (406), slice data syntax (407), etc. The macroblock level syntax (403) is composed of macroblock header syntax (408), macroblock data syntax (409), etc.

The above-mentioned syntaxes are components which are indispensable at the time of decoding. When these syntax information are missing, it is impossible to restore data at the time of decoding the data correctly. Meanwhile, there is supplemental syntax (410) as auxiliary syntax for multiplexing information that are not always needed at the time of decoding. The supplemental syntax is prepared as a role to send information indicating instructions for the processing that can be executed independently on the decoding side.

In the present embodiment, the sequence parameter set syntax (404) can be transmitted with the number of bits to be increased that is contained in this syntax. Each syntax is explained as follows.

ex_seq_bit_extension_flag is shown in the sequence parameter set syntax of FIG. 4. ex_seq_bit_extension_flag is a flag indicating whether bit depth increase is done. When the flag is TRUE, it allows switching of, in units of sequence, whether or not the bit depth increase is done. When the flag is FALSE, the bit depth increase is not done in the sequence.

When ex_seq_bit_extension_flag is TRUE, ex_seq_shift_bits is transmitted. ex_seq_shift_bits indicates the number of increased bits. ON/OFF of the switch E0 in the pixel bit depth increase unit 1001 shown in FIG. 2, for example, is determined by TRUE/FALSE of the flag.

ex_bit_transform_type indicating what conversion is done may be contained in the sequence parameter set syntax, and transmitted.

For example, the value BIT_EXT_TRANS indicating simple bit depth increase conversion expressed by the equation (1), GAMMA_TRANS indicating that γ conversion expressed by the equation (1-1) is done and DR_TRANS indicating that dynamic range conversion expressed by the equation (1-2) is done are written in ex_bit_transform_type.

When ex_bit_transform_type is GAMMA_TRANS, gamma_value indicating that conversion is done by what gamma value is transmitted further.

When ex_bit_transform_type is DR_TRANS, max_value and min_value indicating the maximum value and the minimum value of the pixel of the input image signal respectively are transmitted.

In the present embodiment, it is possible to utilize the data multiplexed with the supplemental syntax (410). FIG. 5 shows an example of transmitting the bit depth of an output image signal of the decoding side using the supplemental syntax. ex_sei_bit_extension_flag shown in the supplemental syntax is a flag indicating whether bit depth of an output image signal is changed. When the flag is TRUE, it indicates that the bit depth of the output image signal is changed. When the flag is FALSE, it indicates that the bit depth of the output image signal is not changed. When the flag is TRUE, further bit_depth_of_decoded_image is transmitted.

bit_depth_of_decoded_image is a value indicating bit depth of the output image signal. In the case that the image signal is decoded with a decoder having ability of decoding an image signal by performing bit depth increase or decrease on the decoding side described hereinafter, the decoder can output a decoded image of the bit depth indicated by bit_depth_of_decoded_image by increasing or decreasing the bit depth of the decoded image according to a value of bit_depth_of_decoded_image.

However, even if the image signal is decoded with the decoder having no ability of decoding the image signal by bit depth increase or decrease or the decoder has the ability, it is possible to output the decoded image with the decoded bit depth as it is without the need for outputting the decoded image of the bit depth indicated by bit_depth_of_decoded_image.

FIG. 6 shows an example of transmitting a color space of an output image signal on the decoding side using supplemental syntax 410.

ex_sei_bit_extension_flag and bit_depth_of_decoded_image are similar to the example of the above-mentioned FIG. 4.

ex_color_transform_flag shown in the supplemental syntax is a flag indicating whether the color space of the output image signal is converted. When the flag is TRUE, it indicates that the color space of each component of the output image signal is changed. Contrariwise, when the flag is FALSE, it indicates that the color space of each component of the output image signal is not changed. When the flag is TRUE, color_space_of_decoded_image is transmitted further.

color_space_of_decoded_image is a value indicating the color space of the output image signal, and has ability of decoding the image signal by performing bit depth increase or decrease on the decoding side described hereinafter.

In the case that the image signal is decoded with a decoder with ability of converting into the color space designated by a value of color_space_of_decoded_image, it is possible to output the decoded image of the bit depth indicated by bit_depth_of_decoded_image by increasing or decrease the bit depth of the decoded image according to the value of bit_depth_of_decoded_image after each component of the output image signal is converted into the color space designated by the value of color_space_of_decoded_image.

However, even if the image signal is decoded with a decoder having no ability of converting each component of the output image signal into the color space designated by the value of color_space_of_decoded_image, or the decoder has the ability, it needs not necessarily output the decoded image converted into the color space designated by the value of color_space_of_decoded_image. It is possible to convert each component into the depth indicated by bit_depth_of_decoded_image after output of the decoded image by the decoded color space as it is. Further, even if the image signal is decoded with a decoder having no ability of decoding the image signal by bit depth increase or decrease or the decoder has the ability, it is possible to output the decoded image with the decoded bit depth as it is without the need for outputting the decoded image of the bit depth indicated by bit_depth_of_decoded_image.

Figure 7A:
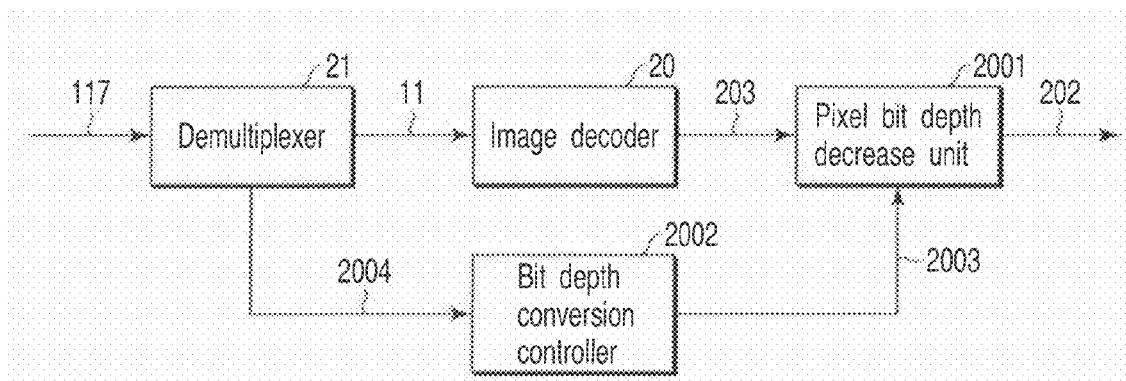
FIG. 7A is a block diagram illustrating a configuration example of an image decoding apparatus according to the embodiment.
Figure 7B:
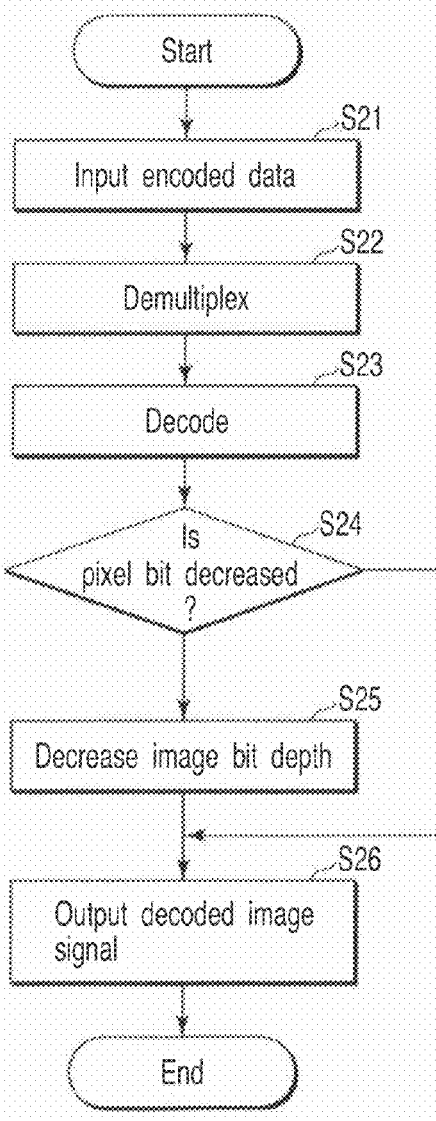
FIG. 7B is a flow chart illustrating an operation of the image decoding apparatus of FIG. 7A.

The image decoding apparatus according to the present embodiment is explained referring to FIG. 7A and FIG. 7B. As shown in diagram of 7A, this image decoding apparatus comprises a demultiplier 21 to which encoded data is input, an image decoder 20 connected to the output of the demultiplexer 21, a pixel bit depth decrease unit (pixel bit depth decrease converter) 2001 connected to the output of the image decoder 20, and a bit depth conversion controller (bit depth conversion controller) 2002 which receives bit depth increase information from the demultiplexer 21.

As shown in a flow chart of FIG. 7B, at first, the encoded data 117 encoded by the image encoding apparatus of FIG. 1A is input to the demultiplexer 21 (S21). The demultiplexer 21 demultiplexes the encoded data 117 into bit depth increase information 2004 and image encoded data 11 (S22). The bit depth increase information 2004 is input to the bit depth conversion controller 2002 and the image encoded data 11 is input to the image decoder 20. The image encoded data 11 is decoded in inverse procedure to the encoding done with the image encoder 10 to produce a bit depth increased decoded image signal 203 (S23). The bit depth increased decoded image signal 203 is input to the pixel bit depth decrease unit 2001. When the bit depth increase information 2004 is input to the bit depth conversion controller 2002, the bit depth conversion controller 2002 outputs the bit depth conversion information 2003 indicating the number of the increased bits of the bit depth of decoded image and information necessary for conversion.

Figure 8:
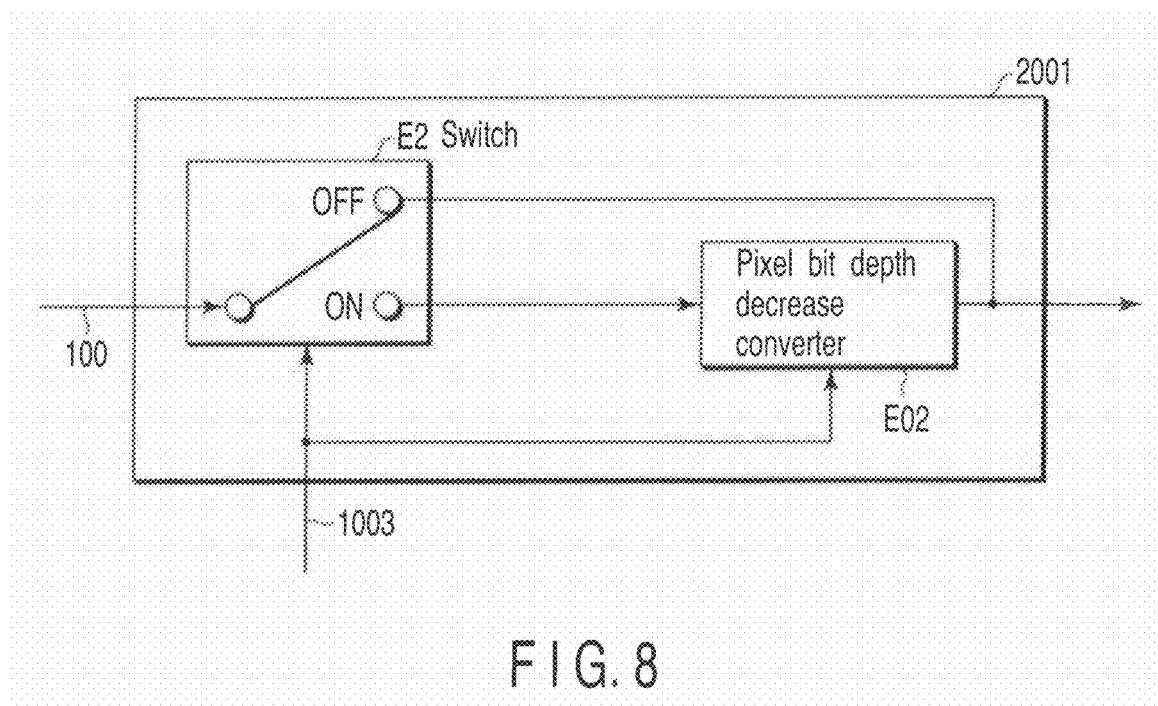
FIG. 8 is a block diagram illustrating a configuration of pixel bit depth decrease unit of FIG. 7.

In the pixel bit depth decrease unit 2001 as shown in FIG. 8, it is selected with the switch E2 whether the bit depth of each pixel of the input image signal 100 of N bit depth is decreased based on the bit depth conversion information 2003 (S24). When it is decreased, the switch E2 is connected to the ON side, and when it is not increased, it is connected to the OFF side. When the switch E2 is connected to ON, the image signal is input to the pixel bit depth decrease converter E02, whereby the pixel bit depth conversion is done as described hereinafter (S25). When the switch E2 is connected to OFF, the image signal is not subjected to pixel bit depth conversion but output as it is. For example, when ex_seq_bit_extension_flag is TRUE and the bit depth of each pixel is increased, the switch is connected to the ON side, and when it is FALSE, the switch is connected to the OFF side.

The bit conversion information 2003 includes ex_seq_shift_bits and x_bit_transform_type. When ex_seq_shift_bits indicates M bits increase of bit depth, and x_bit_transform_type indicates BIT_EXT_TRANS corresponding to conversion of the equation (1), the value of each pixel of the bit depth increased decoded image signal 203 input to the pixel bit depth decrease unit 2001 is decreased by M bits.

For example, when the bit depth of a certain pixel of the bit depth increased decoded image signal 203 is decreased by M bits, the pixel value k' after decrease of M bits is calculated according to the following equation (2).

$$K'=(K+\text{offset})>>M$$

$$\text{offset}=(1<<(M-1)) \quad (2)$$

This is an example of a method for decreasing the bit depth of the pixel value using rounding. The decrease conversion method may be any conversion method if the bit depth is decreased so that offset is set to any value of $0-(1<<M)$.

The bit conversion information 2003 includes ex_seq_shift_bits and x_bit_transform_type. When ex_seq_shift_bits indicates M bits increase of bit depth, x_bit_transform_type indicates GAMMA_TRANS corresponding to gamma conversion of the equation (1-1). When gamma_value indicates a gamma value γ, the value of each pixel of the bit depth increased decoded image signal 203 input to the pixel bit depth decrease unit 2001 is decreased by M bits. For example, when the bit depth of a certain pixel of the bit depth increased decoded image signal 203 is K, the pixel value k' after decrease of M bits is calculated according to the following equation (2-1).

$$K'=\text{INT}[\{K/((1<<M)-1)\}^{1/\gamma}((1<<N)-1)]+\text{offset}] \quad (2-1)$$

The bit conversion information 2003 includes ex_seq_shift_bits, x_bit_transform_type and min_value, maxvalue. When ex_seq_shift_bits indicates M bits increase of bit depth, x_bit_transform_type indicates DR_RRANS corresponding to dynamic range conversion of the equation (1-1), min_value indicates that the minimum value of the pixel of the input image is Min, and maxvalue indicate that the minimum value of the pixel of the input image is Max, the value of each pixel of the bit depth increased decoded image signal 203 input to the pixel bit depth decrease unit 2001 is decreased by M bits.

If the bit conversion information 2003 includes ex_seq_shift_bits indicating M bits increase of bit depth, and the color space of the decoded image signal is a color space different from the color space designated by color_space_of_decoded_image designated in the supplemental syntax shown in, for example, FIG. 5, the bit depth is decreased by M bits after each pixel of each component of the decoded image is converted into the color space designated by color_space_of_decoded_image.

For example, when the bit depth of a certain pixel of the bit depth increased decoded image signal 203 is K, the pixel value K' after decrease of M bits is calculated according to the following equation (2-2).

$$K'=\text{INT}[[\{(K-(\text{Min}<<M))/((\text{Max}-\text{Min})<<M)\}^{1/\gamma}\times((1<<N)-1)]+\text{offset}] \quad (2-2)$$

INT shows processing to do rounding in integer, the offset in the equations (2-1) and (2-2) indicates an offset when rounding is performed, and is any value of 0-1.

The bit conversion information 2003 includes ex_seq_shift_bits. ex_seq_shift_bits indicates M bits increase of bit depth. If the color space of the decoded image signal is a color space different from a color space designated by color_space_of_decoded_image specified in the supplemental syntax shown in FIG. 5, for example, each pixel of each component of the decoded image is converted into a color space designated by color_space_of_decoded_image, and then the bit depth is decreased by M bits. For example, when the R, G, B of the input image are converted into Y, Co, Cg and encoded, and R, G, B are designated by color_space_of_decoded_image, each of the pixels Y, Co, Cg of each component of the decoded image is subjected to bit decrease and color space conversion according to the equation (2-3) whereby the pixels of each component are converted into R, G, B respectively.

$$t=(Y-((Cg-(1<<(N+M-1)))>>1))$$

$$G'=\text{Clip1}y(t+(Cg-(1<<(N+M-1))))$$

$$B'=\text{Clip1}y(t-((Co-(1<<(N+M-1)))>>1))$$

$$R'=\text{Clip1}y(B'+(Co-(1<<(N+M-1))))$$

$$\text{offset}=(1<<(M-1))$$

$$R=(R'+\text{offset})>>M$$

$$G=(G'+\text{offset})>>M$$

$$B=(B'+\text{offset})>>M \quad (2-3)$$

Clip1y (A) expresses a process of outputting A as it is when A satisfies $0<A<(1<<(N+M))$, outputting 0 if $A<0$, and outputting $(1<<(N+M))-1$ if $A>(1<<(N+M))-1$. This is an example of a method for decreasing the pixel value to the bit depth decreased by M bits using rounding. This decrease conversion method may be any conversion method if it is a method for decreasing the bit such as setting, for example, the offset to any value of 0 to $(1<<M)$.

This embodiment shows an example of designating the color space of a decoded image signal by color_space_of_decoded_image designated in the supplemental syntax. However, even in the case where such designation is not done or the color space of the decoded image signal is designated in high-level syntax 401 similarly to the example shown by the supplemental syntax, when color transform processing is done in the process of outputting an decoded image, the pixel value may be decrease to a bit depth decreased by M bits after having done color transform processing. The color conversion shown herein is an example, and if it is processing for performing the color conversion, what processing may be done.

The decrease conversion shown in the above is an example, and if it is a method for decreasing the bit depth, what decrease conversion is available.

As described above, the decoded image 202 of the same N bit depth as the input image input to the image encoding apparatus is output with the pixel bit depth decrease unit 2001 (S25).

According to the above-mentioned configuration, image coding and image decoding can be done with a bit depth higher than the bit depth of the input image by M bits, whereby the encoding efficiency can be improvised.

Second Embodiment

There will be described configuration of an image encoding apparatus for video encoding related to the second embodiment referring to FIG. 9A. As shown in FIG. 9, this image encoding apparatus comprises a pixel bit depth increase unit (pixel bit depth converter) 1001, a bit depth conversion controller (bit depth conversion controller) 1002, a subtracter 101, an orthogonal transformer 104, a quantizer 106, a dequantizer 109, an inverse orthogonal transformer 110, an adder 111, a loop filter 113, a frame memory 114, a prediction image generator 115, and an entropy encoder 108. The output of the pixel bit depth increase unit 1001 receiving an input image signal is connected to the entropy encoder 108 through the subtracter 101, orthogonal transformer 104 and the quantizer 106. The output of quantizer 106 connected to the prediction image generator 115 through the dequantizer 109, the inverse orthogonal transformer 110, the adder 111, the loop filter 113, and the frame memory 114. The prediction image signal from the prediction image generator 115 is input to the subtracter 101 and the adder 111, the motion vector/prediction mode information from the prediction image generator 115 is input to the entropy encoder 108. A bit depth conversion controller 1002 inputs bit conversion information to the pixel bit depth increase unit 1001 and the bit depth increase information is input to the entropy encoder 108.

There will now be described an operation of the image encoding apparatus of the above-mentioned configuration referring to a flow chart of FIG. 9B. When a video signal is input to the image encoding apparatus as the input image signal 100 in units of a frame, for example (S31), the pixel bit depth increase unit 1001 carries out processing for increasing a value of each pixel of the input image signal 100 of N bit depth to a (N+M) bit depth larger than N bits by M bits (S32). For example, when a value of a certain pixel of the input image signal is assumed to be K, the value K' of the pixel after M bits increase is calculated by, for example, the equations (1-1), (1-2) and (1-3).

The conversion information such as the number of bits (M) to be increased is led to the entropy encoder 108 as bit depth increase information 1003 with the bit depth conversion controller 1002 (S33). The configuration of FIG. 2 may be taken as a configuration example of the pixel bit depth increase unit 1001. Control processing may be performed by changing by a flag whether the bit depth of each pixel should be increased similarly to the first embodiment.

The subtracter 101 calculates a difference between the input image signal 100 whose bit depth is increased to a (N+M) bit depth and the prediction image signal 102 generated with the (N+M) bit depth to generate the prediction error signal 103 of the (N+M) bit depth (S34). The generated prediction error signal 103 is subjected to orthogonal transform (for example, discrete cosine transform (DCT)) with the orthogonal transformer 104 (S35). The orthogonal transformer 104 generates orthogonal transform coefficient information 105 (for example, DCT coefficient information). The orthogonal transform coefficient information 105 is quantized with the quantizer 106, and quantized orthogonal transform coefficient information 107 is input to the entropy encoder 108 and the dequantizer 109. The dequantizer 109 and inverse orthogonal transformer 110 subject the quantized orthogonal transform coefficient information 107 to inverse processes to those of the quantizer 106 and orthogonal transformer 104 sequentially, that is, to local decoding to convert it into a signal similar to the prediction error signal, namely, a local decoded error signal. The adder 111 adds this local decoding error signal to the image signal 102 of the (N+M) bit depth to generate a local decoded image signal 112 of the (N+M) bit depth. In other words, the quantized orthogonal transform coefficient information 107 is local-decoded (S36). The local decoded image signal 112 is filtered with the loop filter 113 as needed, and then stored to the frame memory 114.

The prediction image generator 115 generates a prediction image signal of the (N+M) bit depth based on certain prediction mode information from the input image signal 100 whose bit depth is increased to the (N+M) bit depth and the local decoded picture signal 112 of the (N+M) bit depth stored in the frame memory 114. In this time, the local decoded picture signal 112 of the (N+M) bit depth from the adder 111 is saved in the frame memory 114 temporarily. A motion vector is detected by matching (for example, blockmatching) between the input image signal 100 of the (N+M) bit depth and the local decoded image signal 112 of the (N+M) bit depth saved in the frame memory 114 for every block in the frame (S37). A prediction image signal of the (N+M) bit depth is generated using the local decoded image signal of the (N+M) bit depth compensated by this motion vector (S38). The prediction image signal 102 of the (N+M) bit depth generated is output together with motion vector information/prediction mode information 116 of the selected prediction image signal from the prediction image generator 115.

The entropy encoder 108 entropy-encodes the quantized orthogonal transform coefficient information 107, motion vector information/prediction mode information 116 and bit depth increase information 1003 (S39). The encoded data 117 generated in this way is sent to a transmission system or storage system.

The method of encoding the number ob bits M to be increased is similar to the first embodiment. In the present embodiment, it is possible to use data multiplexed with supplemental syntax similarly to the first embodiment.

Figure 10B:
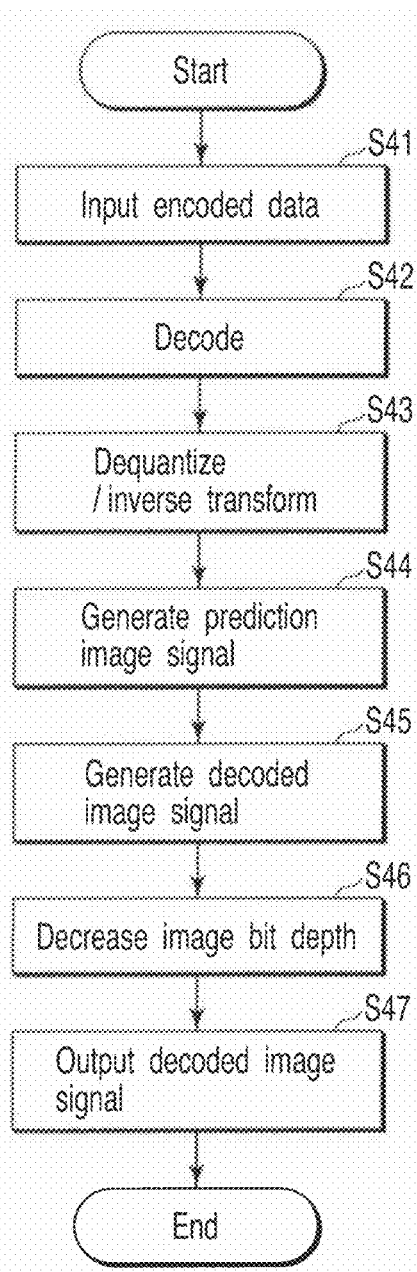
FIG. 10B is a flow chart illustrating an operation of the image decoding device behavior of FIG. 10A.

There will be described the configuration of the image decoding apparatus according to the present embodiment referring to FIG. 10A. This image decoding apparatus comprises an entropy decoder 200, a dequantizer 109, an inverse orthogonal transformer 110, an adder 111, a loop filter 113, a frame memory 114, a prediction image generator 115, a pixel bit depth decrease unit (pixel bit depth converter) 2001, a bit depth conversion controller (bit depth conversion controller) 2002. The coefficient information output of the entropy decoder 200 receiving encoded data is connected to the pixel bit depth decrease unit 2001 through the dequantizer 109, the inverse orthogonal transformer 110, the adder 111, and the loop filter 113. The output of the loop filter 113 is connected to one input of the prediction image generator 115 through the frame memory 114. The other input of the prediction image generator 115 receives the motion vector/prediction mode information from the prediction image generator 115. The output of the prediction image generator 115 is connected to the adder 111. The bit depth increase information output of the entropy decoder 200 is connected to the pixel bit depth decrease unit 2001 through the bit depth conversion controller 2002.

There will now be described an operation of the image decoding apparatus with reference to FIG. 10 B. When the encoded data 117 encoded with the image encoding apparatus of FIG. 9A is input to the image decoding apparatus (S41), the entropy decoder 200 decodes the coded data 117 according to an inverse procedure to the entropy encoding (S42) to provide the quantized orthogonal transform coefficient information 107, motion vector/prediction mode information 116, and bit depth increase information 2004.

The dequantizer 109 and inverse orthogonal transformer 110 subject the quantization orthogonal transform coefficient information 107 to inverse processes to those of the quantizer 106 and orthogonal transformer 104 sequentially to convert it into a residual signal 201 of the (N+M) bit depth (S43). The motion vector/prediction mode information 116 is input to the prediction image generator 115, and the prediction image signal 102 of the (N+M) bit depth based on the motion vector/prediction mode information 116 is generated from the bit depth increased decoded image signal 203 of the (N+M) bit depth stored in the frame memory 114 (S44). The adder 111 adds the residual signal 201 of (N+M) bit depth to the prediction image signal 102 of (N+M) bit depth to generate a decoded image signal (S45). The loop filter 113 filters this decoded image signal as needed, outputs a bit depth increased decoded image signal 203 of the (N+M) bit depth, and store it in the frame memory 114. When the bit depth increase information 2004 output from the entropy decoder 200 is input to the bit depth conversion controller 2002, the bit depth conversion controller 2002 outputs bit depth conversion information 2003 indicating whether the decoded image is increased by how many bits.

The bit depth increased decoded image signal 203 input to the pixel bit depth decrease unit 2001 is subjected to the processing similar to the first embodiment based on the bit depth conversion information 2003, for example, according to the equation (2) or the equations (2-1), (2-2), (2-3), to decrease by M bits a value of each pixel (46). The pixel bit depth decrease unit 2001 is configured as shown in FIG. 8, and may perform a control to change by a flag whether the bit depth of each pixel is decreased, similarly to the first embodiment.

As described above, the decoded image signal 202 of the same N bit depth as that of the input image input to the image encoding apparatus is output from the pixel bit depth decrease unit 2001 (S47).

According to the above-mentioned configuration, since the prediction image signal is generated with the bit depth higher than that of the input image signal by M bits, the precision of a filter for motion compensation, a loop filter, an intra-prediction, etc. can be improved. As a result, the prediction error signal can be decreased, so that the encoding efficiency can be improved.

Third Embodiment

Configuration of the image encoding apparatus for video encoding according to the third embodiment of the present invention is shown in FIG. 11A. This image encoding apparatus is a configuration approximately similar to the configuration example shown in the second embodiment (FIG. 9), but differs from the second embodiment in the points of providing the pixel bit depth converter 1005 on the previous stage of the frame memory 114 and the pixel bit depth converter (pixel bit depth converter) 1006 on the rear stage of the frame memory 114.

Figure 11B:
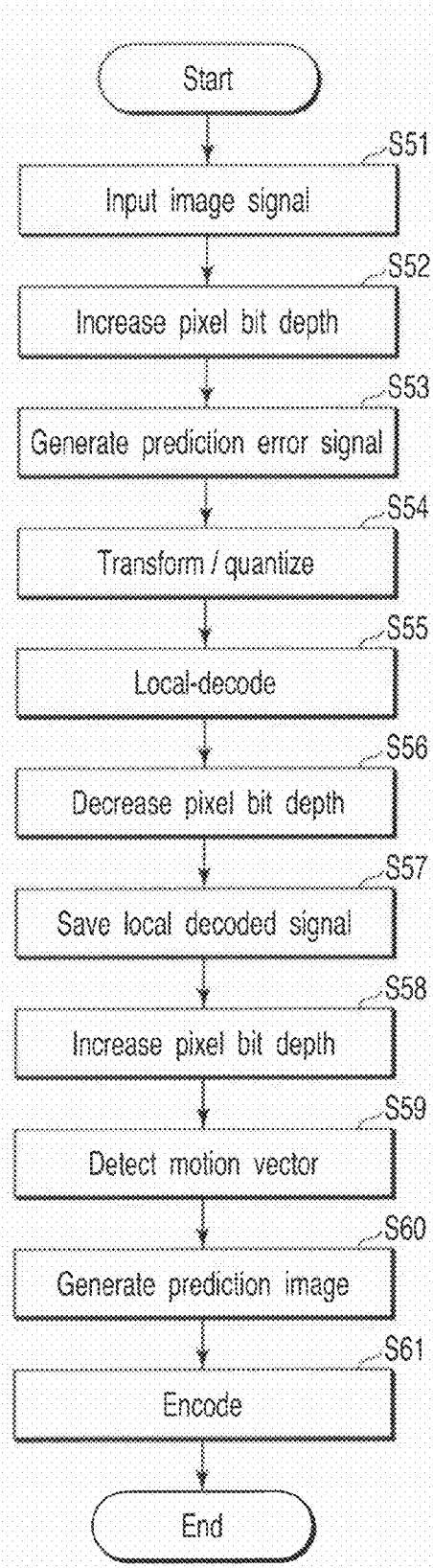
FIG. 11B is a flow chart illustrating an operation of the image coding apparatus of FIG. 11A.

There will now be described an operation of this image encoding apparatus with reference to FIG. 11B. A video signal is input to this image encoding apparatus as the image signal 100 in units of a frame, for example (S51). The pixel bit depth increase unit (pixel bit depth converter) 1001 does processing for increasing a value of each pixel of the input image signal 100 of N bit depth to (N+M) bit depth larger than N bits by M bits (S52). The bit depth conversion controller 1002 supplies the increased number of bits N to the entropy encoder 108 as bit depth increase information 1003. The pixel bit depth increase unit 1001 is configured as shown FIG. 2, and may control the pixel bit depth by changing by a flag whether the bit depth of each pixel is increased, similarly to the first embodiment.

The subtracter 101 calculates a difference between the input signal whose bit depth is increased to the (N+M) bit depth and the prediction image signal 102 generated with the (N+M) bit depth to generate a prediction error signal 103 of the (N+M) bit depth (S53). The generated prediction error signal 103 is subjected to orthogonal transformation (for example, DCT (DCT)) with the orthogonal transformer 104. The orthogonal transformer 104 provides orthogonal transform coefficient information 105 (for example, DCT coefficient information). The orthogonal transform coefficient information 105 is quantized with the quantizer 106. In other words, the prediction error signal 103 is orthogonal-transformed and quantized (S54). The quantized orthogonal transform coefficient information 107 is led to the entropy encoder 108 and inverse quantizer 109.

The dequantizer 109 and inverse orthogonal transformer 110 subject the quantized orthogonal transform coefficient information 107 to inverse processes to those of the quantizer 106 and orthogonal transformer 104 sequentially to convert it into a local decoded error signal. The adder 111 adds the local decoded error signal to the prediction image signal 102 of the (N+M)bit depth. As a result, a local decoded picture signal 112 of the (N+M) bit depth is generated. In other words, the quantized orthogonal transform coefficient information 107 is local-encoded (S55).

The local decoded picture signal 112 of the (N+M) bit depth is filtered by the loop filter 113 as needed, and then input to the pixel bit depth converter 1005 to decrease the value of each pixel to a value decreased by L bits or enlarge the value of each pixel to a value increased by L bits (S56). For example, when a value of a certain pixel of the local decoded picture signal 112 of the (N+M) bit depth is k, the pixel value k decreased by L bits is calculated as follows:

$$K'=(K+\text{offset})\!>\!>L$$

$$\text{offset}=(1\!<\!<(L-1)) \quad\quad\quad (3)$$

where the number of bits to be decreased is an integer to satisfy L≤M. The bit depth of each pixel of the local decoded picture signal 112 becomes (N+M−L) bits due to decrease of the bit depth. The decrease conversion method used herein may be what conversion method if it is a method of decreasing the bit depth such as a method of setting, for example, offset to any value of 0 to (1<<L).

Another conversion method is explained. FIG. 11C shows a histogram of a pixel value in units of an encoding image (the left side) and a histogram after bit depth conversion (the right side). When the local decoded image 112 increased to 12 bits, for example, is decreased to an image of 8 bit depth as shown in FIG. 1C, the dynamic range D=(mb_max−mb_min) of the local decoded image increased to 12 bit depth is calculated from the maximum mb_max and the minimum mb_min of the pixel value for every arbitrary encoding unit such as macroblock unit. If this dynamic range D is a range represented in 8 bits, that is, a range of 0-255, the block is converted to 8 bits, and is output to the frame memory 114. At this time, the representative value determined using the maximum mb_max and/or minimum mb_min of the pixel value of this block is output to the frame memory 114. When the dynamic range D is a value which cannot be expressed by 8 bits, the block is converted to 8 bits after it is subjected to subtraction processing of shifting the block to the right by 2 bits. At this time, the block is output to the frame memory 114 along with the shift amount Q_bit=2 and the representative value. When the dynamic range further increases, the block converted to 8 bits is output to the frame memory 114 along with the shift amount Q_bit=4 and the representative value as shown in FIG. 11C.

When the above mentioned method is explained more in detail, as shown in FIG. 11C, the maximum mb_max and minimum mb_min of the pixel value in the local decoded picture signal 112 are obtained for every arbitrary encoding unit such as macroblock unit, and the number of bits Q_bit to be decreased according to the dynamic range D=(mb_max−mb_min) is changed using the equation (3-1).

In this case, the pixel bit depth converter 1005 has a configuration as shown in FIG. 1D, and at first the maximum mb_max and minimum mb_min of the pixel value in the local decoded picture signal 112 are obtained with the dynamic range calculator 10051, and the dynamic range D=(mb_max−mb_min) is obtained.

Subsequently, the shift amount/representative value calculator 10052 calculates a shift amount Q_bit according to the dynamic range D using, for example, the equation (3-1 a). Further, for example, mb_min is set as the representative value.

$$Q\_bit = \log 2(D) - (N+M-L-1) \quad (3\text{-}1a)$$

Further when a value of a certain pixel of the bit depth increased decoded image signal is k, a pixel bit depth converter 10053 calculates a pixel value K' after L bits (L>0) decrease as described hereinafter, and outputs the converted local decoded picture signal 112 and the representative value mb_min/shift amount Q_bit (representative value/shift amount 10054) to the frame memory 114.

$$Offset = (1 << (Q\_bit - 1))$$

$$K' = (K - mb\_min + Offset) >> Q\_bit \quad (3\text{-}1b)$$

Figure 11F:
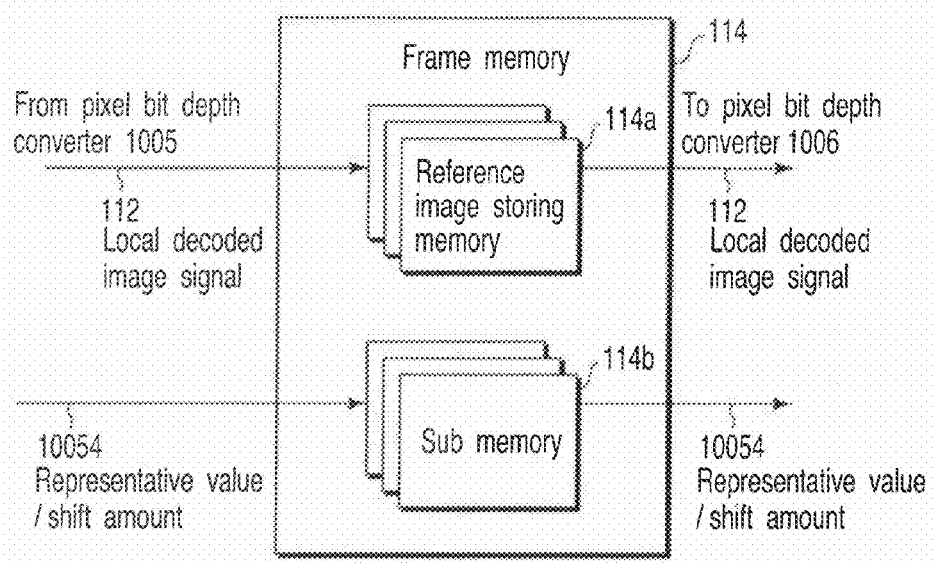
FIG. 11F is a block diagram illustrating an example of a configuration of a frame memory of FIG. 11A.

In this time, for example, the frame memory 114 comprises memories 114a to store reference images and sub memories 114b to store information indicating how bit depth is converted for every encoding unit (macroblock unit) of each reference image as shown in FIG. 11F. The sub memory 114b saves, for example, the representative value mb_min and the shift amount Q_bit.

It is considered that the equation (2) is used when the decoded image signal is acquired by converting the bit depth increased decoded image signal provided with the N+M bit depth on the decoding side. At this time, when the local decoded picture signal of a (N+M−L) bit depth converted using the (3-1) equation is stored in the frame memory and the local decoded picture signal increased to the N+M bit depth is read from the frame memory in an inverse procedure to the (3-1) equation, the obtained local decoded picture signal of the N+M bit depth may have a value different from the local decoded picture signal obtained by converting directly by the equation (2) the local decoded image signal before being converted into N+M−L bits. The conversion equations considering this are the following equations (3-2)-(3-6).

At first, the dynamic range calculator 10051 calculates the maximum mb_max and minimum mb_min of the pixel values in the local decoded picture signal 112 for every arbitrary encoding unit such as macroblock unit to obtain the dynamic range D=(mb_max−mb_min) thereof.

Next, the shift amount/representative value calculator 10052 calculates the temporary number of bits Q_bit to be decreased according to the dynamic range D and an offset value Offset used for performing shift operation with Q_bit, using the equation (3-2).

$$mb\_min = INT(mb\_min >> L)$$

$$D = mb\_max - (mb\_min << L)$$

$$Q\_bit = \log 2(D) - (N+M-L--1)$$

$$Offset = (1 << (Q\_bit - 1)) \quad (3\text{-}2)$$

Subsequently, when the value of Q_bit is not 0, it is determined whether the following conditional expression (3-3) is satisfied.

$$D + Offset > (1 << N+M-L+Q\_bit) - 1 - Offset \quad (3\text{-}3)$$

If the inequality expression (3-3) is not satisfied, Q_bit is incremented by 1 and the offset value Offset is recalculated anew as shown in the equation (3-4).

$$Q\_bit = Q\_bit + 1$$

$$Offset = (1 << (Q\_bit - 1)) \quad (3\text{-}4)$$

If the value of Q_bit is 0 or L, Q_bit and Offset of the equation (3-2) are used as it is.

At the last, when a value of a certain pixel of the bit depth increased decoded image signal is K, the pixel bit depth converter 10053 calculates a pixel value K' after L bits (L>0) decrease as described hereinafter and outputs the converted local decoded picture signal 112 and the representative value mb_min/shift amount Q_bit (representative value/shift amount 10054) to the frame memory 114.

If Q_bit is 0 or L, $$K' = (K - (min\_mb << L) + Offset) >> Q\_bit \quad (3\text{-}5)$$

If Q_bit is not 0 or L, $$K' = (K - (min\_mb << L) + 2*Offset) >> Q\_bit \quad (3\text{-}6)$$

In this time, the frame memory 114 has sub memories 114b for storing information indicating how the bit depth is converted for every encoding unit of each frame, and saves, for example, the representative value mb_min and the shift amount Q_bit therein.

When each pixel value is decrease-converted to a value decreased by L bits in consideration with the dynamic range of each pixel for every encoding unit such as a macroblock unit using the equation (3-1) or the equations (3-2) to (3-6) as described above, a rounding error occurring due to the shift operation at the time of decrease can be decreased in comparison with the case of decrease-converting to a value decreased by L bits simply as the equation (3), and the reference image signal can be saved in the frame memory with maintaining the precision more.

In the embodiment, the representative value is assumed to be the minimum mb_min of the pixel value, but it may be another value, and it may be a value to be fixed by the maximum mb_max and minimum mb_min of the pixel values.

Conversely, in the case that the value of each pixel is increase-converted to a value increased by (−L) bits, for example, when a value of a certain pixel of the bit depth increased decoded image signal is K, the pixel value K' after (−L) bits increase is calculated as follows.

$$K'=K<<(-L) \quad (4)$$

Figure 12:
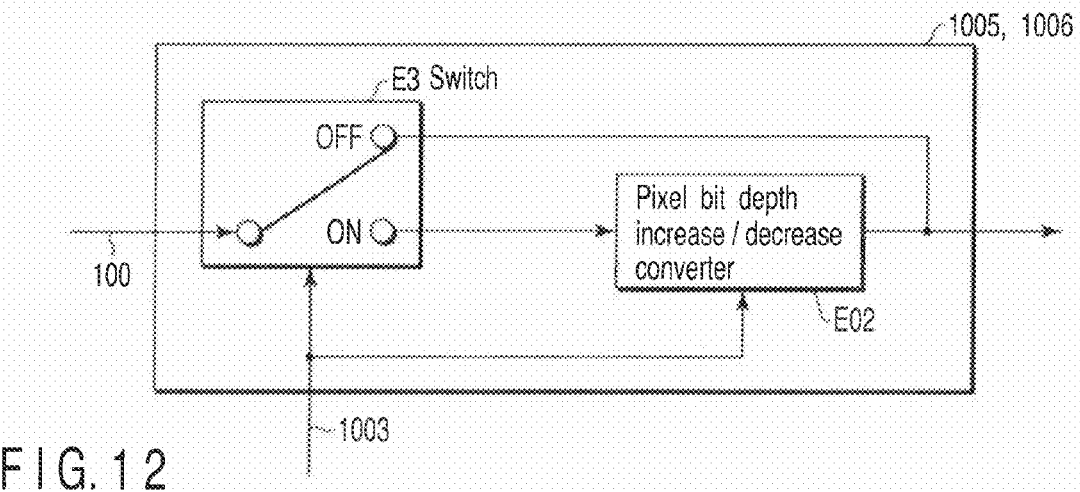
FIG. 12 is a block diagram illustrating a configuration of the pixel bit depth converter of FIG. 11.

The number of bits L to be increased is an integer to satisfy 0<(−L). The bit depth of each pixel of the local decoded picture signal 112 becomes (N+M−L) bits due to increase of the bit depth. A configuration example of the pixel bit depth converter 1005 is shown in FIG. 12. It is chosen by a switch E3 based on the bit depth increased information 1003 whether the bit depth of each pixel of the input image signal 100 of the N bit depth is increased. When it is increased, the switch E3 is connected to the ON side, and when it is not increased, it is connected to the OFF side. When the switch E3 is ON, the image signal input to the pixel bit depth converter 1005 inputs to a pixel bit depth increase/decrease converter E03 to be converted to a pixel bit depth. When the switch E3 is OFF, the image signal is not converted into a pixel bit depth and is output as it is. As thus described, the local decoded picture signal 112 whose bit depth is decreased or increased is stored in the frame memory 114 (S57). The local decoded picture signal 112 of the (N+M−L) bit depth which is stored in the frame memory 114 is led to the pixel bit depth converter 1006 before input to the prediction image generator 115, and when L>0, the bit depth of each pixel is increased to the bit depth increased by L bits (S58). For example, when a value of a certain pixel of the local decoded picture signal 112 of the (N+M−L) bit depth is K, the bit pixel value K' after L bits increase is calculated, for example, as follows.

$$K'=K<<L \quad (5)$$

Also, as another conversion method, the maximum mb_max and minimum mb_min of pixel values of the local decoded picture signal 112 are obtained for every arbitrary encoding unit such as macroblock as shown in FIG. 11C. When the number of bits Q_bit decreasing according to the dynamic range D=(mb_max−mb_min) is changed using an equation expressed in the equation (3-1), the pixel bit depth converter 1006 uses a configuration as shown in FIG. 11E, wherein the shift amount/representative value reader 10061 reads the representative value mb_min and the shift amount Q_bit (representative value/shift amount 10054) in encoding unit from the sub memory 114b in the frame memory 114, and the pixel bit depth converter 10062 calculates a pixel value K' after L bits increase of the bit depth by using, for example, the following equation.

$$K'=(K<<Q\_bit)+mb\_min \quad (5\text{-}1)$$

Also, as still another conversion method, when the number of bits is changed using equations expressed by the equations (3-2) to (3-6), the shift amount/representative value reading unit 10061 reads mb_min and Q_bit of the encoding unit from sub memory in the frame memory 114, the pixel bit depth converter 10062 calculates the pixel value k' after L bits increase of the bit depth by using, for example, the following equation.

If Q_bit is 0 or L $$K'=(K<<Q\_bit)+(mb\_min<<L)$$

If Q_bit is not 0 or L $$K'=(K<<Q\_bit)+(mb\_min<<L)-(1<<(Q\_bit-1)) \quad (5\text{-}2)$$

In contrast, when L<0, the bit depth of each pixel is decrease-converted to a value decreased by (−L).

For example, when a value of a certain pixel of the bit depth increased decoded image signal is k, the pixel value k' after (−L) bits decrease is calculated, for example, as follows.

$$K'=(K+\text{offset})>>(-L)$$

$$\text{offset}=(1<<(-L-1)) \quad (6)$$

The decrease conversion method used herein may be what kind of conversion method if it is a method of decreasing the bit depth so as to set the offset to any value of 0 to (1<<(−L)). The pixel bit depth converter 1006 is made to have a configuration shown in FIG. 12 similarly to the pixel bit depth converter 1005, and may do a control to change by a flag whether the bit depth of each pixel is converted. The bit depth of the local decoded picture signal 112 output to the predictive image generator 115 becomes the (N+M) bit depth by doing such a conversion.

The bit depth L to be decreased/increased before and after the frame memory 114 is an integer satisfying L≤M, and the number of bits to be decreased/increased before and after the frame memory 114 has only to be identical. When L=0, the bit depth increase/bit depth decrease is not done in storing in the frame memory or outputting from the frame memory 114. The conversion performed with the pixel bit depth converter 1005 and the pixel bit depth converter 1006 is not limited to the above-mentioned equations (3) to (6). If it is conversion by which only the designated bit depth is increased/decreased, any kind of conversion may be done. This number of bits L is led to the entropy encoder 108 as bit depth increase information 1003 with the bit depth conversion controller 1002.

The prediction image generator 115 generates a prediction image signal of the (N+M) bit depth based on certain prediction mode information from the input image signal 100 whose bit depth is increased to the (N+M) bit depth and the local decoded picture signal 112 of the (N+M) bit depth. In doing so, matching (block matching) between the input image signal 100 of the (N+M) bit depth and the local decoded picture signal 112 increased to the (N+M) bit depth are done to detect a motion vector (S59). A prediction image signal of the (N+M) bit depth is created using the local image signal of the (N+M) bit depth which is compensated by this motion vector (S60). The prediction image signal 102 of the (N+M) bit depth generated here is output from the prediction image generator 115 together with motion vector information/prediction mode information 116 of the selected prediction image signal.

The entropy encoder 108 entropy-encodes the quantized orthogonal transform coefficient information 107, the motion vector information/prediction mode information 116 and the bit depth increase information 1003 (S61). The encoded data 117 generated thereby is send to the transmission system or storage system not shown.

Figure 13:
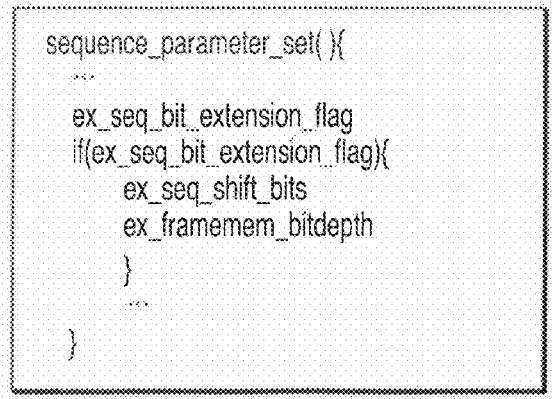
FIG. 13 is a diagram illustrating a structure of sequence parameter set syntax to use in the embodiment.

Subsequently, a method of encoding the number of bits M and L will be explained. An example of a structure of syntax employed in the present embodiment is similar to FIG. 3 used in the first embodiment. This present embodiment can transmit the number of bits to be increased including sequence parameter set syntax (404), picture parameter set syntax (405), slice level syntax (402) and macroblock level syntax (403). Respective syntaxes will be explained hereinafter.

ex_seq_bit_extension_flag shown in the sequence parameter set syntax of FIG. 13 is a flag indicating whether bit depth increase is done. When the flag is TRUE, it can be changed in units of a sequence whether bit depth increase is done. Contrariwise, when the flag is FALSE, the bit depth increase is not done in the sequence.

When ex_seq_bit_extension_flag is TRUE, ex_seq_shift_bits indicating whether how many bits are further increased may be transmitted.

When ex_seq_bit_extension_flag is TRUE, ex_framemem_bitdepth indicating the bit depth when it is stored in the frame memory 114 may be transmitted further.

In the present embodiment, for example, N+M−L is stored in ex_framemem_bitdepth, and is transmitted. In the present embodiment, it is possible to change whether bit depth increase is done in arbitrary encoding unit and to change the number of bits to be increased. In this case, the number of bits to be increased can be transmitted with being included in the picture parameter set syntax (405), the slice level syntax (402) and the macroblock level syntax (403).

ex_pic_bit_extension_flag shown in the picture parameter set syntax of FIG. 4 is a flag indicating whether it is changed whether the bit depth increase is done for each picture. When the flag is TRUE, it is possible to change whether the bit depth increase is done in units of a picture. Contrariwise, when the flag is FALSE, it is impossible to change whether the bit depth increase is done in units of a picture for each picture.

When ex_pic_bit_extension_flag is TRUE, ex_pic_shift_bits indicating whether how many bits are increased is transmitted further. When the number of bits to be increased in a sequence level is designated by ex_seq_shift_bits in the sequence parameter syntax, ex_pic_shift_bits may be prioritized as the number of bits to be increased, ex_seq_shift_bits may prioritized as the number of bits to be increased, and ex_seq_shift_bits+ex_pic_shift_bits may prioritized as the number of bits to be increased. It is preferable to decide beforehand which is given priority to.

There may be flags such as ex_bit_extension_in_slice_flag and ex_bit_extension_in_mb_flag in the picture parameter set syntax. These flags are flags indicating, respectively, whether there is a flag changing whether the bit is increased at a slice level or a macroblock level.

As shown in FIG. 15, when ex_bit_extension_in_slice_flag is TRUE in the slice level syntax, ex_slice_shift_bits is transmitted. Accordingly, it is possible to transmit the number of bits to be increased in units of a slice by switching it. When the number of bits S to be increased by the sequence parameter set syntax and picture parameter syntax is already designated, S may be prioritized as the number of bits to be increased, ex_slice_shift_bits may be prioritized as the number of bits to be increased, or S+ex_slice_shift_bits may be prioritized as the number of bits to be increased. It is preferable to decide beforehand which is given priority to. Contrariwise, when ex_bit_extension_in_slice_flag is FALSE, ex_slice shift_bits is not transmitted.

In the macroblock level syntax as shown in FIG. 16, when ex_bit_extension_in_mb_flag is TRUE, ex_mb_shift_bits is transmitted. Accordingly, it is possible to transmit the number of bits to be increased in units of a macroblock by switching. When the number of bits S to be increased by the sequence parameter set syntax, picture parameter syntax or slice level syntax is already designated, S may be prioritized as the number of bits to be increased, ex_mb_shift_bits may be prioritized as the number of bits to be increased, or S+ex_mb_shift_bits may be prioritized as the number of bits to be increased. It is preferable to decide beforehand which is given priority to. Contrariwise, when ex_bit_extension_in_mb_flag is FALSE, ex_slice_shift_bits is not transmitted.

As above described, when it is changed whether bit depth increase is done in arbitrary encoding unit, or when the number of bits to be increased is changed, L is established so that the bit depth of the local decoded picture signal stored in the frame memory 114 becomes ex_framemem_bitdepth shown in the sequence parameter set syntax.

In the present embodiment, data multiplexed with the supplemental syntax can be used similarly to the first embodiment.

Figure 17A:
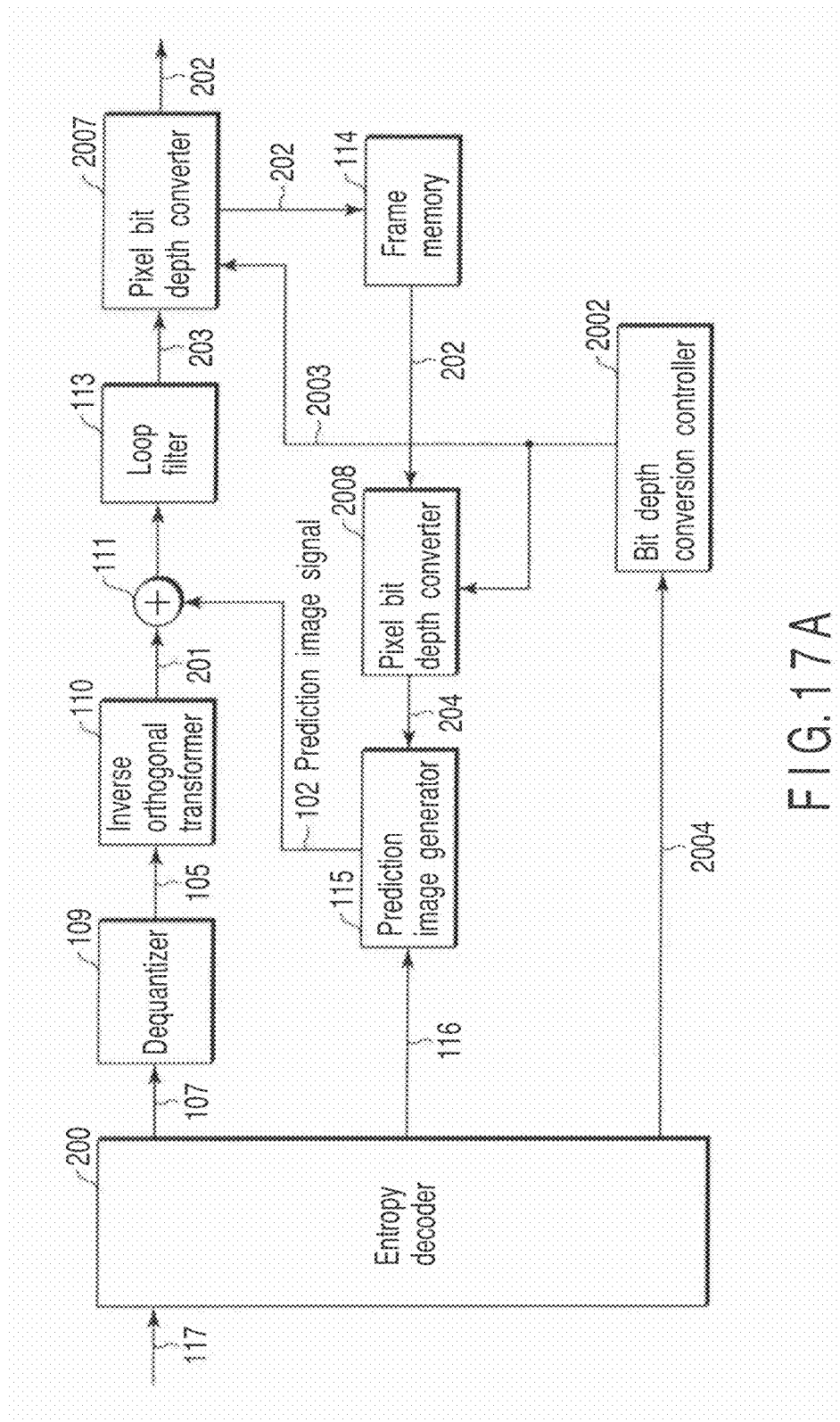
FIG. 17A is a block diagram illustrating a configuration example of an image decoding apparatus according to the embodiment.

Subsequently, the configuration of the image decoding apparatus according to the present embodiment is explained referring to FIG. 17A. This image decoding apparatus has a configuration substantially similar to the configuration example (FIG. 10A) shown in the second embodiment, but differs in points that a pixel bit depth converter (pixel bit depth converter) 2007 is provided on the rear stage of the adder 111 (and the loop filter 113) instead of the pixel bit depth decrease unit 2001, the frame memory 114 is connected not to the rear stage of the adder 111 (the loop filter 113) but to the rear stage of the pixel bit depth converter, and the pixel bit depth converter 2008 is connected to the rear stage of the frame memory 114.

Figure 17B:
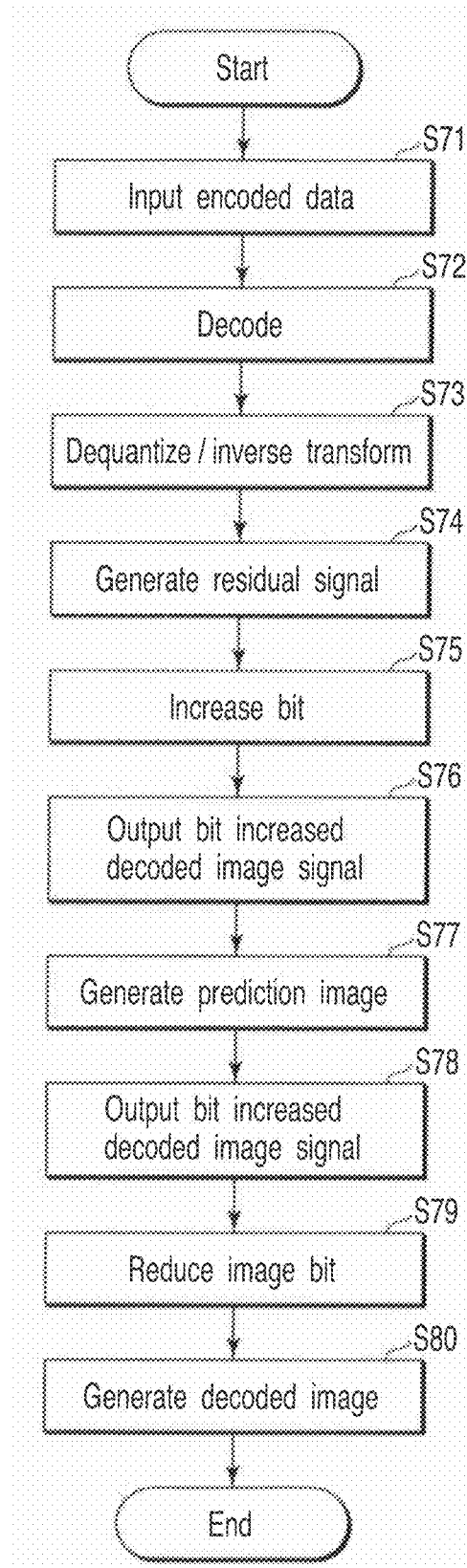
FIG. 17B is a flow chart illustrating an operation of the image decoding apparatus of FIG. 17A.

There will now be described an operation of the image decoding apparatus with reference to flowchart of FIG. 17B. When the encoded data 117 encoded with the image encoding apparatus of FIG. 11A is input to the image decoding apparatus (S71), the entropy decoder 200 decodes the encoded data 117 by an inverse procedure to the entropy coding, to produce quantized orthogonal transform coefficient information 107, motion vector/prediction mode information 116 and bit depth increase information 2004 (S72).

The dequantizer 109 and the inverse orthogonal transformer 110 subject the quantized orthogonal transform coefficient information 107 to inverse processes to the processes of the quantizer 106 and orthogonal transformer 104 sequentially to convert it to a residual signal 201 of the (N+M) bit depth (S73) and (S74).

When the bit depth increase information 2004 output from the entropy decoder 200 is input to the bit depth conversion controller 2002, the number of bits M indicating whether by how many bits the decoded image is increased and the bit depth conversion information 2003 indicating the number of bits L to be decreased when the decoded image is stored in the frame memory are output from the bit depth conversion controller 2002.

The pixel bit depth converter 2008 subjects the decoded image signal 202 of the (N+M−L) bit depth which is stored in the frame memory 114 according to a procedure described hereinafter to processing for increase-converting the pixel bit depth by L bits by performing the processing similar to equations (5), (5-1), (5-2), etc., for example, when L>0 (S75), and subjects it to processing for decrease-converting the pixel bit depth by (−L) bits by performing the processing similar to equation (6), etc. when L<0, to output a bit depth increase reference image signal 204 of the (N+M) bit depth (S75), on the basis of the bit depth conversion information 2003. When processing similar to the equations (5-1) and (5-2) is performed, the configuration of the pixel bit depth converter 2008 may be similar to that of FIG. 11D. Further, the frame memory 114 may be a configuration similar to that of FIG. 11F.

When motion vector/prediction mode information 116 is input to the prediction image generator 115, the prediction image signal 102 of the (N+M) bit depth based on the motion vector/prediction mode information 116 is generated from the bit depth increase reference image signal 204 of the (N+M) bit depth (S77). The residual signal 201 of the (N+M) bit depth and the prediction image signal 102 of the (N+M) bit depth are added with the adder 111. The loop filter 113 filters a sum signal as needed, and outputs the bit depth increased decoded image signal 203 of the (N+M) bit depth (S78).

The bit depth increased decoded image signal 203 is input to the pixel bit depth converter 2007, and a value of each pixel is subjected to processing similar to that of the pixel bit depth decrease unit of the image decoding apparatus of the first embodiment such as the equation (2) based on the bit depth conversion information 2003, whereby the pixel bit depth is decrease-converted to a value decreased by M bits (S79), and the decoded image 202 of the N bit depth to be identical to the input image input to the image encoding apparatus is acquired (S80). The pixel bit depth converter 2007 may be similar to the configuration of FIG. 12 and perform the control to change by a flag whether the bit depth of each pixel is decreased.

When M=L, the decoded image signal 202 of the N bit depth is stored in the frame memory 114 as it is. When M≠L and L>0, the bit depth increased decoded image signal 203 of the (N+M) bit depth is subjected to processing similar to, for example, the equations (3), (3-1), (3-2) to (3-6) for every pixel, whereby the decoded image of the (N+M−L) bit depth, the bit depth of which is decreased by L bits, is created. It is stored in the frame memory 114. Contrariwise, when L<0, the processing similar to the equation (4) is performed on each pixel to create a decoded image of (N+M−L) bit depth, the bit depth of which is decreased by (−L) bits. It is stored in the frame memory 114. When processing similar to (3-1) or (3-2) to (3-6) is done, the configuration of the pixel bit depth converter 2007 may be a configuration similar to FIG. 11D.

According to the above-mentioned configuration, since the prediction image signal is created with the bit depth larger than the input image signal by M bits, precision of a filter or loop filter for motion compensation, and an intra prediction and the like can be improved. As a result, the prediction error signal can be decreased, so that the encoding efficiency can be improved. When 0<L≤M unlike the first and second embodiments, the reference image signal stored in the frame memory can be stored with the bit depth smaller than that of the input image signal or prediction image signal whose bit depth is increased, and the usage of the frame memory can be decreased while the effect improving the prediction of the filter or loop filter for motion compensation, the intra prediction and the like is maintained.

According to the above-mentioned configuration, it can be changed whether the bit depth increase is done in arbitrary encoding unit or the number of bits to be increased can be changed. Therefore, since the encoding can be done by selecting, for every arbitrary encoding unit, the number of bits to be increased which provides best encoding efficiency, the encoding efficiency can be further improved.

Fourth Embodiment

The configuration of the image encoding apparatus for video encoding according to the fourth embodiment will be explained referring to FIG. 18A. This image encoding apparatus differs, in comparison with the configuration example (FIG. 9) shown in the second embodiment, in points that the pixel bit depth increase unit for increasing the pixel bit depth of the input image is not provided, the pixel bit depth increase unit (pixel bit depth increase converter) 1001 is provided on the previous stage of the frame memory 114 (and the loop filter 113), and the pixel bit depth decrease unit (pixel bit depth contraction unit) 1004 is provided on the rear stage of the prediction image generator 115.

Figure 18B:
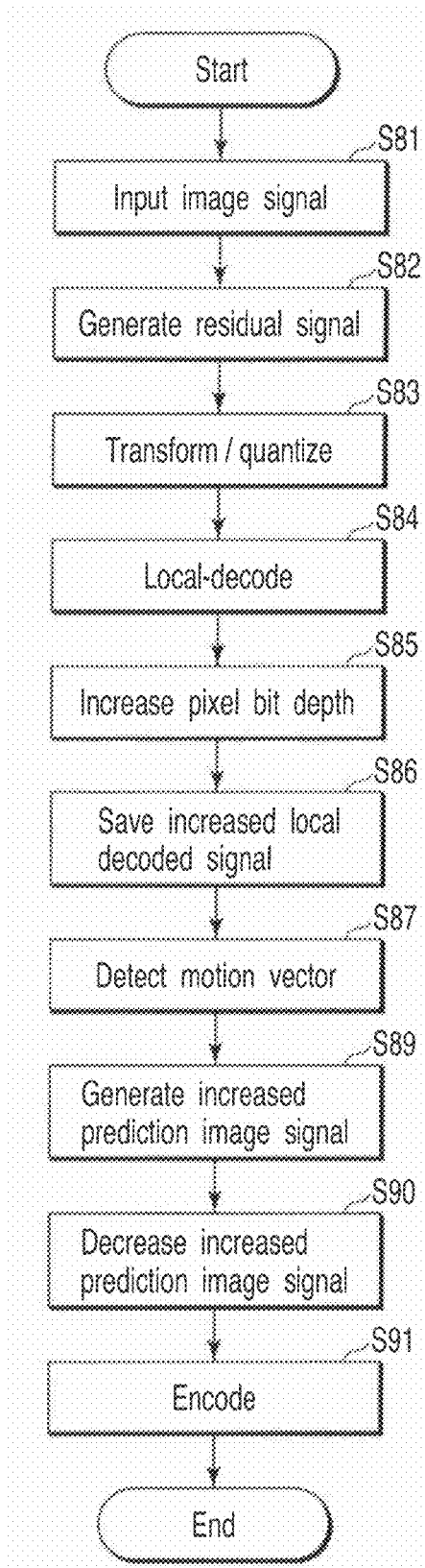
FIG. 18B is a flow chart image encoding apparatus an operation of the image encoding apparatus of FIG. 18A.

There will now be described an operation of the image encoding apparatus with reference to flowchart of FIG. 18B. A video signal wherein bit depth of each pixel is, for example, N bit depth is input to this image encoding apparatus as the input image signal 100, for example, in units of a frame (S81). The subtracter calculates a difference between the input image signal 100 and the prediction image signal 102 of the N bit depth to generate a prediction error signal 103 of the N bit depth (S82). A method of generating the prediction image signal 102 of the N bit depth will be described thereinafter. The orthogonal transformer 104 subjects the generated prediction error signal 103 to orthogonal transform (for example, discrete cosine transform (DCT)). The orthogonal transform coefficient information 105 (for example, DCT coefficient information) is provided from the orthogonal transformer 104 (S83).

The quantizer 106 quantizes the orthogonal transform coefficient information 105, and the quantized orthogonal transform coefficient information 107 is led to the entropy encoder 108 and dequantizer 109. The dequantizer 109 and inverse orthogonal transformer 110 subject the quantized orthogonal transform coefficient information 107 to inverse processes to those of the quantizer 106 and orthogonal transformer 104 sequentially to convert it into a local decoding error signal. The adder 111 adds this local decoding error signal to the prediction image signal 102 of the N bit depth to produce a local decoded picture signal 112 of the N bit depth (S84).

The loop filter 113 filters the local decoded picture signal 112 as needed and then inputs it to the pixel bit depth increase unit 1001 to increase-convert a value of each pixel to a value increased by M bits (S85). For example, when a value of a certain pixel of the bit depth increase decoded image signal is k, the pixel value k' after M bits decrease is calculated similarly to the equation (1) of the first embodiment. The local decoded picture signal 112 whose bit precision is increased to the (N+M) bits is stored in the frame memory 114 (S86). The local decoded picture signal 112 of the (N+M) bit depth stored in the frame memory 114 is input to the prediction image generator 115. The pixel bit depth increase unit 1001 may be the configuration of FIG. 2, and may perform the processing of controlling the bit depth by switching, by a flag, whether the bit depth of each pixel is increased similarly to the first embodiment.

The prediction image generator 115 generates a prediction image signal of the (N+M) bit depth based on certain prediction mode information from the local decoded picture signal 112 of the (N+M) bit depth. In this time, matching (for example, blockmatching) between the image signal obtained by increasing each pixel of the input image signal to the (N+M) bit depth and the local decoded picture signal 112 increased to the (N+M) bit depth is done for each block in the frame to detect a motion vector (S87). The bit depth increased prediction image signal 117 of the (N+M) bit depth is created using the local image signal of (N+M) bit depth compensated by this motion vector (S89). The bit depth increased prediction image signal 117 of the (N+M) bit depth generated here is output from the prediction image generator 115 together with the motion vector information/prediction mode information 116 of the selected prediction image signal.

The (N+M) bit depth increased prediction image signal 117 of the (N+M) bit depth is input to the pixel bit depth decrease unit 1004 to be converted into an image signal, the bit depth of each pixel of which is decreased by M bits (S90). This conversion is done by processing similar to the equation (2) shown in, for example, the first embodiment. The number of bits M to be decreased and the number of bits M to be increased with the pixel bit depth increase unit 1001 are the same value and led to the entropy encoder 108 as bit depth increase information 1003 with the bit depth conversion controller 1002, together. The pixel bit depth decrease unit 1004 may be the configuration of FIG. 8, and may perform the processing of controlling the bit depth by switching, by a flag, whether the bit depth of each pixel is increased similarly to the first embodiment.

The entropy encoder 108 entropy-encodes the quantized orthogonal transform coefficient information 107, the motion vector information/prediction mode information 116 and the bit depth increase information 1003 (S91). The encoded data 117 generated thereby is sent to a transmission system or storage system (not shown).

A method of encoding the number of bits M to be increased is similar to the first embodiment. In the present embodiment, data multiplexed with the supplemental syntax can be used similarly to the first embodiment.

The configuration of the image decoding apparatus according to the present embodiment is explained referring to FIG. 19A. This image decoding apparatus differs, in comparison with the configuration (FIG. 10A) shown in the second embodiment, in points that the pixel bit depth increase unit 2005 is provided on the previous stage of the frame memory 114 (and the loop filter 113), and the pixel bit depth decrease unit (pixel bit depth contraction unit) 2006 is provided on the rear stage of the prediction image generator 115.

Figure 19B:
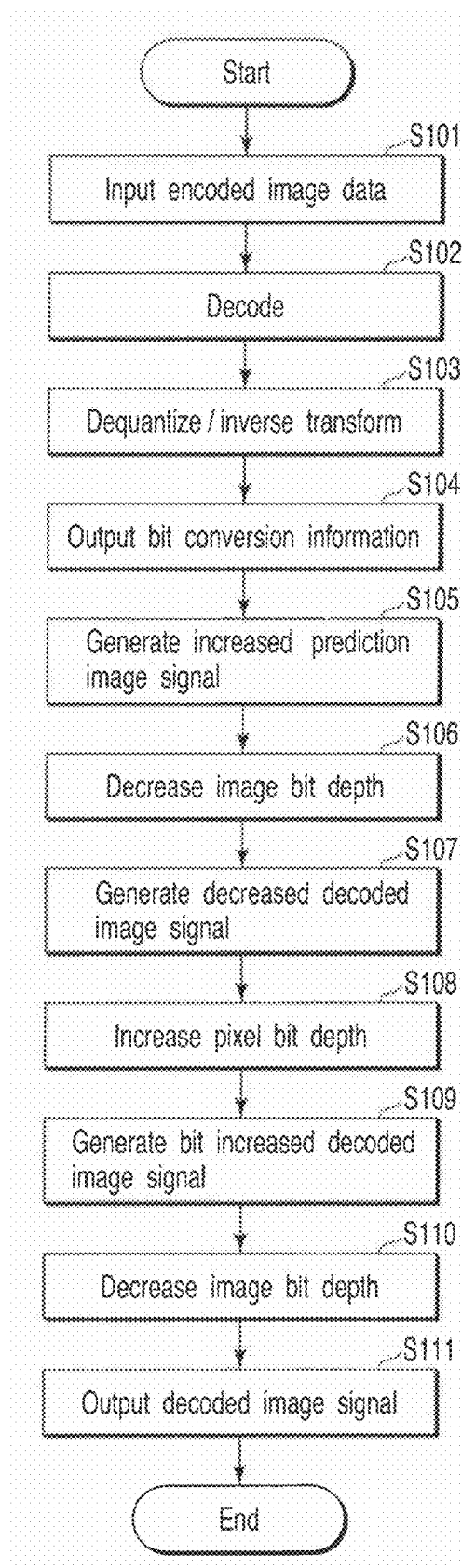
FIG. 19B is a flow chart illustrating an operation of the image decoding apparatus of FIG. 19A.

There will now be described an operation of the image decoding apparatus with reference to flowchart of FIG. 19B. When the encoded data 117 encoded with the image encoding apparatus of FIG. 18A is input to the image decoding apparatus (S101), the entropy decoder 200 decodes the encoded data 117 by an inverse procedure to the entropy coding, to provide the quantized orthogonal transform coefficient information 107, the motion vector/prediction mode information 116, and the bit depth increase information 2004 (S102). The dequantizer 109 and inverse orthogonal transformer 110 subject the quantized orthogonal transform coefficient information 107 to inverse processes to the processes of the quantizer 106 and orthogonal transformer 104, sequentially, to convert it to a residual signal 201 of the N bit depth (S103). When the bit depth increase information 2004 output from the entropy decoder 200 is input to the bit depth conversion controller 2002, the bit depth conversion controller 2002 outputs bit depth conversion information 2003 indicating whether by how many bits the decoded image is increased (S104).

When the motion vector/prediction mode information 116 is input to the prediction image generator 115, the bit depth increased prediction image signal 205 of the (N+M) bit depth based on the motion vector/prediction mode information 116 is generated from the bit depth increased decoded image signal 203 stored in the frame memory 114 by a procedure described hereinafter (S105).

The pixel bit depth decrease unit 2006 subjects the bit depth increased prediction image signal 205 of the (N+M) bit depth to the processing similar to that of the pixel bit depth decrease conversion unit in the image decoding apparatus of the first embodiment such as the equation (2) based on the bit depth conversion information 2003 to decrease-convert the pixel bit depth by M bits (S106), and output a prediction image signal 102 of N bit depth. The pixel bit depth decrease unit 2006 may be the configuration of FIG. 8 and may carry out processing of controlling the bit depth by switching, by a flag, whether the bit depth of each pixel is increased, similarly to the first embodiment.

The adder 111 adds the residual signal 201 of the N bit depth to the prediction image signal 102 of the N bit depth to generate a decreased decoded image signal (S107). When the decreased decoded image signal is input to the pixel bit depth increase unit 2005. The pixel bit depth increase unit 2005 subjects it to processing similar to the processing carried out by the pixel bit depth increase unit in the image encoding apparatus of the first embodiment such as the equation (1) based on the bit depth conversion information 2003 to increase the pixel bit depth by M bits (S108). The loop filter 113 filters the signal output from the pixel bit depth increase unit 2005 as needed to output an increased decoded image signal 203 of the (N+M) bit depth (S109). It is stored in the frame memory 114. The pixel bit depth increase unit 2005 may be the configuration of FIG. 2, and may carry out processing of controlling the bit depth by switching, by a flag, whether the bit depth of each pixel is increased similarly to the first embodiment.

The bit depth increased decoded image signal 203 of the (N+M) bit depth is input to the pixel bit depth decrease unit 2001, and the value of each pixel is subjected to processing similar to the pixel bit depth decrease converter in the image decoding apparatus of the first embodiment such as the equation (2) based on the bit depth conversion information 2003 to acquire a decoded image of the same N bit depth as the input image input to the image encoding apparatus (S110) (S111).

According to the above-mentioned configuration, since the prediction image signal is generated with the bit depth larger than the input signal by M bits, the precision of a filter of motion compensation or a loop filter, intra prediction and the like can be improved. Accordingly, since the prediction error signal can be decreased, the encoding efficiency can be improved. The processing of transform/quantization of the prediction error signal and the residual signal can be performed with precision corresponding to the bit depth of the input signal, unlike the first to third embodiments. The bit depth of transform/quantization is decreased while the effect improving the precision of a filter of motion compensation or a loop filter, intra prediction and the like is maintained, and thus the operation scale can be decreased.

Fifth Embodiment

The configuration of the image encoding apparatus for video encoding according to the fifth embodiment is explained referring to FIG. 20A. This image encoding apparatus differs, in comparison with the configuration example (FIG. 9) shown in the second embodiment, in points that the pixel bit depth increase unit for increasing the pixel bit depth of the input image is not provided, the pixel bit depth increase unit (pixel bit depth increase converter) 1001 is provided on the previous stage of the prediction image generator, and the pixel bit depth decrease unit (pixel bit depth contraction unit) 1004 is provided on the rear stage of the prediction image generator 115.

Figure 20B:
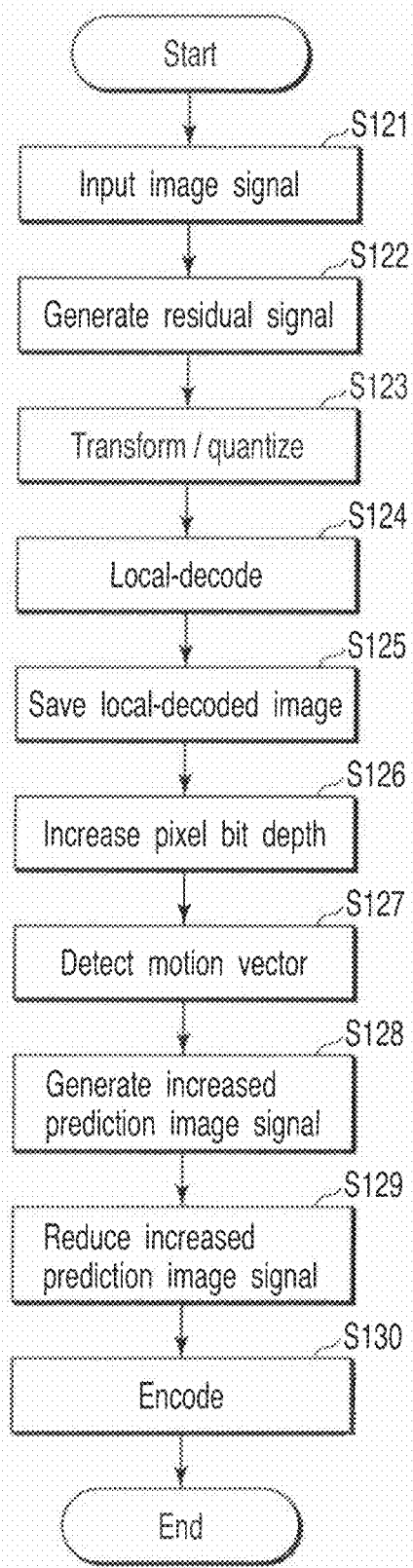
FIG. 20B is a flow chart illustrating an operation of the image encoding apparatus of FIG. 20A.

There will now be described an operation of the image encoding apparatus with reference to flowchart of FIG. 20B. A video signal wherein the bit depth of each pixel is, for example, N bit depth is input to this image encoding apparatus as an input image signal 100 in units of a frame, for example (S121). The subtracter 101 calculates a difference between the input image signal 100 and the prediction image signal 102 of the N bit depth to generate a prediction error signal 103 of the N bit depth (S122). A method for generating the prediction image signal 102 of the N bit depth will be described hereinafter. The orthogonal transformer 104 subjects the generated prediction error signal 103 to orthogonal transform, for example, discrete cosine transform (DCT). The orthogonal transformer 104 provides orthogonal transform coefficient information 105, for example, DCT coefficient information (S123). The quantizer 106 quantizes the orthogonal transform coefficient information 105. The quantization orthogonal transform coefficient information 107 is led to the entropy encoder 108 and the dequantizer 109.

The dequantizer 109 and inverse orthogonal transformer 110 subject the quantization orthogonal transform coefficient information 107 to inverse processes to the processes of the quantizer 106 and orthogonal transformer 104 sequentially, to convert it into a local decoding error signal. The adder 111 adds this local decoding error signal to the prediction image signal 102 of the N bit depth to produce a local decoded picture signal 112 of the N bit depth (S124).

The loop filter 113 filters the local decoded picture signal 112 of the N bit depth as needed and then stores it in the frame memory 114 (S125).

The local decoded picture signal 112 of the N bit depth stored in the frame memory 114 is input to the pixel bit depth increase unit 1001, to increase a value of each pixel by M bits (S126). For example, when a value of a certain pixel of the bit depth increased decoded image signal is k, the pixel value k' after M bits decrease is calculated similarly to the equation (1) of the first embodiment. The local decoded picture signal 112 wherein the bit depth is increased to the (N+M) bits is input to the prediction image generator 115. The pixel bit depth increase unit 1001 may be the configuration of FIG. 2, and may carry out processing of controlling the bit depth by switching, by a flag, whether the bit depth of each pixel is increased similarly to the first embodiment.

The prediction image generator 115 generates a prediction image signal of the (N+M) bit depth based on certain prediction mode information from the local decoded picture signal 112 of the (N+M) bit depth. In this time, matching (for example, blockmatching) between the image signal obtained by increasing each pixel of the input image signal 100 to the (N+M) bit depth and the local decoded image signal 112 increased to the (N+M) bit depth is done for each block in the frame to detect a motion vector (S127). The bit depth increased prediction image signal 117 of the (N+M) bit depth is generated using the local image signal of the (N+M) bit depth compensated by this motion vector (S128). The bit depth increased prediction image signal 117 of the (N+M) bit depth generated here is output from the prediction image generator 115 together with the motion vector information/prediction mode information 116 of the selected prediction image signal.

The bit depth increased prediction image signal 117 is input to the pixel bit depth decrease unit 1004, and is subjected to conversion so that the bit depth of each pixel is decreased by M bits (S129). This conversion is done by carrying out processing similar to the equation (2) shown in an image decoder of, for example, the first embodiment. The number of bits M to be decreased and the number of bits M to be increased in the pixel bit depth increase unit 1001 are the same value, and led as the bit depth increase information 1003 to the entropy encoder 108 with the bit depth conversion controller 1002. The pixel bit depth decrease unit 1004 may be the configuration of FIG. 8, and may carry out processing of controlling the bit depth by switching, by a flag, whether the bit depth of each pixel is increased similarly to the first embodiment.

The entropy encoder 108 entropy-encodes the quantized orthogonal transform coefficient information 107, the motion vector information/prediction mode information 116 and the bit depth increase information 1003 (S130). The encoded data 117 generated thereby is sent to a transmission system or storage system (not shown).

A method for encoding the number of bits M to be increased is similar to the first embodiment. In the present embodiment, data multiplexed with the supplemental syntax can be used similarly to the first embodiment.

The configuration of the image decoding apparatus according to the present embodiment is explained referring to FIG. 21A. This image decoding apparatus differs, in comparison with the configuration example (FIG. 10) shown in the second embodiment, in points that the pixel bit depth decrease unit is not provided on the rear stage of the adder 111 (and loop filter 113), the decoded image signal 202 is output from the adder 111 (and the loop filter 113), the pixel bit depth increase unit (pixel bit depth increase converter) 2005 is provided on the previous stage of the prediction image generator 115, and the pixel bit depth decrease unit (pixel bit depth contraction unit) 2001 is provided on the rear stage of the prediction image generator 115.

Figure 21B:
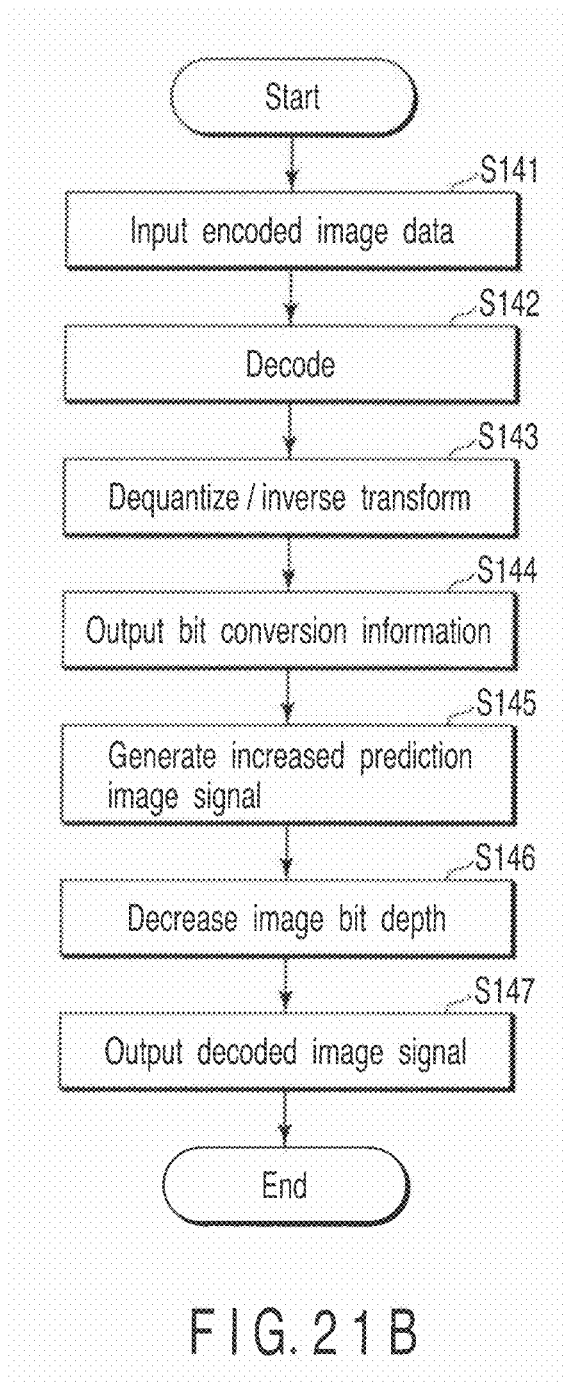
FIG. 21B is a flow chart illustrating an operation of the image decoding apparatus of FIG. 21A.

There will now be described an operation of the image decoding apparatus with reference to flowchart of FIG. 21B. When the encoded data 117 encoded with the image encoding apparatus of FIG. 20A is input to the image decoding apparatus (S141), the entropy decoder 200 decodes the encoded data 117 by an inverse procedure to the entropy coding to provide the quantized orthogonal transform coefficient information 107, the motion vector/prediction mode information 116 and the bit depth increase information 2004 (S142). The dequantizer 109 and inverse orthogonal transformer 110 subject the quantization orthogonal transform coefficient information 107 to inverse processes to the processes of the quantizer 106 and orthogonal transformer 104 sequentially, to convert it into a residual signal of the N bit depth (S143). When the bit depth increase information 2004 output from the entropy decoder 200 is input to the bit depth conversion controller 2002, the bit depth conversion controller 2002 outputs bit depth conversion information 2003 indicating whether by how many bits the decoded image is increased (S144).

The pixel bit depth increase unit 2005 subjects the decoded image signal 202 of the N bit depth stored in the frame memory 114 to the processing similar to that of the pixel bit depth increase conversion unit in the image encoding apparatus of the first embodiment such as the equation (1) based on the bit depth conversion information 2003 according to a procedure described hereinafter to increase-convert the pixel bit depth by M bits, and output a bit depth increased reference image signal 204 of the (N+M) bit depth. The pixel bit depth increase unit 2005 may be the configuration of FIG. 2, and may carry out processing of controlling the bit depth by switching, by a flag, whether the bit depth of each pixel is increased similarly to the first embodiment.

Motion vector/prediction mode information 116 is input to the prediction image generator 115, whereby the bit depth increased prediction image signal 205 of the (N+M) bit depth based on the motion vector/prediction mode information 116 is generated from the bit depth increased reference image signal 204 of the (N+M) bit depth (S145). The pixel bit depth decrease unit 2001 subjects the bit depth increased prediction image signal 205 of the (N+M) bit depth to the processing similar to that of the pixel bit decrease conversion unit in the image decoding apparatus of the first embodiment such as the equation (2) based on the bit depth conversion information 2003 to decrease-convert the pixel bit depth by M bits, and output a prediction image signal 102 of the N bit depth (S146). The pixel bit depth decrease unit 2001 may be the configuration of FIG. 8, and may carry out processing of controlling the bit depth by switching, by a flag, whether the bit depth of each pixel is increased similarly to the first embodiment.

The adder 111 adds the residual signal 201 of the N bit depth to the prediction image signal 102 of the N bit depth. The loop filter 113 filters a sum signal as needed, and outputs the bit depth increased decoded image signal 202 of the N bit depth (S147). It is stored in the frame memory 114. The decoded image signal 202 provided here has the same N bit depth as the input image input to the image encoding apparatus.

According to the above-mentioned configuration, since the prediction image signal is generated with the bit depth larger than the input signal by M bits, precision of a filter of motion compensation or a loop filter, intra prediction and the like can be improved. Accordingly, since the prediction error signal can be decreased, the encoding efficiency can be improved. Further, the reference image signal stored in the frame memory can be stored therein with the bit depth smaller than the input image signal and the prediction image signal wherein the bit depth is increased. Therefore, the usage of the frame memory can be decreased while the effect improving the prediction of the filter or loop filter for motion compensation, the intra prediction and the like is maintained. Further, it is possible to perform the processing for transform/quantization of the prediction error signal and residual signal with precision corresponding to the bit depth of the input image. As a result, it is possible to decrease the bit precision of transform/quantization and decrease an operation scale while the precision the filter of motion compensation or loop filter, intra prediction is maintained.

Figure 22:
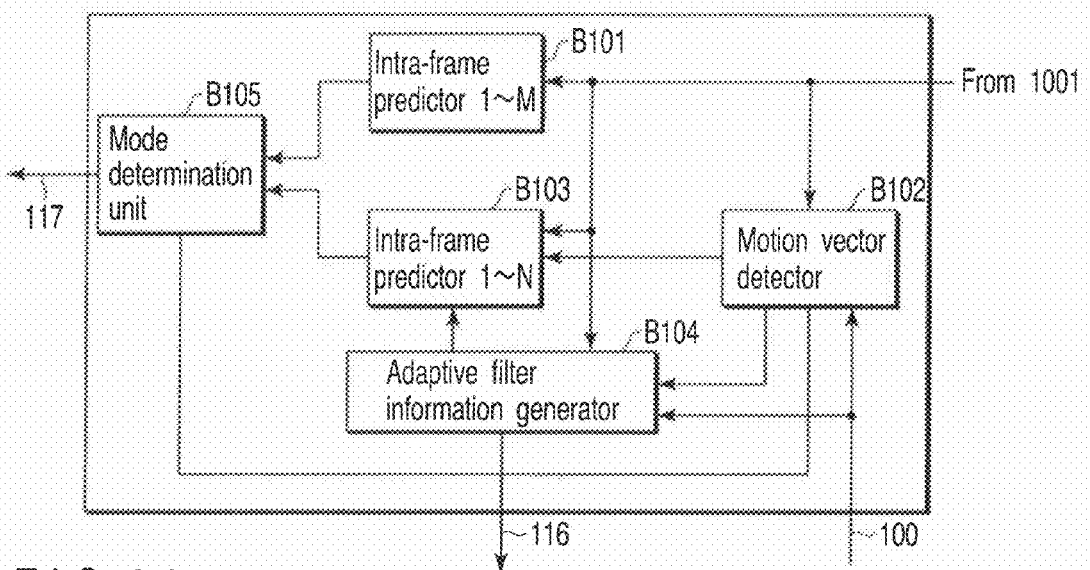
FIG. 22 is a block diagram of a prediction image generator of the encoder side.

In the second to fifth embodiments, the prediction image generator 115 can be configured as shown in FIG. 22. According to the prediction image generator 115 of the encoder side shown in FIG. 22, the intra-frame prediction device B101 generates a prediction image signal based on intra-frame prediction from the local decoded picture signal 112 of the region which is already encoded in the frame in the frame memory 114. Meanwhile, the inter-frame predictor B103 subjects the local decoded picture signal 112 in the frame memory 114 to motion compensation based on a motion vector detected with the motion vector detector B102. The adaptive filter information generator B104 creates the prediction image signal 102 based on inter-frame prediction using the adaptive filter information generated from the input image signal 101, local decoded picture signal 112 and motion vector.

The intra-frame prediction device B101 has M intra-frame prediction modes (M indicates a plural number), and the inter-frame predictor B103 has M inter-frame prediction modes (N indicates a plural number). The mode determination device B105 is connected to the outputs of the inter-frame predictor B103 and intra-frame prediction device B101. The mode determination device B105 outputs a prediction image signal based on one prediction mode selected out of N inter-frame prediction modes or a prediction image signal 102 based on one prediction mode selected out of M intra-frame prediction modes.

The motion vector/prediction mode information/adaptive filter information 116, namely, a motion vector output from the motion estimation device B102, prediction mode information indicating the prediction mode selected with the mode determination device and adaptive filter information 116 are sent to the entropy encoder 117, and transmitted to the decoder side with being included in the encoded data 117. The motion vector and adaptive filter information are output from the motion estimation device B102, only when the inter-frame prediction mode is selected.

Figure 23:
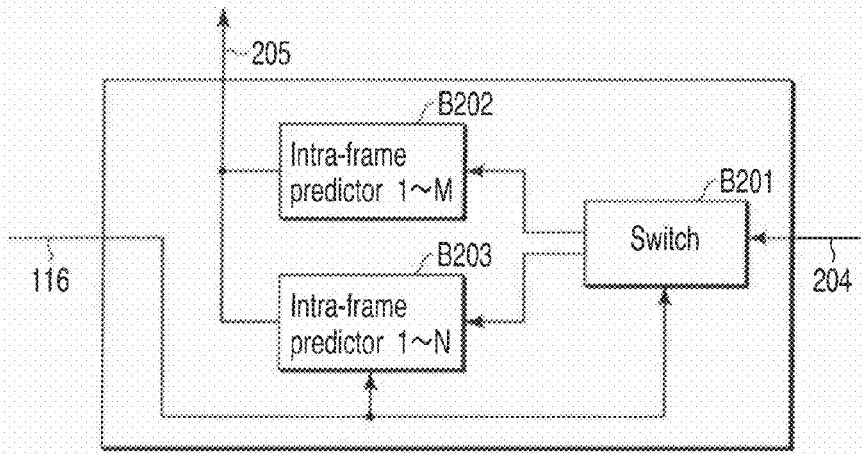
FIG. 23 is a block diagram of a prediction image generator of the decoder side.

The prediction image generator 115 on the decoder side is explained referring to FIG. 23. According to this prediction image generator 115, the switch B201 selects a predictor based on the prediction mode information 116. When the intra-frame prediction device B202 is selected, it creates a prediction image signal 102 based on the intra-frame prediction from the decoded image signal 203 of the region that is already encoded in the frame in the frame memory 114. Meanwhile, when the inter-frame predictor B203 is selected, the decoded image signal 203 in the frame memory 114 is subjected to motion compensation based on the motion vector to create a prediction image signal 102 based on the inter-frame prediction using the adaptive filter information 116.

Figure 24:
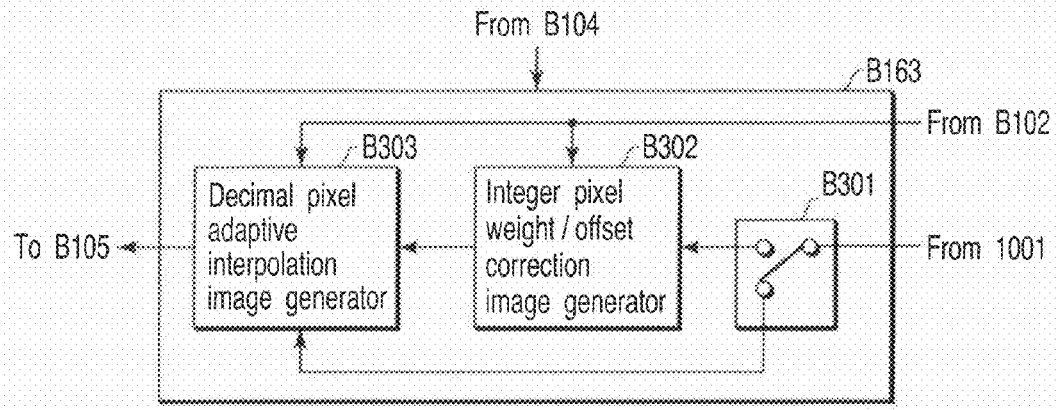
FIG. 24 is a block diagram illustrating a configuration of an inter-frame predictor.

FIG. 24 shows a configuration example of the inter-frame predictor B103. The inter-frame predictor B103 creates the inter-frame prediction image signal 102 from the motion vector, the local decoded picture signal and the adaptive filter coefficient information. The integer pixel weight/offset correction unit B301 executes processing for performing so-called weighted prediction of integer pixel value. For a concrete example, the prediction image signal 102 of integer pixel is created according to the following equation (7).

$$Y = (W \times X + (1 << (L-1))) >> L) + O \tag{7}$$

where W is a weighting factor, L is a shift coefficient, O is offset coefficient, and these are contained in the adaptive filter coefficient information. The pixel value X is processed based on the equation (7) to be converted to a Y value, whereby correction of luminance or correction of color becomes possible.

The equation (8) is an example of weight/offset processing when bidirectional prediction is performed.

$$Y = (W_1 \times X_1 + W_2 \times X_2 + (1 << (L-1))) >> L) + ((O_1 + O_2) >> 1) \tag{8}$$

The weighting factor W1 for the pixel value X1, the offset coefficient O1, the weighting factor W2 for the pixel value X2, the offset coefficient O2, and the shift coefficient L are included in the adaptive filter coefficient information. Luminance correction and color correction become possible by processing the values X1, X2 according to the equation B2 to convert it into a Y value.

When weight/offset correction is not needed by the adaptive filter information 116, the switch B301 is switched to generate a decimal pixel adaptive interpolation picture.

In the present invention, since the bit depth in encoding and decoding is set to a value larger than the pixel bit depth of the input image signal, calculation precision for the weight/offset correction processing can be ensured, resulting in making it possible to perform weight/offset correction of higher precision.

When the motion vector indicates a decimal pixel, the decimal pixel adaptive interpolation picture generator B303 generates an interpolated pixel value of the decimal pixel from an integer pixel value, using the interpolation filter coefficient in the adaptive filter information, and generates the prediction image signal 102. About this processing, in the present invention, since the bit depth in encoding and decoding is set to a value larger than the pixel bit depth of the input image signal, calculation precision of interpolation filtering processing can be ensured, resulting in making it possible to obtain a better decimal pixel value.

FIG. 25 shows a configuration example of the inter-frame predictor B103. This inter-frame predictor generates the inter-frame prediction image signal 102 from a motion vector, a local decoded picture signal and adaptive filter coefficient information. When the motion vector indicates a decimal pixel, the decimal pixel adaptive interpolation picture generator B401 generates an interpolated pixel value of the decimal pixel from the integer pixel value using the interpolation filter coefficient in the adaptive filter information, and generates the prediction image signal 102.

In the present embodiment, since the bit depth in encoding and decoding is set to a value larger than the pixel bit depth of the input image signal, calculation precision of interpolation filtering processing can be ensured, resulting in making it possible to obtain a better decimal pixel value.

The weight/offset correction unit B403 does processing for performing so-called weighting predication of the pixel value of the prediction image signal. For a specific example, it generates the prediction image signal 102 according to the equation (7) or (8).

In the present embodiment, since the bit depth in encoding and decoding is set to a value larger than the pixel bit depth of the input image signal, calculation precision of weight/offset correction processing can be ensured, resulting in making it possible to perform weight/offset correction of higher precision.

FIG. 26 shows a configuration example of the inter-frame predictor. This inter-frame predictor generates an inter-frame prediction image signal from the motion vector, reproduced image signal and adaptive filter coefficient information. According to this, when the motion vector indicates a decimal pixel position, a switch B501 is connected to a decimal pixel adaptive interpolation/offset correction image generator B502, and the reproduced image signal is processed with the decimal pixel adapting interpolation/offset correction image generator B502. When it indicates an integer pixel, the switch B501 is connected to an integer pixel weight/offset correction image generator B503, and the reproduced image signal is processed with the integer pixel weight/offset correction image generator B503.

When a motion vector indicates a decimal pixel, the decimal pixel adaptive interpolation/offset correction image generator B502 generates an interpolated pixel value of the decimal pixel from the integer pixel value using the interpolation filter coefficient and offset correction coefficient in the adaptive filter information, and generates a prediction image signal. As a specific example, the equation (9) is used when one directional prediction is done, and the equation (10) is used when bidirection prediction is done.

$$Y = W_{i,j} \sum_{i=1}^{p} \sum_{j=1}^{q} X_{i,j} + O \quad (9)$$

where $W_{i,j}$ for a reproduced image signal $X_{i,j}$ indicates an interpolation filter coefficient, O indicates an offset coefficient, and Y indicates a prediction image signal.

$$Y = W_{i,j}^{(0)} \sum_{i=1}^{p} \sum_{j=1}^{q} X_{i,j}^{(0)} + W_{i,j}^{(1)} \sum_{i=1}^{p} \sum_{j=1}^{q} X_{i,j}^{(1)} + (O^{(0)} + O^{(1)})/2 \quad (10)$$

where $W^{(0)}_{i,j}$ for the reproduced image signal $X^{(0)}_{i,j}$ is an interpolation filter coefficient, $O^{(0)}$ is an offset coefficient, $W^{(1)}_{i,j}$ for the reproduced image signal $X^{(1)}_{i,j}$ is an interpolation filter coefficient, $O^{(1)}$ is an offset coefficient, and Y is a prediction image signal.

The integer pixel weight/offset correction unit B503 performs processing for executing so-called weighting prediction of the pixel value of the prediction image signal. For a specific example, a prediction image signal is generated according to the equation (7) or the equation (8). The offset correction coefficient in this time uses a coefficient of precision not less than the input pixel bit depth.

In the present embodiment, since the operation bit depth in encoding and decoding is set to a value larger than the pixel bit depth of the input image signal, calculation precision of interpolation filtering processing can be ensured, resulting in making it possible to obtain a better prediction pixel value.

In the present embodiment, since the bit depth in encoding and decoding is set to a value larger than the pixel bit depth of the input image signal, the calculation precision of weight/offset correction processing can be ensured, resulting in making it possible to perform weight/offset correction of higher precision.

(Adaptive Loop Filter)

The loop filter 113 can be configured as shown in FIG. 27 in the second to fifth embodiments.

FIG. 27 shows a configuration of the loop filter 113 on the encoder side in the second to fifth embodiments. A filter coefficient determination unit C101 receives the input image signal 101 and local decoded picture signal 112 as input signals, and calculates the filter coefficient such that, for example, the input image signal 101 and minimum squared error are minimum when the filtering processing is subjected to the local decoded picture signal 112. The filter coefficient determination unit C101 outputs the calculated filter coefficient to a filtering processor C102, and sends it to the entropy encoder 108 as filter coefficient information C103. The method for determining the filter coefficient is not limited to the above example, and may be a method for preparing a plurality of filters such as a deblocking filter and a deringing filter, switching them adaptively, and outputting the selected filter as filter coefficient information C103, or may perform processing such as determining adaptively whether each filter should be applied. Various aspects can be applied to the method. The input image signal 101 uses a signal having the same pixel bit depth as that of the local-decoded image signal 112 input to the loop filter according to each embodiment.

The filtering processor C102 subjects each pixel of the local-decoded image signal to the filtering processing using the filter coefficient input from the filter coefficient determining unit C101, and then outputs it to the frame memory 114 and the like.

The filter coefficient information 103 output to the entropy encoder 108 is entropy-coded with the entropy encoder 108, and transmitted with being contained in the encoded data 117.

Figure 28:
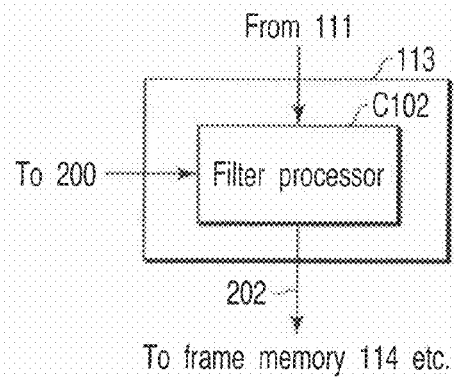
FIG. 28 is a block diagram illustrating a configuration of a loop filter of the decoder side.

FIG. 28 shows a configuration example of the loop filter 113 on the decoding side. The filtering processor C10 subjects each pixel of the decoded image signal to the filtering processing based on the filter coefficient information C103 output from the entropy decoder 200. The filtered decoded image signal is output to the frame memory 114 or the pixel bit depth decrease unit, or output as a decoded image signal as it is, according to each embodiment.

According to the above-mentioned configuration, since the bit depth in encoding and decoding is set to a value larger than the pixel bit depth of the input image signal, the calculation precision of the filtering processing done in the loop filter 113 can be ensured, resulting in making it possible to perform loop filtering processing with higher precision.

(Configuration Including a Prefilter)

Figure 29:
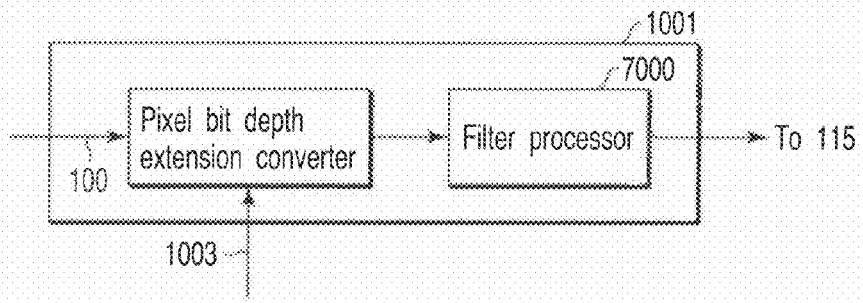
FIG. 29 is a block diagram illustrating another configuration of the pixel bit depth increase unit.
Figure 30:
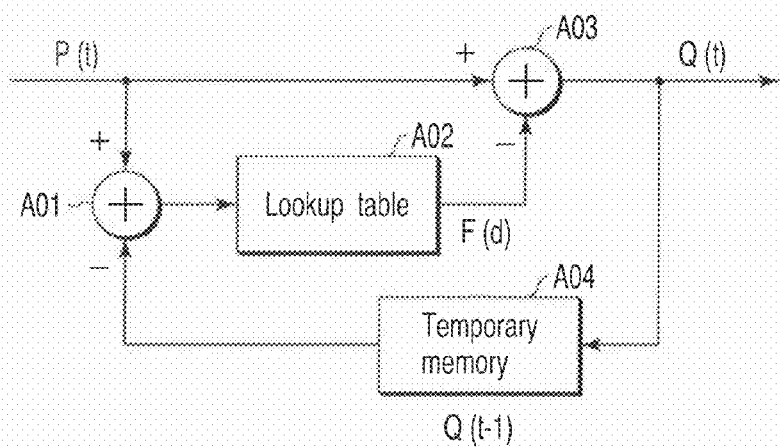
FIG. 30 is a block diagram of filtering processor.

The pixel bit depth increase unit 1001 to convert the pixel bit depth of the input image signal 101 can be configured as shown in FIG. 29 in the first to third embodiments. In this configuration, the input image signal input to the pixel bit depth increase unit 1001 is subjected to processing of increasing the bit depth of each pixel with (N+M) bit depth larger than N bits by M bits according to a procedure similar to the first embodiment, and then is led to the filtering processor 7000 to filter each pixel. The filtering processing done here uses such a spatial filter as to multiplex adjacent pixels in, for example, a frame by filter coefficient and then add them. FIG. 30 shows the filtering processor 7000 using, for example, an epsilon filter as the spatial filter.

According to this filtering processor 7000, if P[t] is an input pixel value and Q[t] is an output pixel value, t indicates a position of the pixel. When the pixel of the position t is filtered, the input pixel value P[t] and the output pixel value Q[t−1] of one pixel before the input pixel that is stored in the temporal memory A04 are input to the adder A01 to calculate a difference therebetween. The lookup table A02 is searched for F(d) by this difference d. This value F(d) is input to the adder A03 to be subtracted from the input pixel value P[t]. This operation is shown by the following equation.

$$Q[t]=P[t]-F(P[t]-Q[t-1]) \tag{11}$$

The function F is expressed by the equation (12), and (int) is assumed to be integral processing toward a 0 direction.

$$F(d)=(\text{int})(d/(d\times d/(u\times u)+1.0)) \tag{12}$$

$$d=P[t]-Q[t-1] \tag{13}$$

About the contents of the lookup table A02, the values calculated by the function F have only to be stored as a table beforehand. For example, if the pixel value is n bits, the value of d is $-2^n+1$ to $+2^n-1$, and thus $2^{n+1}-1$ arrays have only to be prepared in the lookup table. u is a parameter of the filter, and a filtering effect increases with an increase in a value of u. The operation amount of this filter is only two additions for filtering processing of one pixel.

Figure 31:
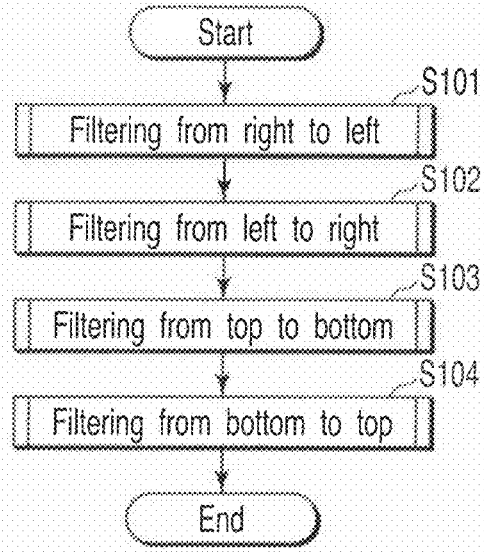
FIG. 31 is a flowchart of an operation of the filtering processor.

FIG. 31 is a concrete flowchart of the filtering processor 7000 using the filter of FIG. 30. This filtering processor 7000 executes the filtering processing from four directions of a frame. At first, the post filtering processing is done from the right to left of the frame (S101). Next, the post filtering processing is done from the left to right in the opposite direction (S102). Similarly this time, the top-to-bottom post filtering processing is done (S103), and next the bottom-to-top post filtering processing is done. This processing is done for each of Y, Cb, Cr signals. As thus described, the filtering processing in opposite directions to each other makes it possible to cancel the deviation of the phase that is a defect of a cyclic type filter.

Also, as the filtering processing is used temporal filtering of multiplying the corresponding pixels of a plurality of frames by the filter coefficient and then adding them. Also, the temporal filtering with motion compensation may be applied. The temporal filtering with the motion compensation uses a method disclosed in JP-A 2006-36206 (KOKAI).

The filtering processing in this configuration is not limited to the filtering processing described here. If it is filtering processing, any kind of processing may be done. Also, although the fourth and fifth embodiments encode the input image signal 101 without converting the pixel bit depth, the input image signal 101 may be directly subjected to the filtering processing described herein and then may be encoded.

(Configuration Including a Post Filter)

Figure 32:
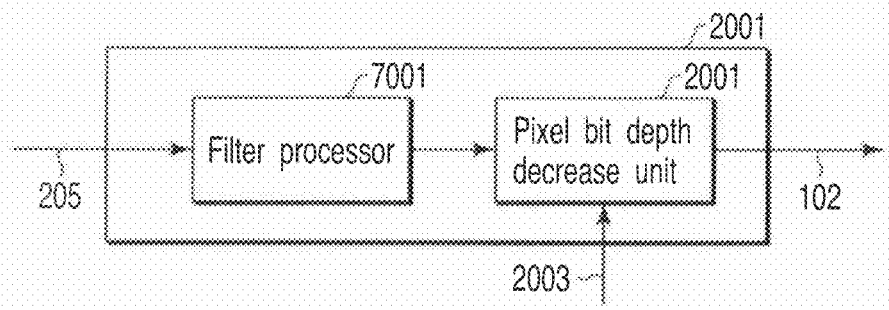
FIG. 32 is a block diagram of the pixel bit depth decrease unit.

In the first to fifth embodiments, the pixel bit depth decrease units 2001 and 2007 can be configured as shown in FIG. 32. In this arrangement, the bit increased decoded image signal 205 input to the pixel bit depth increase units 2001 and 2007 is input to a filtering processor 7001 and subjected to the filtering processing for each pixel. Thereafter, the bit depth of each pixel is reduced with bit depth smaller than (N+M) bits by M bits according to a procedure similar to the first embodiment, and it is output as a decoded image signal of N bits. The filtering processing done here may use, for example, a spatial filter to multiply the adjacent pixels in the frame by the filter coefficient and then add them, and a temporal filter to multiply the corresponding pixels of a plurality of frames by the filter coefficient and then add them.

(Configuration of a Reversible Filter)

In this configuration, it is possible to combine the pixel bit depth increase unit 1001 with the configuration of performing the filtering processing, and to perform inverse filtering processing to the filtering processing of the filtering processor 7000 in the pixel bit depth increase unit 1001, using the filtering processor in the pixel bit depth decrease unit 2001. For example, the filtering processor 7000 performs the processing expressed by the equation (14), where the pixel values of corresponding two points between two frames are assumed to be x, y, respectively, and corresponding output pixel values are assumed to be a, b.

$$a=(3x+y+2)>>2$$

$$b=(x+3y+2)>>2 \tag{14}$$

The processing of the equation (14) performs a division operation by shifting 2 bits to the right. However, when, for example, the pixel bit depth increase unit 1001 increases the bit by shifting 2 bits to the left, no rounding error occurs in the filtering processing expressed by the equation A4, and thus the information of the input image is not lost.

Meanwhile, the filtering processor 7001 on the decoding side performs the processing expressed by the equation (15), where the pixel values of corresponding two points between two frames of the decoded image signal are assumed to be a', b', and corresponding output pixel values are assumed to be x', y'.

$$x'=(3a'-b'+4)>>3$$

$$y'=(3b'-a''+4)>>3 \tag{15}$$

The processing of the equation (15) performs a division operation by shifting 3 bits to the right. However, when, for example, the pixel bit depth increase unit 1001 increases the bit by shifting 2 bits to the left, no rounding error occurs similarly to the filtering processing expressed by the equation (14). In other words, assuming that the quantization error occurring due to encoding and decoding is 0, the inverse filtering to the filtering expressed by the equations (14) and (15) becomes reversible filtering. Since the equation (14) is to do processing of closing the pixel values of corresponding two points between two frames to each other, the prediction of motion compensation is easy to be hit, thereby decreasing a prediction error. As a result, it is possible to decrease the number of encoded bits. Further, since pixel bit depth increase allows the filtering processing for restoring to an original input image to carry out except of quantization error, encoding efficiency can be improved.

The filter used for the filtering processors 7000 and 7001 is limited to one described here, and may be any filter. Of course, it will be appreciated that the precision of predictions can be further improved by using a reversible filter according to the number of bits M increased in the pixel bit depth increase 1001. In the example described herein, corresponding two points between two frames are subjected to the filtering processing. However, the embodiment is not limited to the example, and, for example, the pixels of two or more frames may be used. Further, the pixels of plural points such as two adjacent points in one frame or more than two points may be subjected to the filtering processing. Further, it is possible to use various kind of filtering processing such as filtering processing to be performed on the pixel values of corresponding two points between a top field and a bottom field in an interlace image.

The coefficient of the reversible filter used in the filter processors 7000 and 7001 is output to the entropy encoder 108 and can be included in the encoded data 117. Such processing makes it possible to carry out the encoding by selecting a filter coefficient by which the precision of prediction and the like is improved for every frame.

Sixth Embodiment

Configuration of the image encoding apparatus for video encoding according to the sixth embodiment is explained referring to FIG. 33A.

This image encoding apparatus is a configuration approximately similar to the configuration example (FIG. 9) shown in the second embodiment, but differs in the point that the watermark information embedding unit 3000 is provided on the rear stage of the pixel bit depth increase unit 1001.

Figure 33B:
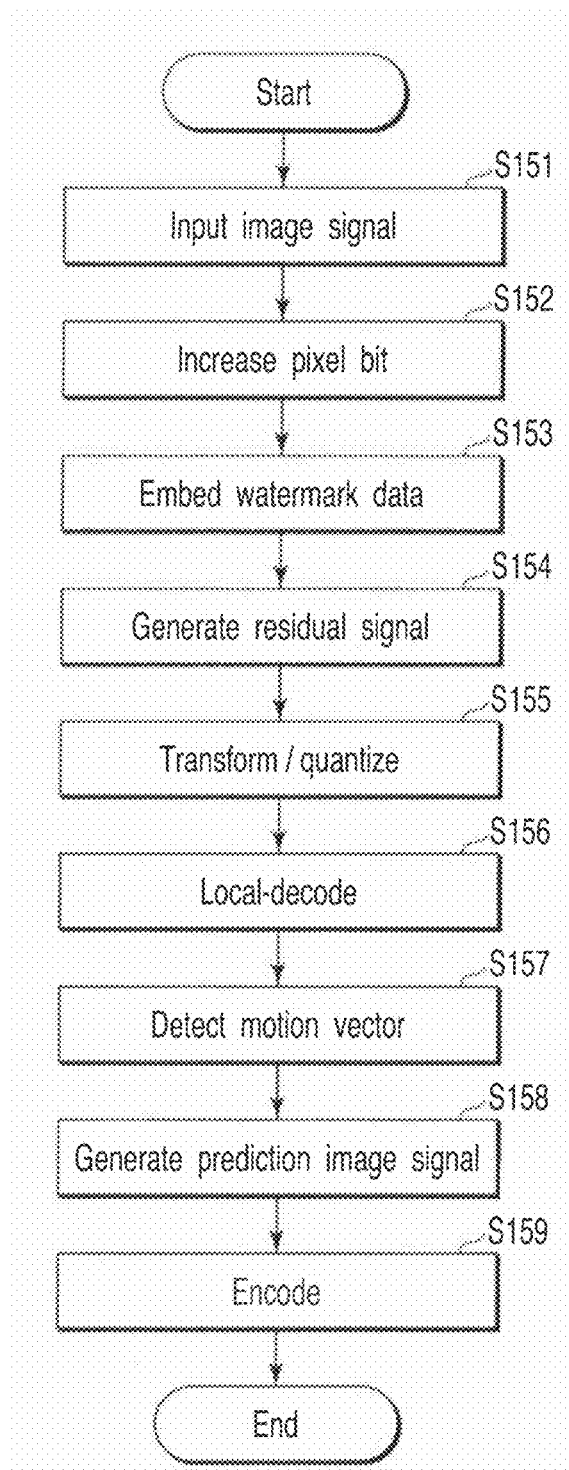
FIG. 33B is a flow chart illustrating an operation of the image encoding apparatus of FIG. 33A.

There will now be described an operation of the image encoding apparatus with reference to flowchart of FIG. 33B. A video signal is input to this image encoding apparatus as the image signal 100 in units of a frame (S151). The pixel bit depth increase unit (pixel bit depth converter) 1001 increases a value of each pixel of the input image signal 100 of the N bit depth to the (N+M) bit depth larger than the N bit depth by M bits by doing the same processing as the second embodiment (S152). The number of increased bits M is led to the entropy encoder 108 as the bit depth increase information 1003 with the bit depth conversion controller (bit depth conversion controller) 1002.

When the input image signal 100 whose bit depth is increased is input to the data embedding unit 3000, the data stream generated based on a parameter set beforehand is embedded in, for example, the lower bit of each pixel of the input image signal 100 (S153). The generated data stream is assumed to be a word length of not more than the M bits corresponding to the expanded bit depth.

When the input image 100 in which the data stream is embedded is led to the subtracter 101, the subtracter 101 calculates a difference between the input image signal 100 whose bit depth is increased to the (N+M) bit depth and the prediction image signal 102 created with the (N+M) bit depth. As a result, the prediction error signal 103 of the (N+M) bit depth is generated (S154). The orthogonal transformer 104 subjects the generated prediction error signal 103 to orthogonal transform (for example, discrete cosine transform (DCT)), and generates orthogonal transform coefficient information 105 (for example, DCT coefficient information) (S155). The quantizer 106 quantizes the orthogonal transform coefficient information 105 and supplies the quantized orthogonal transform coefficient information 107 to the entropy encoder 108 and dequantizer 109.

The dequantizer 109 and inverse orthogonal transformer 110 subject the quantized orthogonal transform coefficient information 107 to inverse processes to the processes of the quantizer 106 and orthogonal transformer 104, sequentially, and generates a signal similar to the prediction error signal, that is, a local decoded error signal. The adder 111 adds this local decoded error signal to the prediction image signal 102 of the (N+M) bit depth and generate the local decoded picture signal 112 of the (N+M) bit depth (S156). The loop filter 113 filters the local decoded picture signal 112 of the (N+M) bit depth as needed and then stores it in the frame memory 114.

The local decoded picture signal 112 stored in the frame memory 114 is input to the prediction image generator 115.

The prediction image generator 115 generates a prediction image signal of the (N+M) bit depth based on certain prediction mode information from the input image signal 100 whose bit depth is increased to the (N+M) bit depth and the local decoded picture signal 112 of (N+M) bit depth. In this time, matching (for example, blockmatching) is done, for every block in the frame, between the input image signal 100 of the (N+M) bit depth and the local decoded picture signal 112 increased to the (N+M) bit depth with the pixel bit depth converter 1005 to detect a motion vector (S157). The prediction image signal of (N+M) bit depth is generated using the local image signal of (N+M) bit depth that is compensated by this motion vector (S157). The prediction image generator 115 outputs the generated prediction image signal 102 of (N+M) bit depth along with the motion vector information/prediction mode information 116 of the selected prediction image signal.

The entropy encoder 108 entropy-encodes the quantization orthogonal transform coefficient information 107, the motion vector information/prediction mode information 116 and the bit depth increase information 1003 (S159), and send the generated encoded data 117 to a transmission system or storage system, which is not shown.

The present embodiment can use the data multiplexed with supplemental syntax similarly to the first embodiment.

The configuration of the image decoding apparatus concerning the present embodiment is explained referring to FIG. 34A. This image decoding apparatus is configuration to be approximately similar to the configuration example (FIG. 10) shown in the second embodiment, but differs in the point that a watermark detector is provided between the loop filter 113 and the pixel bit depth decrease unit 2001 (pixel bit depth converter) therefrom.

Figure 34B:
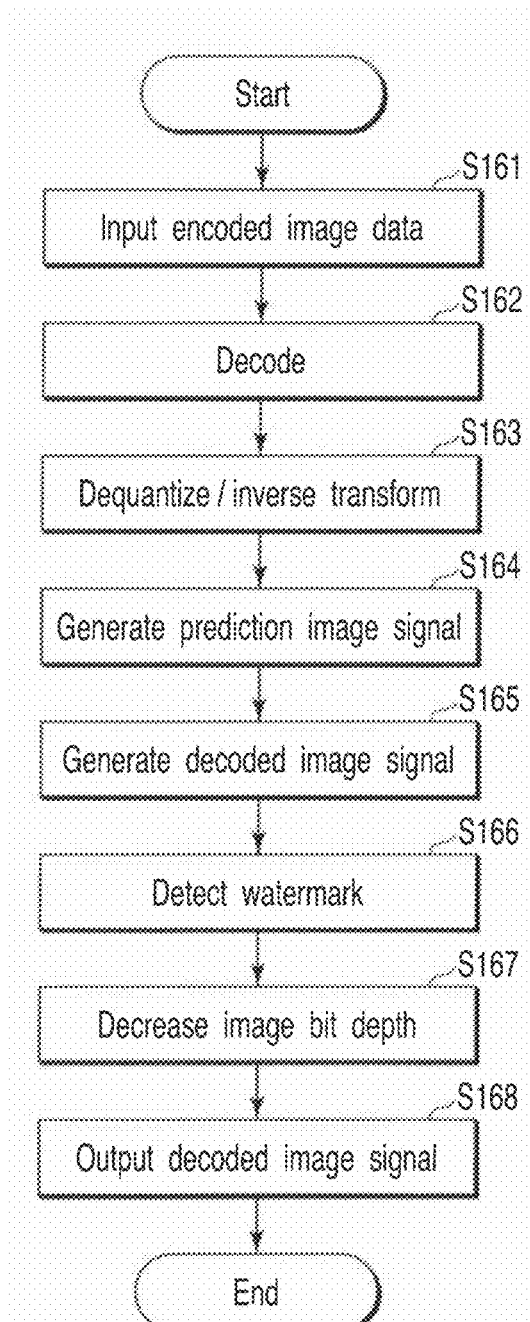
FIG. 34B is a flow chart illustrating an operation of the image decoding apparatus of FIG. 34A.

There will now be described an operation of the image decoding apparatus with reference to flowchart of FIG. 34B. When the encoded data 117 encoded with the image encoding apparatus of FIG. 11A is input to the image decoding apparatus (S161), the entropy decoder 200 decodes the encoded data 117 according to an inverse procedure to the entropy encoding, the quantization orthogonal transform coefficient information 107, the motion vector/prediction mode information 116, and the bit depth increase information 2004 are provided (S162).

The dequantizer 109 and inverse orthogonal transformer 110 subject the quantization orthogonal transform coefficient information 107 sequentially to inverse processes to the processes of the quantizer 106 and orthogonal transformer 104 to transform it into a residual signal 201 of the (N+M) bit depth (S163). When the bit depth increase information 2004 output from the entropy decoder 200 is input to the bit depth conversion controller 2002, the controller outputs bit depth conversion information 2003 denoting the number of bits M indicating whether by how many bits the decoded image is increased.

When the motion vector/prediction mode information 116 is input to the prediction image generator 115, the prediction image signal 102 of the (N+M) bit depth based on the motion vector/prediction mode information 116 is created from the bit depth increased reference image signal 204 of the (N+M) bit depth (S164). The adder 111 adds the residual signal 201 of the (N+M) bit depth and the prediction image signal 102 of the (N+M) bit depth. The loop filter 113 filters the addition signal as needed and outputs the bit depth increased decoded image signal 203 of the (N+M) bit depth (S165).

The bit depth increased decoded image signal 203 is stored in the frame memory 114, and input to the watermark detector 3002. The watermark detector 3002 determines whether, for example, the lower bit of each pixel of the bit depth increased decoded image 203 is watermark data, and outputs watermark detection information 3003 indicating whether it includes the watermark data (S166). The determination of whether it is the watermark data is done using a method of calculating a correlation coefficient between, for example, a known watermark pattern and, for example, the lower M bits of the bit depth increased decoded image 203 and determining that it is the watermark data when the value is not less than a given threshold.

The bit depth increased decoded image signal 203 is input to the pixel bit depth converter 2007, and the value of each pixel is subjected to the same processing as that of the pixel bit depth decrease unit in the image decoding apparatus of the first embodiment, for example, as the equation (2), based on bit depth conversion information 2003, whereby the pixel bit depth is decreased to a value decreased by M bits (S167), and the decoded image 202 of the same N bit depth as the input image is obtained (S168).

According to the above-mentioned configuration, since the prediction image signal is created with the precision higher than the input image signal by M bits, the precision of a filter for motion compensation, a loop filter, intra-prediction or the like can be improved. As a result, the prediction error signal can be decreased and the encoding efficiency ratio can be improved. Further, it is possible to embed the watermark information without changing the input image signal by embedding the watermark therein using increased lower bits.

In the second to sixth embodiments, the number of bits M to be increased or decreased is entropy-encoded as bit depth increase information and contained in the encoded data. In the case that the bit depth is increased or decreased by the number of bits determined beforehand by the image encoding apparatus and image decoding apparatus, the number of bits M needs not be contained in the encoded data. Further, in the case that the bit depth is increased or decreased by the number of bits determined beforehand, only a flag indicating whether it is increased or decreased can be included in the encoded data. In this case, if the flag is TRUE, the switch is connected to the ON side in the pixel bit depth increase unit 1001, the pixel bit depth decrease unit 2001 or the pixel bit depth converter 2007. On the other hand, if the flag is FALSE, the switch is connected to the OFF side.

In the second and third embodiments, if the number of bits L to be decreased when the local decoded picture signal is stored in the frame memory is the same value as M, L needs not to be contained in the encoded data. Further, even if M and L are the same value or a different value, when it is the number fixed beforehand, the numbers of bits M and L need not to be included in the encoded data.

The expansion of the pixel bit depths of the input image or local decoded image signal and the decoded image is equivalent to improvement of precision of the integer arithmetic operation in the processing stage of encoding/decoding. It is possible to make the operation precision on an arbitrary point of the processing stage variable and to contain a flag or information indicating those operation precisions in the encoded data. In the processing stage of the encoding/decoding when combining, for example, the first to fifth embodiments, the encoded data contains a flag indicating whether the pixel bit depth stored in the frame memory is increased and a flag indicating whether the pixel bit depth of the prediction error subjected to the orthogonal transform/quantization is increased, namely, the operation precision of the orthogonal transform/quantization is increased. It may be changed in the encoding apparatus and decoding apparatus according to ON/OFF of these flags whether the pixel bit depth stored in the frame memory is increased or whether the pixel bit depth of the prediction error subjected to the orthogonal transform/quantization is increased. Furthermore, when these flags become ON, data indicating how many bits are increased or decreased may be contained in the encoded data. The flag indicating whether the operation precision of one process in the encoding/decoding processing is to be increased or data indicating the number of bits to be increased is not directed to the frame memory or the orthogonal transform/quantization, but data indicating a flag for, for example, a loop filter or the number of bits to be increased may be added. If the process is a part of the procedure of encoding/decoding, the flag may be contained in the encoded data by setting, to the process or a set of plural processes, a flag indicating whether the operation precision is increased or data indicating the number of bits to be increased.

Seventh Embodiment

The configuration of the image encoding apparatus of the seventh embodiment is explained referring to FIG. 35A. This embodiment has configuration as the embodiment of FIG. 11 fundamentally, but differs from the embodiment of FIG. 11 in the point that a pixel bit depth decrease unit (pixel bit depth decrease unit) 1004 is provided between the prediction image generator 115 and the subtracter 101 and a pixel bit depth increase unit (pixel bit depth increase converter) 1007 is provided between the adder 111 and the loop filter 112.

Figure 35B:
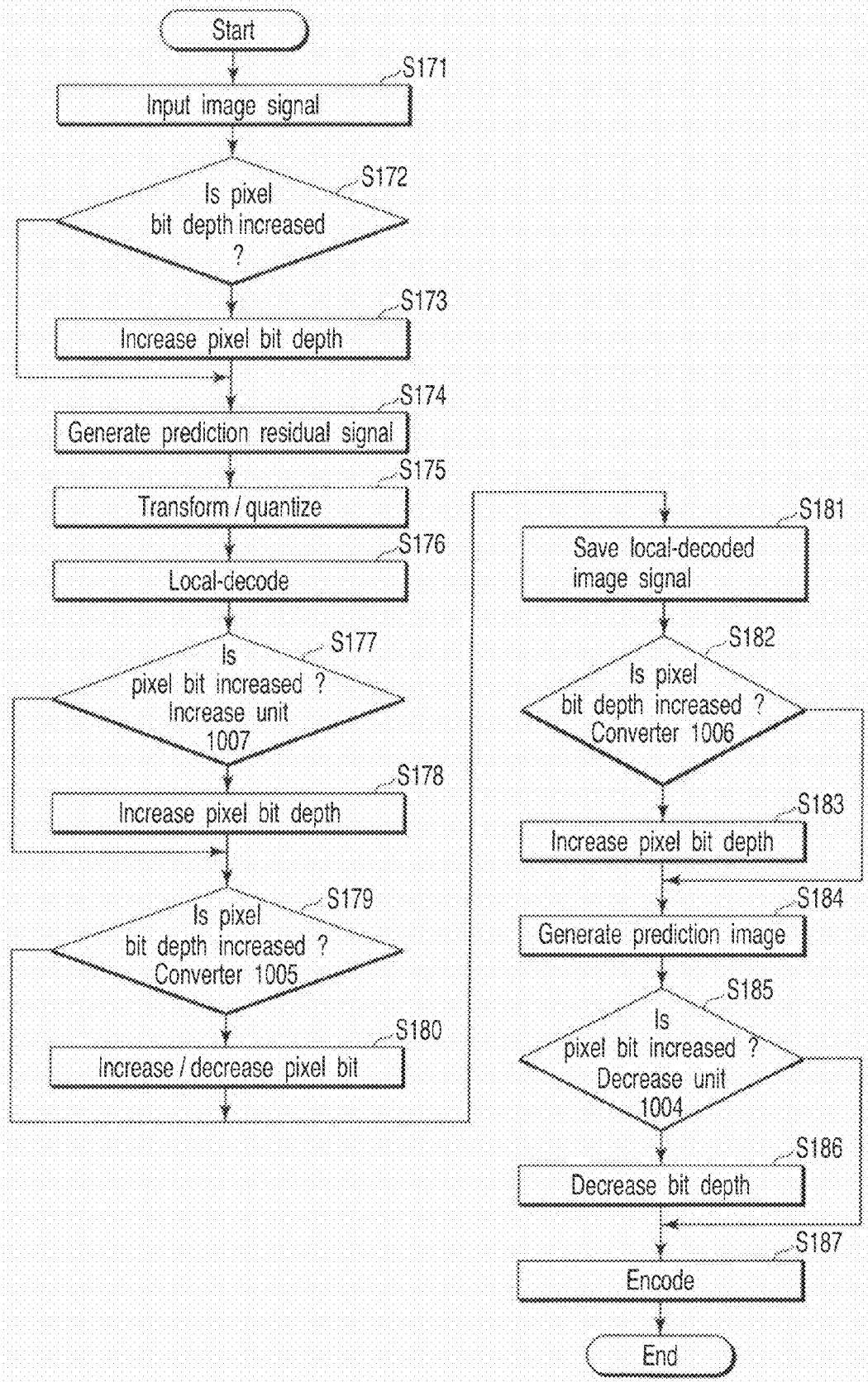
FIG. 35B is a flow chart illustrating an operation of the image encoding apparatus of FIG. 35A.

There will now be described an operation of the image encoding apparatus with reference to the flowchart of FIG. 35B. A video signal is input to this image encoding apparatus as the image signal 100 in units of a frame (S171). The pixel bit depth increase unit 1001 is configured as shown in FIG. 2, and determines, on the basis of a control flag H1001 based on the latter-mentioned syntax information included in the bit conversion information 1010, whether the value of each pixel of the input image signal 100 of N bit depth is increased to the (N+M) bit depth larger than N bits by M bits (S172). When the control flag F1001 is ON, the switch E0 in the pixel bit depth increase unit 1001 is set to ON, and the bit depth of each pixel of the local decoded picture signal 112 is increased by processing similar to the processing done with the pixel bit depth converter 1001 in the first embodiment (S173). For example, when a value of a pixel of the input image signal is k, the pixel value k' after M bits increase is calculated by the process of, for example, the equation (1) or the equations (1-1), (1-2), (1-3).

When the control flag F1001 is OFF, the switch E0 is connected to the OFF side so that the process for increasing the bit depth of each pixel is not done. The conversion information such as the number of bits M to be increased is led to the entropy encoder 108 as bit depth increase information 1003 with the bit depth conversion controller 1002.

The subtracter 101 calculates a difference between the input image signal 100 and the prediction image signal 102 to generate a prediction error signal 103 (S174). The orthogonal transformer 104 subjects the generated prediction error signal 103 to orthogonal transform (for example, discrete cosine transform (DCT)) and provides orthogonal transform coefficient information 105 (for example, DCT coefficient information) (S175). The quantizer 106 quantizes the orthogonal transform coefficient information 105 and leads the quantization orthogonal transform coefficient information 107 to the entropy encoder 108 and dequantizer 109.

The dequantizer 109 and inverse orthogonal transformer 110 subject the quantization orthogonal transform coefficient information 107 sequentially to inverse processes to the processes of the quantizer 106 and orthogonal transformer 104 to convert it into a signal similar to the prediction error signal, that is, a local decoded error signal. The adder 111 adds this local decoding error signal to the prediction image signal 102 to generate a local decoded picture signal 112 (S176). The local decoded picture signal 112 is input to the pixel bit depth increase unit 1007, to determine whether the bit depth of each pixel of the local decoded image signal 112 is increased on the basis of the control the flag F1007 based on the later-mentioned syntax information included in the bit conversion information 1010 (S177). When the control flag F1007 is ON, the switch E0 in the pixel bit depth increase unit 1007 is set to ON, whereby the bit depth of each pixel of the local decoded picture signal 112 is increased by processing similar to the processing done with the pixel bit depth converter 1007 in the fourth embodiment (S178). When the control flag F1007 is OFF, the processing for increasing the bit depth of the pixel is not carried out.

The loop filter 113 subjects the local decoded image signal 112 output from the pixel bit depth increase unit 1007 to filtering as needed and then inputs it to the pixel bit depth converter 1005. The pixel bit depth converter 1005 determines whether the bit depth of each pixel of the local decoded image signal 112 is converted on the basis of the control flag F1005 based on the later-mentioned syntax information contained in the bit conversion information 1010 (S179). The control flag F1005 is ON, the switch E3 in the pixel bit depth increase unit 1005 is set to ON, so that the bit depth of each pixel of the local decoded picture signal 112 is increased by processing similar to the processing done with the pixel bit depth converter 1005 in the third embodiment (S180). When the control flag F1005 is OFF, the processing for converting the bit depth is not done. The local image signal 112 output from the pixel bit depth converter 1005 is stored in the frame memory 114 (S181). The local image signal stored in the frame memory 114 is input to the pixel bit depth converter 1006 further. The pixel bit depth converter 1006 determines whether the bit depth of each pixel of the local decoded picture signal 112 is converted on the basis of the control flag F1006 based on the later-mentioned syntax information included in the bit conversion information 1010 (S182). The control flag F1006 is ON, the switch E3 in the pixel bit depth increase unit 1006 is set to ON, so that the bit depth of each pixel of the local decoded picture signal 112 is increased by processing similar to the processing done with the pixel bit depth converter 1006 in the third embodiment (S183). When the control flag F1006 is OFF, the processing for converting the bit depth of the pixel is not done. The local decoded picture signal 112 output from the pixel bit depth converter 1006 is input to the prediction image generator 115.

The prediction image generator 115 generates a prediction image signal based on certain prediction mode information from the input image signal 100 and the local decoded picture signal 112 stored in the frame memory 114 (S184). In this time, the local decoded picture signal 112 from the adder 111 is saved in the frame memory 114 temporarily, matching (for example, blockmatching) is carried out for every block between the input image signal 100 and the local decoded picture signal 112 saved in the frame memory 114 to detect a motion vector. A prediction image signal is created using the local image signal compensated by this motion vector. The prediction image generator 115 outputs the prediction image signal 102 generated here along with the motion vector information/prediction mode information 116 of the selected prediction image signal.

The prediction image signal 102 output from the prediction image generator 115 is input to the pixel bit depth decrease unit 1004. The pixel bit depth decrease unit 1004 determines on the basis of the control flag F1004 based on the later-mentioned syntax information included in the bit conversion information 1010 whether the bit depth of each pixel of the prediction image signal 102 (S185). When the control flag F1004 is ON, the switch E2 in the pixel bit depth increase unit 1004 is set to ON, so that the bit depth of each pixel of the prediction image signal 102 is decreased by processing similar to the embodiment (S186). When the control flag F1004 is OFF, the processing for converting the bit depth of pixel is not done.

The entropy encoder 108 entropy-encodes the quantization orthogonal transform coefficient information 107, the motion vector information/prediction mode information 116 and the bit depth increase information 1003 (S187), and the generated encoded data 117 is sent out to a transmission system or storage system which is not shown.

There will be explained a method for encoding a control flag controlling whether bit depth increase, decrease or conversion of the bit depth is done.

In the present embodiment, it is possible to transmit the control flag for controlling whether the bit depth increase, decrease or conversion of the bit depth is done or the number of bits to be increased by containing it in sequence parameter set syntax (404). Respective syntaxes are explained hereinafter.

ex_seq_all_bit_extension_flag shown in the sequence parameter set syntax of FIG. 36 is a flag indicating whether a bit is increased. When the flag is TRUE, it indicates to perform the encoding and decoding using data whose each pixel is increased in bit depth, over all data buses in the inside of encoding and decoding. When the flag is FALSE, this flag indicates not to perform the encoding and decoding using the image signal whose each pixel is increased in bit depth on all data buses in the inside of encoding and decoding or to perform the encoding and decoding using the image signal whose each pixel is increased in bit depth only on a part of the data buses.

When ex_seq_bit_extension_flag is TRUE, ex_seq_shift_bits indicating whether by how many bits the bit depth is increased may be transmitted further.

When ex_seq_all_bit_extension_flag is FALSE, eex_seq_partial_bit_extension_flag indicating whether the pixel bit depth of the image signal input to the prediction image generator is increased in the inside of encoding and decoding may be transmitted further. When the flag is TRUE, it indicates using the image signal each pixel of which is increased in bit depth in creating a prediction image in the internal processing of encoding/decoding. On the other hand, when the flag is FALSE, this flag indicates not to use the image signal whose each pixel is increased in bit depth in all data buses of the inside of encoding and decoding.

When ex_seq_partial_bit_extension_flag is TRUE, ex_seq_partial_shift_bits indicating whether by how many bits the pixel bit depth of the image signal input to the prediction image generator 112 is largely increased in comparison with the pixel bit depth of the input image signal may be transmitted further.

When ex_seq_partial_bit_extension_flag is TRUE, a flag indicating whether the image signal whose each pixel is increased in bit depth in a part of data busses of the inside of encoding/decoding is used may be transmitted further. In the example shown in FIG. 36, the flag ex_seq_framemem_bit_extension_flag indicating whether the pixel bit depth of the reference image signal to be stored in the frame memory 114 is increased, and the flag ex_seq_trans_and_quant_bit_extension_flag indicating whether the pixel bit depth of the prediction error signal input to or output from the orthogonal transformer and quantizer (orthogonal transformer 104, quantizer 106, dequantizer 109 and inverse orthogonal transformer 110) is increased are transmitted.

When ex_seq_framemem_bit_extension_flag is TRUE, this flag indicates that the pixel bit depth of the reference image signal to be stored in the frame memory is increased. When the flag is FALSE, it indicates that the pixel bit depth of the reference image signal to be stored in the frame memory is the same pixel bit depth as the input image.

When ex_seq_framemem_bit_extension_flag is TRUE, ex_seq_framemem_shift_bits indicating whether by how many bits the pixel bit depth of the image signal to be stored in the frame memory is largely-increased in comparison with the pixel bit depth of the input image signal may be transmitted further.

When ex_seq_trans_and_quant_bit_extension_flag is TRUE, this flag indicates that the pixel bit depth of the prediction error signal input to or output from the orthogonal transformer and quantizer (orthogonal transformer 104, quantizer 106, dequantizer 109 and inverse orthogonal transformer 110) is increased. In other words, it indicates that the bit depth of each pixel of the input image signal and prediction image signal is increased, and the prediction error signal is a differential signal between the input image signal and prediction image signal, the bit depth of each pixel of which is increased.

When the flag is FALSE, this flag indicates that the prediction error signal input to or output from the orthogonal transformer and quantizer (orthogonal transformer 104, quantizer 106, dequantizer 109 and inverse orthogonal transformer 110) is a differential signal between the input image signal and the prediction image signal of the same bit precision as the input image signal.

When ex_seq_trans_and_quant_bit_extension_flag is TRUE, ex_seq_trans_and_quant_shift_bits indicating whether by how many bits the pixel bit depth of the input image signal and prediction image signal is largely increased in comparison with the pixel bit depth of the input image signal, in generating the prediction error signal input to or output from the orthogonal transformer and quantizer (orthogonal transformer 104, quantizer 106, dequantizer 109 and inverse orthogonal transformer 110) may be transmitted further.

When each flag is TRUE on the encoding side and decoding side, in the case that the number of bits by which it is increased or decreased accords to the number of bits set beforehand, only a flag indicating whether the pixel bit depth of the image signal is converted as shown in FIG. 37 may be transmitted.

The setting example of control flags F1001, F1007, F1005, F1006 and F1004 employed in processing of the image encoding apparatus shown in FIG. 35 on the basis of the values of those syntaxes is shown in FIG. 38. In FIG. 38, the column "all" shows a value of ex_seq_all_bit_extension_flag. Similarly, columns "part", "fm" and "t/q" show values of ex_seq_partial_bit_extension_flag, ex_seq_framemem_bit_extension_flag, and ex_seq_trans_and_quant_bit_extension_flag, respectively. 0 shows FALSE, 1 shows TRUE, and – indicates that there is no syntax. The columns F1001, F1007, F1005, F1006 and F1004 of the control flag show values of the control flags set based on the values of respective syntaxes. 1 indicates ON and 0 indicates OFF. For example, when ex_seq_all_bit_extension_flag is TRUE, it is shown that only the control flag F1001 is ON, and the remaining flags are OFF.

FIG. 40 shows a setting example of control flags F2001, F2005, F2006, F2007 and F2008 used for processing of the later-mentioned image decoding apparatus. The respective flags show values similar to FIG. 38. In the present embodiment, it is possible to use data multiplexed with the supplemental syntax similarly to the first embodiment.

The configuration of the image decoding apparatus concerning the present embodiment is explained referring to FIG. 39A. As shown in FIG. 39A, this image decoding apparatus comprises an entropy decoder 200, a dequantizer 109, an inverse orthogonal transformer 110, an adder 111, a loop filter 113, a frame memory 114, a prediction image generator 115, pixel bit depth decrease units (pixel bit depth increase unit (pixel bit depth increase converter) 2005, pixel bit depth converters (pixel bit depth converters) 2007, 2008, and a bit depth conversion controller 2002. In other words, the coefficient information output of the entropy decoder 200 is connected to the adder 111 through the dequantizer 109 and inverse orthogonal transformer 110. The motion vector/prediction mode information output of the entropy decoder 200 is connected to the prediction image generator 115, and its bit diffusion information output is connected to the bit depth conversion controller 2002. The output of the prediction image generator 115 is connected to the adder 111 through the pixel bit depth decrease unit. The output of the adder 111 is connected to the frame memory 114 through the pixels pixel bit depth increase unit 2005, the loop filter 113, the bit depth converter 2007. The other output of the loop filter 113 is connected to the input of the pixel bit depth decrease unit 2001. The output of the frame memory 114 is connected to the pixel bit depth converter 2008 along with the output of the bit depth conversion controller 2002. The output of the pixel bit depth converter 2008 is connected to the other input of the prediction image generator 115. The output of the bit depth conversion controller 2002 is connected to the other inputs of the pixel bit depth decrease unit 2001, bit depth increase unit 2005, pixel bit depth decrease unit 2006, bit depth converter 2007 and pixel bit depth converter 2008.

Figure 39B:
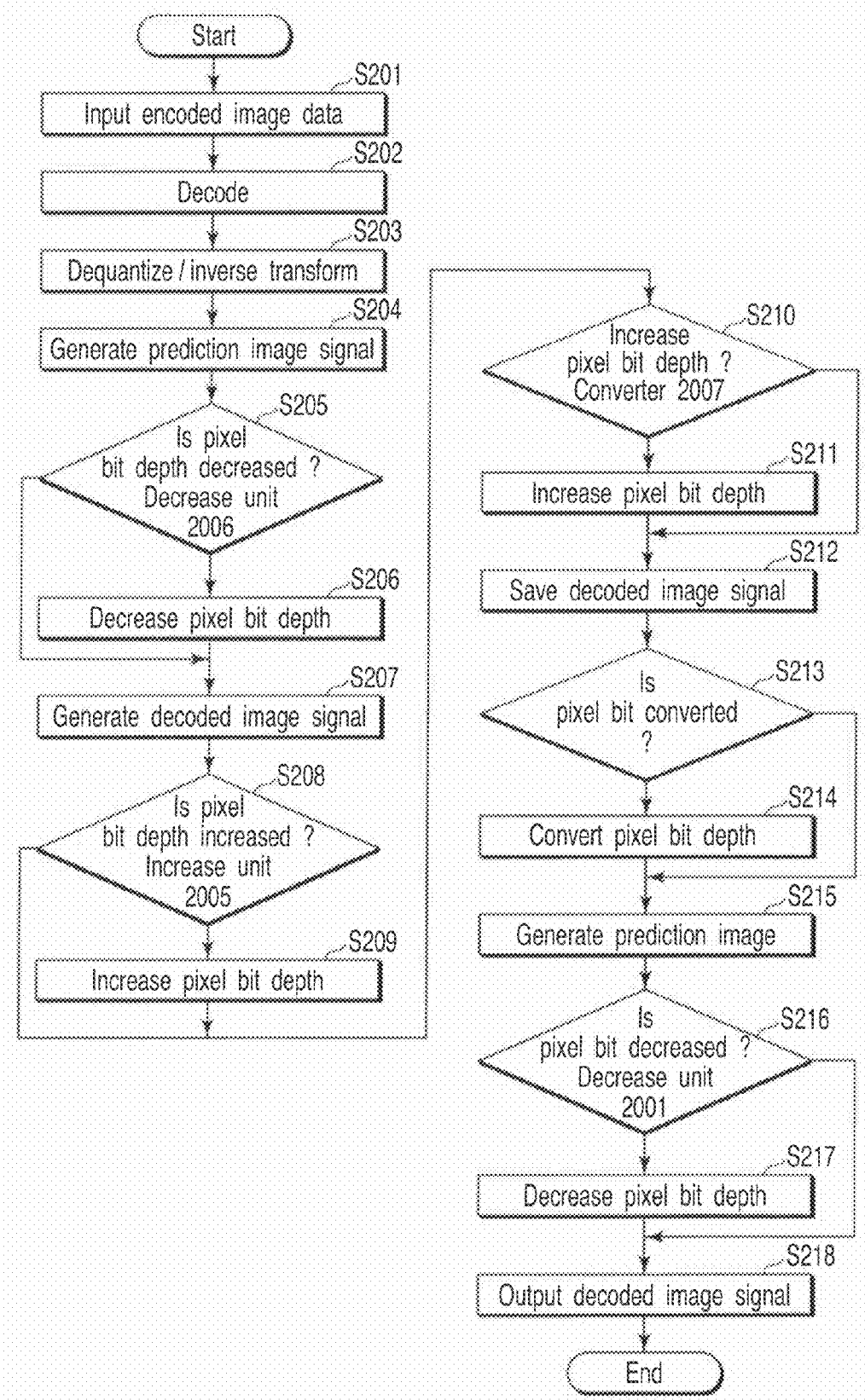
FIG. 39B is a flow chart illustrating an operation of the image decoding apparatus of FIG. 39A.

There will now be described an operation of the image decoding apparatus with reference to the flowchart of FIG. 39B. When the encoded data 117 encoded with the image encoding apparatus of FIG. 9 is input to the image decoding apparatus (S201), it is decoded according to an inverse procedure to the entropy encoding with the entropy decoder 200, whereby quantization orthogonal transform coefficient information 107, motion vector/prediction mode information 116 and bit depth increase information 2004 are generated (S202). When the bit depth increase information 2004 is input to the bit depth conversion controller 2002, the bit depth conversion controller 2002 outputs a control flag indicating whether the pixel bit depth conversion is carried out in the pixel bit depth decrease units 2001, 2006, the pixel bit depth increase unit 2005, and the pixel bit depth converters 2007, 2008 and bit depth conversion information 2003 including information indicating the bit depth to be increased or decreased and the like. The control flags included in this bit conversion information are set as shown in FIG. 40, respectively, based on the value of the syntax (FIG. 36) multiplexed with, for example, the encoded data as the bit depth increase information 2004 to the encoded data 117, and is included in the bit depth conversion information 2003.

The quantization orthogonal transform coefficient information 107 is subjected to inverse processes to the processes of the quantizer 106 and orthogonal transformer 104 with the dequantizer 109 and inverse orthogonal transformer 110, sequentially, to be converted to a residual signal 201 (S203). The motion vector/prediction mode information 116 is input to the prediction image generator 115, and is stored in the frame memory 114. The prediction image signal 102 based on the motion vector/prediction mode information 116 is generated from the decoded image signal 203 each pixel of which is converted in bit depth with the pixel bit depth converter 2008 as needed (S204).

The prediction image signal 102 is input to the pixel bit depth decrease unit 2006, to determine whether the bit depth of each pixel of the prediction image signal 102 is converted based on the control flag F2006 contained in the bit depth conversion information 2003 (S205). When the control flag F2006 is ON, the switch E2 in the pixel bit depth increase unit 2006 is set to ON, whereby the bit depth of each pixel of the prediction image signal 102 is decreased by processing similar to the processing done with the pixel bit depth increase unit 2006 in the fourth embodiment (S206). When the control flag F2006 is OFF, the processing for converting the bit depth of the pixel is not done.

The prediction image signal 102 output from the pixel bit depth decrease unit 2006 and the residual signal 201 are added with the adder 111 to generate a decoded image signal (S207). The decoded image signal 203 is input to the pixel bit depth increase unit 2005. The pixel bit depth converter 2005 determines on the basis of the control flag F2005 included in the bit depth conversion information 2003 whether the bit depth of each pixel of the decoded image signal 203 is expanded (S208). When the control flag F2005 is ON, the switch E1 in the pixel bit depth increase unit 2005 is set to ON, whereby the bit depth of each pixel of the decoded image signal 203 is increased by processing similar to the processing done with the pixel bit depth converter 2005 in the fourth embodiment (S209). When the control flag F2005 is OFF, the processing for converting the bit depth of the pixel is not done.

The decoded image signal 203 outputs from the pixel bit depth increase unit 2005 is subjected to filtering processing with the loop filter 113 as needed and then output to the pixel bit depth decrease unit 2001 and pixel bit depth converter 2007.

When the decoded image signal 203 is input to the pixel bit depth converter 2007, the pixel bit depth converter 2007 determines whether the bit depth of each pixel of the decoded image signal 203 is converted based on the control flag F2007 included in the bit depth conversion information 2003 (S210). When the control flag F2007 is ON, the switch E3 in the pixel bit depth increase unit 2007 is set to ON, whereby the bit depth of each pixel of the decoded image signal 203 is converted by processing similar to the processing done with the pixel bit depth converter 2007 in the third embodiment (S211). When the control flag F2007 is OFF, the processing for converting the bit depth of pixel is not done.

The decoded image signal 203 output from the pixel bit depth converter 2007 is stored in the frame memory 114 (S212). When the decoded image signal 203 stored in the frame memory 114 is input to the pixel bit depth converter 2008, the pixel bit depth converter 2008 determines whether the bit depth of each pixel of the decoded image signal 203 is converted based on the control flag F2008 included in the bit depth conversion information 2003 (S213). When the control flag F2008 is ON, the switch E3 in the pixel bit depth increase unit 2008 is set to ON. Therefore, the bit depth of each pixel of the decoded image signal 203 is converted by processing similar to the processing done with the pixel bit depth converter 2008 in the third embodiment (S214). When the control flag F2008 is OFF, the processing for converting the bit depth of pixel is not done. The image signal output from the pixel bit depth converter 2008 is input to the prediction image generator 115 (S215).

The decoded image signal 203 is subjected to filtering processing with the loop filter 113 as needed and output to the pixel bit depth decrease unit 2001. When the decoded image signal 203 is input to the pixel bit depth decrease unit 2001, the pixel bit depth decrease unit 2001 determines whether the bit depth of each pixel of the decoded image signal 203 is converted based on the control flag F2001 included in the bit depth conversion information 2003 (S216). When the control flag F2001 is ON, the switch E2 in the pixel bit depth increase unit 2001 is set to ON. Thus, the bit depth of each pixel of the decoded image signal 203 is decreased by processing similar to the pixel bit depth decrease unit 2001 in the first embodiment (S217). When the control flag F2001 is OFF, the processing for converting the bit depth is not done, and it is output as the decoded image signal 202 as it is.

As described above, the decoded image 202 of the same N bit depth as the input image input to the image encoding apparatus is output from the pixel bit depth decrease unit 2001 (S218).

In the above-mentioned configuration as shown in FIGS. 35 and 39, the frame memory, the orthogonal transform and operation precision of quantization can be changed by a flag based on syntax information included in the encoded data, and encoding can be performed with appropriate precision according to a constraint of an operation cost of the encoder side or decoder side. In this configuration, if any of the control flags is ON, the pixel bit depth of the image signal input to the prediction image generator is input with higher precision than the input image signal 100, resulting in that the operation precision for creating the prediction image can be upgraded, and encoding efficiency can be improved.

Some of the pixel bit depth increase unit, pixel bit depth decrease unit and pixel bit depth converter are omitted in FIGS. 35 and 39, and the apparatus is configured as shown in the second to fifth embodiments. Whether the conversion of bit depth is done is determined according to a value specified by ex_seq_all_bit_extension_flag in the syntax shown in, for example, FIG. 36 in the pixel bit depth extension unit, pixel bit depth decrease unit, and pixel bit depth converter.

It can be controlled so that if ex_seq_all_bit_extension_flag is TRUE, the processing for converting the bit depth of each pixel is carried out with the pixel bit depth increase unit, pixel bit depth decrease unit and pixel bit depth converter in each configuration, and if it is FALSE, the conversion processing is not done.

In carrying out quantization/dequantization, the quantization step size for quantization is assumed to be Qstep in the case that the input image corresponds to N bits. In this case, when the quantization step size Qstep' used for quantization/dequantization in the second and third embodiments may use Qstep' calculated by the following equation by considering the precision of residual to be increased to (N+M) bits when the bit depth is increased or decreased by M bits.

$$Qstep'=Qstep<<M \qquad (16)$$

As a result, the encoded data of the number of encoded bits approximately equivalent to the case of encoding the input image equivalent to N bits as it is can be obtained. There will be explained the reason that encoding efficiency is improved when changing the quantization step size according to the bit depth increased in this way. FIG. 41 is a table representing a prediction pixel value of 8 bit precision with respect to an input pixel value (8 bits) at each pixel position according to H.264 and a prediction pixel value of 12 bit precision according to the present embodiment. FIG. 42 shows this in a graph (interpolation filter at a half pixel position is assumed to be 6 taps {1/32, −5/32, 20/32, 20/32, −5/32, 1/32}).

As described above, when the input image signal is 8 bits (represented by square plots in FIG. 42) and the prediction image signal is formed of 8 bits identical to the input image signal (represented by rhombus plots in FIG. 42), the pixel value of the pixel interpolated at the half pixel position occurs a rounding error. In contrast, when a prediction image of, for example, 12 bits is created by performing bit depth increase as described in the present embodiment (represented by circular plots in FIG. 42), the rounding error of the pixel value of the pixel interpolated at the half pixel position decreases. When bit depth increase is done, the bit depth of residual is increased to 12 bits in comparison with one before bit depth increase. Therefore, the absolute value of residual increases in comparison with the case obtaining the residual at 8 bits without the bit depth increase. However, since the rounding error decreases, the error occurring in quantizing the image with the quantization step size expressed by the equation (16) and having substantially the same number of bits decreases, resulting in making it possible to improve encoding efficient.

In the present embodiment, as shown in FIG. 43, it can be done with bit depth higher than the bit depth of the input image by M bits, and the prediction image signal is created with precision higher than the input image signal by M bits. Therefore, the precision of a filter for motion compensation, loop filter, intra picture prediction and the like is improved, resulting in making it possible to decrease a prediction error signal and upgrade encoding efficiency.

The present invention is not limited to the above-described embodiments, but may be modified in various ways without departing from the scope. Various inventions can be realized by appropriately combining the structural elements disclosed in the embodiments. For instance, some of the disclosed structural elements may be deleted. Some structural elements of different embodiments may be combined appropriately.

According to the present invention, encoding efficiency can be improved by upgrading precision of intra picture prediction or motion compensation enough. According to the configuration of the present invention, the bit depth of the reference image input to a prediction image generator is made larger than the bit depth of an input image, to decrease a rounding error occurring in arithmetic operation of an intra picture prediction, one-way motion compensated prediction, bidirection motion compensated prediction and weighting motion compensated prediction, which are applied to, for example, H.264. This decreases a prediction error signal, resulting in improving encoding efficiency. In other words, it allows not only the bit precision concerning operation precision of a decimal pixel described above to be kept highly, but also the bit precision concerning operation precision of an integer pixel to be kept highly. According to some configurations of the present invention, it becomes possible to upgrade operation precision when creating a prediction image with a prediction image generator by saving the reference image with a higher bit depth than the bit depth of the input image, and using it for prediction operation, resulting in improve encoding efficient.

What is claimed is:

1. An image encoding apparatus comprising:
a pixel bit depth converter to convert a bit depth of each pixel of an input image formed of a plurality of pixels each having an N bit depth to an (N+M) bit depth larger than the N bit depth by M bits;
a prediction image generator to generate a prediction image of the (N+M) bit depth with respect to the input image of the (N+M) bit depth from a reference image of the (N+M) bit depth;
a subtracter to obtain a differential signal between the input image of the (N+M) bit depth and the prediction image of the (N+M) bit depth;
an encoder to encode the differential signal and output encoded image information of the (N+M) bit depth;
a decoder to output a decoded difference picture based on the encoded image information;
an adder to add the prediction image of the (N+M) depth to the decoded difference picture and output a decoded image of the (N+M) bit depth;
a bit depth converter to convert the decoded image of the (N+M) bit depth to (N+M−L) bit depth; and
a reference image storing memory to store the converted decoded image as a reference image having the (N+M−L) bit depth (L is an integer).

2. The image encoding apparatus according to claim 1, further comprising a multiplexer to multiplex bit conversion information representing number of bits changed by the pixel bit depth converter with the image encoding information for every unit by which the input image can be encoded, when encoding the input image.

3. The image encoding apparatus according to claim 1, wherein the encoded image information includes data indicating the number of bits M to be increased as bit depth conversion information for every arbitrary unit by which the input image can be encoded, when encoding the input image.

4. The image encoding apparatus according to claim 1, wherein the encoded image information includes data indicating a bit depth N when the decoded image is output, as bit depth conversion information for every arbitrary unit by which the input image can be encoded, when encoding the input image.

5. The image encoding apparatus according to claim 1, wherein the prediction image generator generates a prediction image based on adaptive interpolation filter information, and the image encoding information includes the adaptive interpolation filter information.

6. The image encoding apparatus according to claim 1, further comprising a filter provided on a previous stage of the reference image memory to subject the decoded image to filtering processing based on filtering processing information, the image encoding information including the filtering processing information.

7. The image encoding apparatus according to claim 1, wherein the encoded image information includes data indicating whether a bit depth of each pixel of the image signal is increased by M bits, as bit conversion information for every arbitrary encoding unit.

8. The image encoding apparatus according to claim 7, wherein the bit conversion information further includes data indicating the number of bits M to be increased.

9. An image encoding apparatus comprising:
a pixel bit depth converter to convert bit depth of each pixel of an input image formed of a plurality of pixels each having an N bit depth to an (N+M) bit depth larger than the N bit depth by M bits;
a prediction image generator to generate a prediction image of the (N+M) bit depth with respect to the input image of the (N+M) bit depth from a first reference image of the (N+M) bit depth;
a subtracter to obtain a differential signal of the (N+M) bit depth between the input image of the (N+M) bit depth and the prediction image of the (N+M) bit depth;

an encoder to encode the differential signal of the (N+M) bit depth and output encoded image information of the (N+M) bit depth;

a decoder to output a decoded difference picture of the (N+M) bit depth based on the encoded image information;

an adder to add the prediction image of the (N+M) depth to the decoded difference picture of the (N+M) bit depth and output a decoded image of an (N+M−L) bit depth; and a reference image storing memory to store the decoded image as a stored reference image;

a first pixel bit depth converter provided on a previous stage of the reference image storing memory to convert each pixel of a decoded image of the (N+M) bit depth into the (N+M−L) bit depth (L is an integer satisfying L≤M), and a second pixel bit depth converter provided on a rear stage of the reference image storing memory to convert each pixel of a reference image of the (N+M−L) bit depth into the (N+M) depth, the reference image storing memory storing the decoded image of the (N+M−L) bit depth as the stored reference image.

10. The image encoding apparatus according to claim 9, wherein the first pixel bit depth converter includes a calculator to calculate a representative value from a maximum value and minimum value of the pixel values included in a unit image of the decoded image of the (N+M−L) bit depth for every unit by which the input image can be encoded, when encoding the input image, a calculator to calculate a shift amount Q (0≤Q≤L) so that a value obtained by shifting to right a difference between a value of each pixel of the encoding unit image and the representative value falls in a dynamic range of the (N+M−L) bit depth, and a converter to convert a decoded image of (N+M) bit depth into a decoded image of the (N+M−L) bit depth by converting each pixel value in the encoding unit image into a value of the (N+M−L) bit depth by shifting to the right the difference between the value of each pixel and the representative value, and the reference image storing memory stores the decoded image of the (N+M−L) bit depth as a reference image, and stores the shift amount Q and the representative value for each of the encoding unit image, and the second pixel bit depth converter reads the stored reference image, the shift amount Q and the representative value from the reference image storing memory for every encoding unit, and adds a value obtained by shifting the pixel value of the (N+M−L) bit depth of each pixel of the reference image to left by Q bits to the representative value to convert the pixel value into the bit depth (N+M).

11. The image encoding apparatus according to claim 9, wherein the encoded image information includes data indicating a bit depth (N+M−L) of the reference image storing memory as bit conversion information for every arbitrary unit by which the input image can be encoded, when encoding the input image.

* * * * *